US010631035B2

(12) United States Patent
Eubanks

(10) Patent No.: US 10,631,035 B2
(45) Date of Patent: Apr. 21, 2020

(54) SYSTEMS AND METHODS FOR UNIFIED COMPENSATION, PRESENTATION, AND SHARING OF ON-DEMAND, LIVE, SOCIAL OR MARKET CONTENT

(71) Applicant: Silicon Beach Media II, LLC, Los Angeles, CA (US)

(72) Inventor: Jonathan Eubanks, Los Angeles, CA (US)

(73) Assignee: Silicon Beach Media II, LLC, Los Angeles, CA (US)

( * ) Notice: Subject to any disclaimer, the term of this patent is extended or adjusted under 35 U.S.C. 154(b) by 0 days.

(21) Appl. No.: 15/860,603

(22) Filed: Jan. 2, 2018

(65) Prior Publication Data

US 2019/0174172 A1  Jun. 6, 2019

Related U.S. Application Data

(63) Continuation-in-part of application No. 15/832,594, filed on Dec. 5, 2017, and a continuation-in-part of
(Continued)

(51) Int. Cl.
*G06Q 20/12* (2012.01)
*H04N 21/478* (2011.01)
(Continued)

(52) U.S. Cl.
CPC ......... *H04N 21/4316* (2013.01); *G06Q 20/10* (2013.01); *G06Q 20/123* (2013.01);
(Continued)

(58) Field of Classification Search
CPC ............. H04N 21/431; H04N 21/4312; H04N 21/4316; H04N 21/4438; H04N 21/472;
(Continued)

(56) References Cited

U.S. PATENT DOCUMENTS 5,610,774 A   3/1997  Hayashi
6,044,383 A   3/2000  Suzuki
(Continued)

OTHER PUBLICATIONS

International Application No. PCT/US2017/064769, International Search Report and Written Opinion dated Feb. 1, 2018.
(Continued)

*Primary Examiner* — Robert J Hance
(74) *Attorney, Agent, or Firm* — Ahmann Kloke LLP

(57) ABSTRACT

Various embodiments of the present disclosure include systems, methods, and non-transitory computer readable media configured to provide a respective customized portal and a respective unique user identifier for each of a plurality of respective celebrity users of a media system, the media system capable of providing media content, social content, and market content to a first set of users of the media system, each of the respective customized portals being at least partially controlled by the respective celebrity user. One or more content items presented through a first respective customized portal are identified. A purchase transaction request is received from a particular user of the first set of users for a first content item of the one or more content items presented through the first respective customized portal. The purchase transaction request is processed. The processing includes receiving an indication of a payment amount associated with the purchase transaction request, the payment amount being paid by the particular user or an entity associated with the particular user; identifying one or more respective celebrity users of the plurality of respective celebrity users associated with the purchase transaction request; determining, based on one or more compensation rules and the payment amount, a respective celebrity compensation amount for each of the one or more respective celebrity users associated with the purchase transaction request, each of the celebrity compensation amounts being
(Continued)

determined at substantially the same time as the indication of the payment amount paid by the particular user is received; and providing, in response to the determining, each of the celebrity compensation amounts to the respective celebrity users based on the respective unique user identifiers of the respective celebrity users associated with the purchase transaction request.

20 Claims, 57 Drawing Sheets

Related U.S. Application Data application No. 15/832,602, filed on Dec. 5, 2017, and a continuation-in-part of application No. 15/832,598, filed on Dec. 5, 2017, and a continuation-in-part of application No. 15/832,607, filed on Dec. 5, 2017.

(51) Int. Cl.
  *H04N 21/431* (2011.01)
  *H04N 21/4788* (2011.01)
  *G06Q 20/10* (2012.01)
  *H04N 21/472* (2011.01)
  *H04N 21/81* (2011.01)
  *G06Q 20/14* (2012.01)
  *H04N 21/658* (2011.01)
  *H04N 21/254* (2011.01)

(52) U.S. Cl.
  CPC ....... *G06Q 20/1235* (2013.01); *G06Q 20/145* (2013.01); *H04N 21/2542* (2013.01); *H04N 21/4788* (2013.01); *H04N 21/47202* (2013.01); *H04N 21/47815* (2013.01); *H04N 21/6581* (2013.01); *H04N 21/812* (2013.01); *H04N 21/431* (2013.01); *H04N 21/4312* (2013.01)

(58) Field of Classification Search
  CPC ............. H04N 21/475; H04N 21/2542; H04N 21/47815; H04N 21/6581; G06Q 20/123; G06Q 20/1235
  See application file for complete search history.

(56) References Cited

U.S. PATENT DOCUMENTS

| | | | |
|---|---|---|---|
| 6,112,186 A | 8/2000 | Bergh | |
| 6,385,596 B1* | 5/2002 | Wiser | G06F 21/10 369/84 |
| 6,442,758 B1 | 8/2002 | Jang | |
| 7,088,910 B2 | 8/2006 | Potrebic | |
| 7,117,518 B1 | 10/2006 | Takahashi | |
| 7,343,616 B1 | 3/2008 | Takahashi | |
| 7,430,360 B2 | 9/2008 | Abecassis | |
| 7,496,845 B2 | 2/2009 | Deutscher | |
| 7,962,935 B2 | 6/2011 | Kurosaki | |
| 8,244,593 B2 | 8/2012 | Klinger | |
| 8,699,861 B2 | 4/2014 | Potrebic | |
| 8,756,110 B2 | 6/2014 | Traina | |
| 9,473,584 B2 | 10/2016 | Sullivan | |
| 9,883,249 B2 | 1/2018 | Taylor | |
| 2001/0048437 A1 | 12/2001 | Sato | |
| 2002/0056087 A1 | 5/2002 | Berezowski | |
| 2002/0082910 A1 | 6/2002 | Kontogouris | |
| 2002/0124252 A1 | 9/2002 | Schaefer | |
| 2003/0033157 A1 | 2/2003 | Dempski | |
| 2003/0035011 A1 | 2/2003 | Lee | |
| 2003/0093806 A1 | 5/2003 | Dureau | |
| 2003/0145319 A1 | 7/2003 | Sato | |
| 2005/0149964 A1 | 7/2005 | Thomas | |
| 2005/0289637 A1 | 12/2005 | Burke | |
| 2006/0045470 A1 | 3/2006 | Poslinski | |
| 2006/0136965 A1 | 6/2006 | Ellis | |
| 2006/0236352 A1 | 10/2006 | Scott, III | |
| 2007/0055986 A1 | 3/2007 | Gilley | |
| 2007/0124756 A1 | 5/2007 | Covell | |
| 2007/0136753 A1 | 6/2007 | Bovenschulte | |
| 2007/0180466 A1 | 8/2007 | Ando | |
| 2007/0212017 A1 | 9/2007 | Ben-Romdhane | |
| 2007/0271580 A1 | 11/2007 | Tischer | |
| 2007/0294740 A1 | 12/2007 | Drake | |
| 2008/0092168 A1 | 4/2008 | Logan | |
| 2008/0155627 A1 | 6/2008 | O'Connor | |
| 2008/0184297 A1 | 7/2008 | Ellis | |
| 2008/0209021 A1 | 8/2008 | Shamma | |
| 2008/0235587 A1 | 9/2008 | Heie | |
| 2008/0247541 A1 | 10/2008 | Cholas | |
| 2009/0147786 A1 | 6/2009 | Li | |
| 2009/0276805 A1* | 11/2009 | Andrews, II | G06Q 30/02 725/35 |
| 2009/0304350 A1 | 12/2009 | Beyabani | |
| 2010/0017474 A1 | 1/2010 | Kandekar | |
| 2010/0031162 A1 | 2/2010 | Wiser | |
| 2010/0077433 A1 | 3/2010 | Beyabani | |
| 2010/0083304 A1 | 4/2010 | Pan | |
| 2010/0122293 A1 | 5/2010 | Craner | |
| 2010/0131385 A1 | 5/2010 | Harrang | |
| 2010/0247065 A1 | 9/2010 | Cooper | |
| 2010/0274566 A1 | 10/2010 | Carlson | |
| 2011/0162002 A1* | 6/2011 | Jones | H04N 21/42204 725/32 |
| 2011/0269548 A1 | 11/2011 | Barclay | |
| 2011/0307931 A1 | 12/2011 | Shuster | |
| 2012/0023534 A1 | 1/2012 | Dasilva | |
| 2012/0079548 A1 | 3/2012 | Whitten | |
| 2012/0124620 A1 | 5/2012 | Nishizawa | |
| 2012/0210356 A1 | 8/2012 | Kiok | |
| 2012/0243850 A1 | 9/2012 | Basra | |
| 2012/0266069 A1 | 10/2012 | Moshiri | |
| 2012/0291060 A1 | 11/2012 | Relyea | |
| 2012/0323704 A1 | 12/2012 | Steelberg | |
| 2013/0007805 A1 | 1/2013 | Athias | |
| 2013/0036434 A1 | 2/2013 | Shkedi | |
| 2013/0125167 A1 | 5/2013 | Sharif-Ahmadi | |
| 2013/0152128 A1 | 6/2013 | Tanna | |
| 2013/0159117 A1* | 6/2013 | Sanginiti | H04L 67/02 705/14.73 |
| 2013/0304575 A1* | 11/2013 | Fetyko | H04L 65/403 705/14.53 |
| 2013/0326561 A1 | 12/2013 | Pandey | |
| 2013/0339109 A1* | 12/2013 | Steelberg | G06Q 30/0207 705/14.1 |
| 2014/0032371 A1 | 1/2014 | Traina | |
| 2014/0171179 A1* | 6/2014 | Ball | G07F 17/32 463/25 |
| 2014/0173644 A1 | 6/2014 | Ball | |
| 2014/0173648 A1* | 6/2014 | Ball | H04N 21/25 725/25 |
| 2014/0181120 A1 | 6/2014 | Sullivan | |
| 2014/0181196 A1 | 6/2014 | Sullivan | |
| 2014/0280603 A1 | 9/2014 | Rideout | |
| 2014/0282650 A1 | 9/2014 | Viles | |
| 2014/0375752 A1 | 12/2014 | Shoemake | |
| 2015/0127438 A1 | 5/2015 | Wedderburn | |
| 2015/0170101 A1* | 6/2015 | Fair | G06Q 10/101 705/300 |
| 2015/0215665 A1 | 7/2015 | Casagrande | |
| 2015/0237389 A1 | 8/2015 | Grouf | |
| 2015/0244807 A1 | 8/2015 | Shoemake | |
| 2016/0034974 A1 | 2/2016 | Neb | |
| 2016/0182965 A1 | 6/2016 | Peterson | |
| 2017/0094349 A1 | 3/2017 | Maughan | |
| 2018/0268395 A1* | 9/2018 | Donk | G06Q 20/20 |
| 2019/0147471 A1 | 5/2019 | McKelvey, Jr. | |
| 2019/0173814 A1 | 6/2019 | McNeill | |

OTHER PUBLICATIONS

International Application No. PCT/US2018/012263, International Search Report and Written Opinion dated Mar. 26, 2018.

(56) References Cited

OTHER PUBLICATIONS

Anonymous, "Kirusa Wins the West Africa Com Aware for Outstanding Enterprise Solution 2017," PRWeb Newswire, Sep. 20, 2017.

Anonymous, "Microsoft Updates MSN Personal Portal; Microsoft Makes it Easier for People to Access Its Customizable Portal on MSN and has Made Improvements to the Beta Service," InternetWeek, Sep. 2, 2005.

Bruno, Antony, "The Blueprint 3: What MySpace's Badly Needed Redesign Means for Artists, Labels and Fans," Billboard 122.44, vol. 8, No. 1, Nov. 6, 2010.

\* cited by examiner

4500

```
┌─────────────────────────────────────────────────────────────────────┐
│ Displaying a limited celebrity portal interface that includes a set │
│ of first visuals indicating a first celebrity user, and a second    │
│ set of visuals indicating a set of content items associated with    │
│ the first celebrity user, and a subscription icon, the limited      │
│ celebrity portal interface being at least partially controlled by   │
│ the first celebrity user 4502                                       │
└─────────────────────────────────────────────────────────────────────┘
                                  │
                                  ▼
┌─────────────────────────────────────────────────────────────────────┐
│ Responsive to receiving a selection of the subscription icon,       │
│ overlaying a celebrity portal subscription interface over a portion │
│ of the limited celebrity poral interface, the celebrity portal      │
│ subscription interface including a first set of visual prompts for  │
│ completing registration of a non-celebrity user registration to     │
│ access a set of subscribed celebrity portal interfaces at least     │
│ partially controlled by the first celebrity user 4504               │
└─────────────────────────────────────────────────────────────────────┘
                                  │
                                  ▼
┌─────────────────────────────────────────────────────────────────────┐
│ Responsive to receiving input corresponding to the first set of     │
│ visual prompts, verifying the input 4506                            │
└─────────────────────────────────────────────────────────────────────┘
                                  │
                                  ▼
┌─────────────────────────────────────────────────────────────────────┐
│ Responsive to a successful verification of the input, displaying a  │
│ first subscribed celebrity portal interface of the set of           │
│ subscribed celebrity portal interfaces including a third set of     │
│ visuals indicating one or more second celebrity users linked to the │
│ first celebrity user, and a fourth set of visuals indicating one or │
│ more activities of the first celebrity user 4508                    │
└─────────────────────────────────────────────────────────────────────┘
```

FIG. 45

Displaying a first screen interface of a personal portal of a media system including a communication initiation region, a linked user region, an advertisement region, and a user activity region, the communication initiation region including a set of first visuals indicating a plurality of different selectable types of digital communication, the linked user region including a set of second visuals indicating a set of second users linked to the first user, and the user activity region including a third set of visuals indicating user activity of the first user, the personal portal being at least partially controlled by the first user 4702

Responsive to receiving a selection of an instant communication visual of the set of visuals, overlaying an instant communication region over a portion of the first screen interface of the personal portal, prompting the user to select a particular user from the set of second users linked to the first user, and establishing an instant communication session between the first user and the selected particular user 4704

FIG. 47

SYSTEMS AND METHODS FOR UNIFIED COMPENSATION, PRESENTATION, AND SHARING OF ON-DEMAND, LIVE, SOCIAL OR MARKET CONTENT

CROSS REFERENCE TO RELATED APPLICATIONS

This application is a continuation-in-part of U.S. patent application Ser. No. 15/832,594, filed Dec. 5, 2017, entitled "Systems and Methods for Unified Presentation of On-Demand, Live, Social or Market Content," and a continuation-in-part of U.S. patent application Ser. No. 15/832,598, filed Dec. 5, 2017, entitled "Systems and Methods for Unified Presentation of A Smart Bar on Interfaces Including On-Demand, Live, Social or Market Content," and a continuation-in-part of U.S. patent application Ser. No. 15/832,602, filed Dec. 5, 2017, entitled "Systems and Methods for Unified Presentation of Stadium Mode Using On-Demand, Live, Social or Market Content," and a continuation-in-part of U.S. patent application Ser. No. 15/832,607, filed Dec. 5, 2017, entitled "Systems and Methods for Unified Presentation of Synchronized On-Demand, Live, Social or Market Content," the contents of which are incorporated herein by reference in their entirety.

TECHNICAL FIELD

This disclosure pertains to systems for presenting content. More specifically, this disclosure pertains to unified presentation and sharing of on-demand, live, social or market content.

BACKGROUND

Under conventional approaches, multiple devices are required to perform different electronic activities. For example, a TV may be required to present live sporting events, a computer or mobile device (e.g., smartphone) may be required to communicate with friends or stream media content, and/or the like. Additionally, multiple devices are typically needed in order to perform different electronic activities simultaneously (e.g., presenting a live sporting event and communicating with friends), and the multiple devices typically are not natively compatible.

SUMMARY

Various embodiments of the present disclosure include systems, methods, and non-transitory computer readable media configured to provide a respective customized portal and a respective unique user identifier for each of a plurality of respective celebrity users of a media system, the media system capable of providing media content, social content, and market content to a first set of users of the media system, each of the respective customized portals being at least partially controlled by the respective celebrity user. One or more content items presented through a first respective customized portal are identified. A purchase transaction request is received from a particular user of the first set of users for a first content item of the one or more content items presented through the first respective customized portal. The purchase transaction request is processed. The processing includes receiving an indication of a payment amount associated with the purchase transaction request, the payment amount being paid by the particular user or an entity associated with the particular user; identifying one or more respective celebrity users of the plurality of respective celebrity users associated with the purchase transaction request; determining, based on one or more compensation rules and the payment amount, a respective celebrity compensation amount for each of the one or more respective celebrity users associated with the purchase transaction request, each of the celebrity compensation amounts being determined at substantially the same time as the indication of the payment amount paid by the particular user is received; and providing, in response to the determining, each of the celebrity compensation amounts to the respective celebrity users based on the respective unique user identifiers of the respective celebrity users associated with the purchase transaction request.

In some embodiments, the one or more respective celebrity users of the plurality of respective celebrity users associated with the purchase transaction request include the respective celebrity user at least partially controlling the first customized portal. In some embodiments, the one or more respective celebrity users of the plurality of respective celebrity users associated with the purchase transaction request include one or more second respective celebrity users linked to the purchase transaction request, the linking being based on a link path resulting in the receiving of the purchase transaction request. In some embodiments, the link path is based on the respective customized portals visited by the particular user within a predetermined amount of time prior to the purchase transaction request being received from the particular user.

In some embodiments, the celebrity compensation amount is provided at substantially the same time as payment amount is paid.

In some embodiments, the one or more celebrity compensation rules define the respective compensation amounts as a percentage of the payment amount associated with the purchase transaction request. In some embodiments, the one or more celebrity compensation rules define the respective compensation amounts as a percentage of the payment amount associated with the purchase transaction request and a respective position within the link path.

Various embodiments of the present disclosure include systems, methods, and non-transitory computer readable media configured to provide a respective customized portal and a respective unique user identifier for each of a plurality of respective celebrity users of a media system, the media system capable of providing media content, social content, and market content to a first set of users of the media system, each of the respective customized portals being at least partially controlled by the respective celebrity user. One or more content items presented through a first respective customized portal are identified. A purchase transaction request is received from a particular user of the first set of users for a first content item of the one or more content items presented through the first respective customized portal. The purchase transaction request is processed. The processing includes receiving an indication of a payment amount associated with the purchase transaction request, the payment amount being paid by the particular user or an entity associated with the particular user; identifying one or more respective celebrity users of the plurality of respective celebrity users associated with the purchase transaction request; determining, based on one or more compensation rules and the payment amount, a respective celebrity compensation amount for each of the one or more respective celebrity users associated with the purchase transaction request, each of the celebrity compensation amounts being determined at substantially the same time as the indication of the payment amount paid by the particular user is received; and providing, in response to the determining, each of the celebrity compensation amounts to the respective celebrity users based on the respective unique user identifiers of the respective celebrity users associated with the purchase transaction request.

In some embodiments, the one or more respective celebrity users of the plurality of respective celebrity users associated with the purchase transaction request include the respective celebrity user at least partially controlling the first customized portal. In some embodiments, the one or more respective celebrity users of the plurality of respective celebrity users associated with the purchase transaction request include one or more second respective celebrity users linked to the purchase transaction request, the linking being based on a link path resulting in the receiving of the purchase transaction request. In some embodiments, the link path is based on the respective customized portals visited by the particular user within a predetermined amount of time prior to the purchase transaction request being received from the particular user.

In some embodiments, the celebrity compensation amount is provided at substantially the same time as payment amount is paid.

In some embodiments, the one or more celebrity compensation rules define the respective compensation amounts as a percentage of the payment amount associated with the purchase transaction request.

In some embodiments, the one or more celebrity compensation rules define the respective compensation amounts as a percentage of the payment amount associated with the purchase transaction request and a respective position within the link path.

Various embodiments of the present disclosure include systems, methods, and non-transitory computer readable media configured to display a limited celebrity portal interface that includes a set of first visuals indicating a first celebrity user, and a second set of visuals indicating a set of content items associated with the first celebrity user, and a subscription icon, the limited celebrity portal interface being at least partially controlled by the first celebrity user. Responsive to receiving a selection of the subscription icon, overlaying a celebrity portal subscription interface over a portion of the limited celebrity portal interface, the celebrity portal subscription interface including a first set of visual prompts for completing registration of a non-celebrity user registration to access a set of subscribed celebrity portal interfaces at least partially controlled by the first celebrity user. Responsive to receiving input corresponding to the first set of visual prompts, verifying the input. Responsive to a successful verification of the input, displaying a first subscribed celebrity portal interface of the set of subscribed celebrity portal interfaces including a third set of visuals indicating one or more second celebrity users linked to the first celebrity user, and a fourth set of visuals indicating one or more activities of the first celebrity user.

In some embodiments, the first set of visuals comprise an image of a likeness of the first celebrity user.

In some embodiments, the set of content items include any of videos, movies, music, video games, and television shows.

In some embodiments, the set of content items are selected by the first celebrity user.

In some embodiments, the verifying the input comprises processing a financial transaction.

In some embodiments, the second set of visuals comprise a set of icons, each of the icons indicating particular digital content endorsed by the first celebrity user.

In some embodiments, the one or more activities include one or more instant communication messages with one or more of the second celebrity users, movies that the first celebrity user is watching, video games the first celebrity user is playing, and music the first celebrity user is listening to.

In some embodiments, the systems, methods, and non-transitory computer readable media configured to provide, responsive to receiving a selection of any of the first visuals, second visuals, third visuals, and fourth visuals, a sharing interface for sharing associated content with one or more of the second celebrity users.

In some embodiments, the set of subscribed celebrity portal interfaces includes an instant communication region displaying one or more communication messages between the first celebrity user and one or more of the second celebrity users.

In some embodiments, the set of subscribed celebrity portal interfaces includes an exclusive content region displaying digital content exclusive to the first celebrity user.

Various embodiments of the present disclosure include systems, methods, and non-transitory computer readable media configured to monitor first user activity of a first set of users on a media system, the first set of users being associated with a first set of system privileges, the media system capable of providing media content, social content, and market content to the first set of users, the first user activity of the first set of users including instant communication messages transmitted through the media system between a plurality of users of the first set of users, media consumed by at least a first user of the first set of users through the media system, and purchases made through the media system by at least the first user of the first set of users. Second user activity of a second set of users on the media system is monitored, the second set of users being associated with a second set of system privileges, the second user activity of the second set of users including instant communication messages transmitted through the media system between a plurality of users of the second set of users, media consumed by at least a second user of the second set of users through the media system, and content items endorsed by at least the second user of the second set of users. A first update of a personal portal of the media system is caused, the personal portal being associated with the first user of the first set of users, the first update being based on the monitoring of the first user activity of the first set of users on the media system. A second update of a celebrity portal of the media system, is caused the celebrity portal being associated with the second user of the second set of users, the second update being based on the monitoring of the second user activity of the second set of users on the media system.

In some embodiments, the systems, methods, and non-transitory computer readable media configured to share at least a portion of the first user activity with one or more other users of the first set of users linked to the first user, the causing the first update being based on the sharing.

In some embodiments, the systems, methods, and non-transitory computer readable media configured to share at least a portion of the second user activity with one or more other users of the second set of users linked to the second user, the causing the second update being based on the sharing.

In some embodiments, the media content includes streaming media, on-demand media content, live media content, broadcast media content, video games, and music.

In some embodiments, the market content includes digital media and physical goods available for purchase through the media system.

In some embodiments, he media consumed comprises historical and current media consumption.

In some embodiments, the first user activity includes one or more users of the second set of users that the first user is subscribed to.

In some embodiments, the instant communication messages originating from any of the second set of users are limited to being sent to one or more other users of the second set of users.

Various embodiments of the present disclosure include systems, methods, and non-transitory computer readable media configured to display a first screen interface of a personal portal of a media system, the media system capable of providing media content, social content, and market content to users of the media system, the first screen interface including a communication initiation region, a linked user region, an advertisement region, and a user activity region, the communication initiation region including a set of first visuals indicating a plurality of different selectable types of digital communication, the linked user region including a set of second visuals indicating a set of second users linked to the first user, and the user activity region including a third set of visuals indicating user activity of the first user, the personal portal being at least partially controlled by the first user. Responsive to receiving a selection of an instant communication visual of the set of visuals, overlaying an instant communication region over a portion of the first screen interface of the personal portal, prompting the user to select a particular user from the set of second users linked to the first user, and establishing an instant communication session between the first user and the selected particular user.

In some embodiments, the user activity includes movies the first user is watching, video games the first user in playing, and music the first user is listening to.

In some embodiments, the systems, methods, and non-transitory computer readable media configured to overlay a notification region including one or more notification visuals.

In some embodiments, the notification region is configured to display notification visuals indicating notifications associated with user activity of one or more of the second users linked to the first user, system update notifications, live programming notifications, and communication notifications.

In some embodiments, the systems, methods, and non-transitory computer readable media configured to overlay, responsive to receiving a selection of a video chat visual of the set of visuals, a video chat region over a portion of the first screen interface of the personal portal.

In some embodiments, the systems, methods, and non-transitory computer readable media configured to overlay, responsive to receiving a selection of an electronic mail visual of the set of visuals, an electronic mail region over a portion of the first screen interface of the personal portal.

In some embodiments, the systems, methods, and non-transitory computer readable media configured to display, responsive to user input, a sharing interface, the sharing interface capable of sharing user activity of the first user, notifications of the first user, instant communication messages of the first user, purchase history of the first user, and one or more celebrity users the first user is following.

Described herein include systems, methods, and non-transitory computer readable media related to display of user-specific navigation screen upon start of a media content display system. A system comprises a playback engine and an interactive programming guide engine. The playback engine is configured to present media content through a display device. The interactive programming guide engine is configured to generate a user profile based on user interaction with the media content presented by the playback engine, transmit the user profile to an external system, and responsive to the transmitted user profile, receive data of user-specific content options that are generated based on the user profile. The interactive programming guide engine is further configured to generate a user-specific navigation screen based on the data of the received user-specific content options, and cause the user-specific navigation screen to be displayed on the display device upon start of the system.

In some embodiments, the interactive programming guide engine is further configured to receive user-specific advertisement content, responsive to the transmitted user profile, generate a user-specific advertisement screen based on the received user-specific advertisement content, and cause the user-specific advertisement screen to be displayed along with the user-specific navigation screen.

In some embodiments, the interactive programming guide engine causes the user-specific navigation screen to be displayed on the display device in response to user login. In some embodiments, the interactive programming guide engine causes the user-specific navigation screen to be displayed on the display device before a non-user-specific navigation screen is displayed on the display device.

In some embodiments, the user-specific navigation screen includes a plurality of selectable panels each of which corresponds to a media content that is capable of being presented by the playback engine. In some embodiments, the interactive programming guide engine is further configured to cause the user-specific navigation screen displayed on the display device to transition to a media screen associated with media content corresponding to one of the selectable panels that is selected. In some embodiments, the interactive programming guide engine causes the user-specific navigation screen displayed on the display device to transition to the media screen without a non-user-specific navigation screen being displayed on the display device therebetween. In some embodiments, the plurality of selectable panels include a first panel representing a first media content and a second panel representing a second media content that has involved less user interaction than the first media content, wherein the first panel is larger than the second panel. In some embodiments, the plurality of selectable panels include a first panel representing a first media content and a second panel representing a second media content that has involved less user interaction than the first media content, wherein the first panel is located at a position closer to a center of the user-specific navigation screen than the second panel is.

In some embodiments, the interactive programming guide engine transmits the user profile to the external system periodically, and receives the data of user-specific content options periodically.

Described herein include systems, methods, and non-transitory computer readable media configured related to display of a graphical user interface (GUI) associated with media content that is displayed. A system comprises a GUI engine. The GUI engine may be configured to identify content parameters of media content that is currently presented, and identify one or more functions that are available specifically for the media content based on the identified content parameters. The engine may be further configured to generate, based on the one more identified functions, GUI data for display of a GUI that selectively includes one or more selectable objects for selecting the one or more identified functions, respectively. The engine may be receive an input to start a GUI function, and in response to the input, cause a display device coupled to the system to display the GUI based on the generated GUI data.

In some embodiments, the GUI engine may be further configured to receive an input to select one of the one or more selectable objects in the GUI displayed on the display device, and in response to the input, select one of the one or more selectable objects, and cause the display device to display a screen associated with an available function corresponding to the selected one of the one or more selectable objects. In some embodiments, the screen associated with the available function corresponding to the selected one of the one or more selectable objects is displayed together with the GUI.

In some embodiments, the engine may be further configured to repeatedly carry out identification of the content parameters, identification of the one or more functions that are available, and generation of the GUI data, until the input to start the GUI function is received.

In some embodiments, the engine may be further configured to carry out identification of the content parameters, identification of the one or more functions that are available, and generation of the GUI data, in response to the input to start the GUI function.

In some embodiments, the content parameters include one or more of a channel that is currently selected, a program that is currently presented on the channel, and content that is currently presented in the program. In some embodiments, the GUI displayed by the display device does not include one or more objects corresponding to one or more functions that are unavailable for the media content. In some embodiments, the GUI displayed by the display device is overlaid on display content that has been displayed by the display device before displaying the GUI.

In some embodiments, the GUI displayed by the display device also includes one or more selectable objects corresponding to one or more functions that are available regardless of the media content. In some embodiments, in the GUI displayed by the display device, the one or more selectable objects for selecting the one or more identified functions are displayed with emphasis with respect to the one or more selectable objects corresponding to one or more functions that are available regardless of the media content.

Described herein include systems, methods, and non-transitory computer readable media configured related to display of media content and advertisement content separately. A system comprises an advertisement separation engine. The advertisement separation engine is configured to receive an input to start an advertisement separation function, when media content including interruption by advertisement is presented in a screen, and in response to the input, obtain the media content with less or no interruption of advertisement and advertisement content that is generated separately from the media content. The advertisement separation engine is further configured to switch the screen including the media content including interruption of advertisement to a new screen including a first sub-screen in which the obtained media content with less or no interruption by advertisement is displayed and a second sub-screen in which the obtained advertisement content is displayed.

In some embodiments, the advertisement separation engine is further configured to obtain, in response to the input, non-advertisement content that is generated separately from the media content and associated with the media content. The advertisement content is displayed in the second sub-screen in a first time period and the non-advertisement content is displayed in the second sub-screen in a second time period. In some embodiments, the non-advertisement content includes metadata of the media content that is displayed in the first sub-screen.

In some embodiments, the advertisement separation engine is further configured to obtain non-advertisement content that is generated separately from the media content and associated with the media content, when the advertisement content is displayed in the second sub-screen, and upon obtaining the non-advertisement content, switch the advertisement content displayed in the second sub-screen to the non-advertisement content.

In some embodiments, the advertisement content is associated with the media content. In some embodiments, the advertisement content is associated with a user profile. In some embodiments, the advertisement content is a sequence of a plurality of still images that contain different advertisement objects. In some embodiments, the advertisement content includes one or more still images and does not include video images. In some embodiments, the media content is live media content. In some embodiments, an aspect ratio of the first sub-screen is equal to an aspect ratio of the screen including the media content including interruption of advertisement.

Described herein include systems, methods, and non-transitory computer readable media configured related to synchronized presentation of media content. A system comprises a playback engine, a communication engine, and a synchronized presentation engine. The playback engine is configured to present content on a display device. The communication engine is configured to communicate externally. The synchronized presentation engine is configured to set up a group of users as participants of a synchronized presentation session. The synchronized presentation engine is further configured cause the playback engine to present first media content on the display device upon start of the synchronized presentation session. The synchronized presentation engine is further configured cause the communication engine to transmit a signal to external systems associated with one or more of the participants upon start of the synchronized presentation session, such that the external systems associated with the one or more of the participants present second media content synchronized with the first media content.

In some embodiments, the synchronized presentation engine is further configured to receive a user input to select the first media content as selected media content to be presented during the synchronized presentation session. The synchronized presentation engine is further configured to determine whether or not a user of the system is authorized to access the selected media content, wherein upon determining that the user of the system is authorized to access the selected media content, the synchronized presentation engine causes the playback engine to present first media content on the display device. In some embodiments, the synchronized presentation engine is further configured to generate, upon determining that the user of the system is authorized to access the selected media content, a prompt for the user to perform transaction to acquire access to the selected media content.

In some embodiments, the synchronized presentation engine is further configured to determine whether or not one or more of the participants associated with the external systems are authorized to access the selected media content, wherein upon determining that the one or more of the participants associated with the external systems are authorized to access the selected media content, the synchronized presentation engine causes the communication engine to transmit the signal to the external systems. In some embodiments, the synchronized presentation engine is further configured to cause, upon determining that the one or more of the participants associated with the external systems are not authorized to access the selected media content, a prompt to be generated on one or more of the external systems, such that the one or more of the participants associated with said one or more of the external systems are prompted to perform transaction to acquire access to the selected media content.

In some embodiments, the system further comprises a social interface engine configured to establish a friend connection with one or more users, wherein the synchronized presentation engine determines the group of users based on the one or more users having the friend connection. In some embodiments, the social interface engine is further configured to cause a graphical user interface (GUI) for instant message among the participant be displayed on the display device during the synchronized presentation session.

In some embodiments, the synchronized presentation engine is further configured to limit control of playback during the synchronized presentation session by the external systems.

In some embodiments, the first media content and the second media content include the same content in a first time period during the synchronized presentation session and different content in a second time period during the synchronized presentation session. In some embodiments, the first media content includes first content overlaid on synchronized content, and the second media content includes second content overlaid on the synchronized content.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 45 illustrates a flowchart of an example method of graphical user interface navigational flow and operation of a celebrity portal of a media system according to some embodiments.

FIG. 47 illustrates a flowchart of an example graphical user interface navigational flow and operation of a personal portal of a media system according to some embodiments.

DETAILED DESCRIPTION

Figure 1:
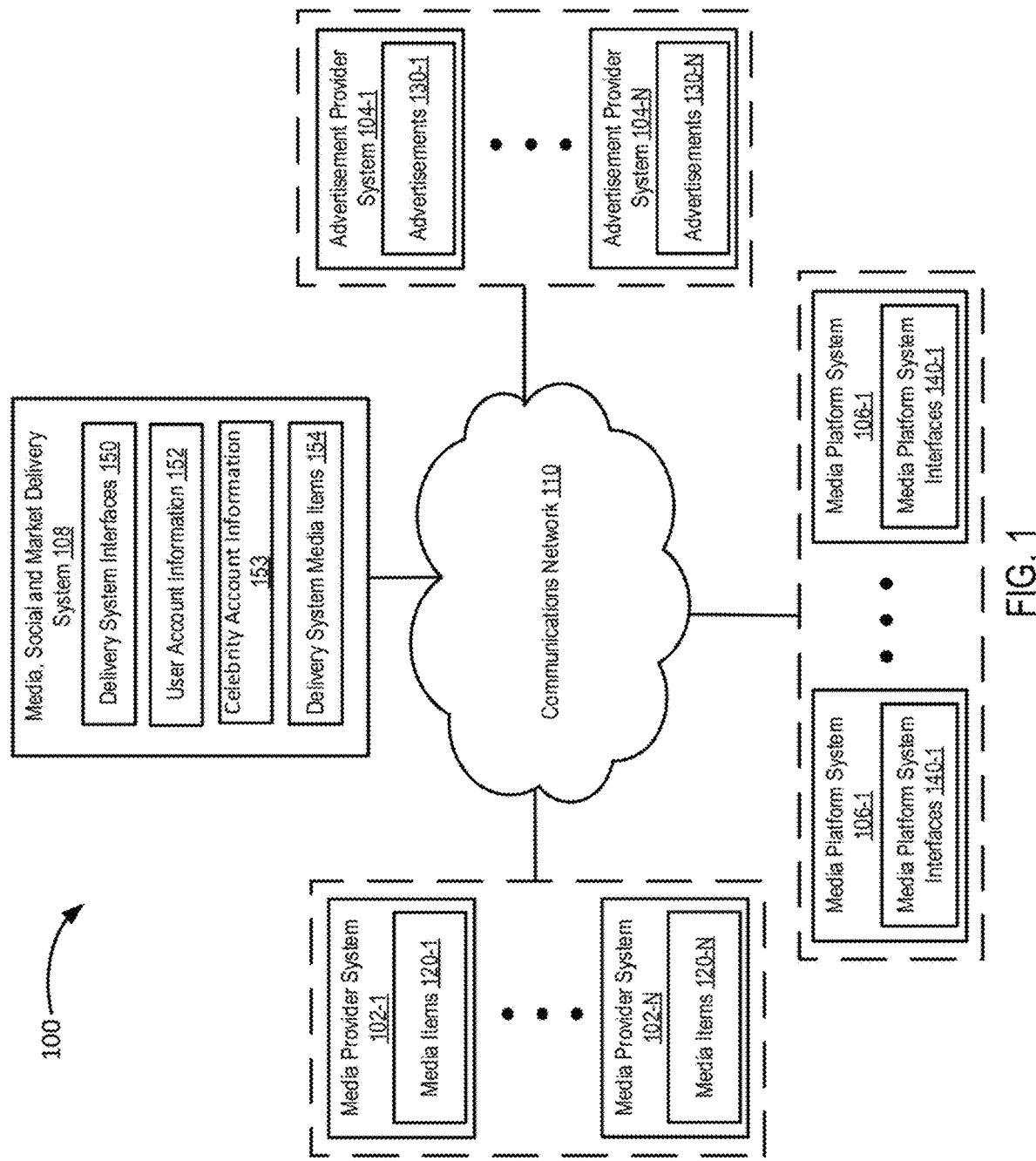
FIG. 1 illustrates a diagram of an example system for providing unified presentation of on-demand, live, social or market content according to some embodiments.

Embodiments of the current system are capable of providing users with a unified experience allowing users to perform a variety of different electronic activities within a unified platform. For example, the unified platform may comprise an agnostic operating system that may be incorporated within a set-top device, mobile device, computer, and/or the like.

In some embodiments, a system is provided that allows users to easily navigate through graphical user interfaces (or, "screens") to perform different electronic activities presented on a TV or other output system. Electronic activities (or, "activities") may include streaming live and/or on-demand media items (or, "content"), connecting and communicating with friends, purchasing products, receiving targeted advertisements, and/or performing other actions described elsewhere herein. In various embodiments, users may be able to perform any number of electronic activities within a single display screen (e.g., a TV screen) through a split presentation mode. For example, the system may provide separate windows within a single display screen (e.g., a TV screen) for performing different activities (e.g., streaming a live sporting event in a first window, and streaming an on-demand movie in a second window). The system may provide any number of such windows. These and other features are described further below.

In some embodiments, the system provides personal portals including a variety of associated graphical user interfaces. The personal portals may allow users to share their activities with other users, communicate with other users, and subscribe to and/or follow celebrity users. As used herein, celebrity users are associated with a corresponding celebrity (e.g., Robert Downey Jr) and/or entity (e.g., representative and/or organization) associated with the celebrity. Celebrity users may have to be pre-approved (e.g., by an administrator), and may access to different functionality than regular users. Celebrities may include actors, musicians, and/or other predetermined category meeting a threshold criteria (e.g., as defined by an administrator).

In some embodiments, the system provides celebrity portals to present exclusive content, endorse products (e.g., media content, physical goods), receive instant (or, near instant) compensation for products purchased the system (e.g., products they endorse, products presented through their portal, and/or the like). For example, the system may compensate celebrity users at the same time, or substantially same time, as a product is purchased through the system.

In some embodiments, the system may provide social networking features and/or monitoring of social networking features. For example, users may be able communicate with other users, share their activity, view other users activity (e.g., activities presented through personal portals and/or celebrity portals), and/or the like. Similarly, the system may monitor such features. The monitored information may be used to provide notifications (e.g., notify a user of a friend's activity), and perform related functionality.

FIG. 1 illustrates a diagram 100 of an example system for providing unified presentation of on-demand, live, social or market content according to some embodiments. In the example of FIG. 1, the system includes media provider systems 102-1 to 102-N (individually, the media provider system 102, collectively, the media provider systems 102), advertisement provider systems 104-1 to 104-N (individually, the advertisement provider system 104, collectively, the advertisement provider systems 104), media platform systems 106-1 to 106-N (individually, the media platform system 106, collectively, the media platform systems 106), media, social and market delivery system 108, and a communication network 110.

The media provider systems 102 may function to store and provide media items 120. As used herein, "media items" may be referred to simply as media, content, and/or content items. Media items 120 may include live, on-demand, stream-enabled, and/or broadcast media items For example, media items 120 may include movies, videos, music, games, pictures, images, text, social media feeds, audiovisual items, and/or other types of media items. In some embodiments, functionality of the media provider systems 102 are performed by one or more servers, workstations, desktop computers, laptop computers, mobile devices, or the like. In some embodiments, the media provider systems 102 comprise cloud-based systems. For example, the media provider systems 102 may comprise a Netflix, HBO NOW, and/or other remote systems.

The advertisement provider systems 104 may function to store and provide advertisements 130. For example, the advertisements 130 may include images, pictures, video, banners, logos, text, and/or the like. Advertisements may be presented during playback of media items 120, during user registration, login, and/or the like, as described elsewhere herein. In some embodiments, functionality of the advertisement provider systems 104 are performed by one or more servers, workstations, desktop computers, laptop computers, mobile devices, and/or the like. In some embodiments, the advertisement provider systems 104 comprise cloud-based systems.

The media platform systems 106 may function to provide a platform for presenting (e.g., streaming and/or otherwise playing back) media, allowing users to connect and communicate with friends, purchase products, and/or the like. As used herein, the term "media" may refer to media items 120, delivery system media items 154 (discussed elsewhere herein), and/or advertisements 130. In some embodiments, the media platform systems 106 may be incorporated within set-top devices, mobile devices, and/or other computing devices.

In some embodiments, the media platform systems 106 may include media platform system interfaces 140 to facilitate streaming and/or presenting media, and/or otherwise communicating with one or more remote systems (e.g., the media provider systems 102, the advertisement provider systems 104, the media, social and market delivery system 108, and/or the like). The interfaces described herein may include application programming interfaces (APIs), software development kits (SDKs), source code, machine code, and/or server stubs.

Figure 4:
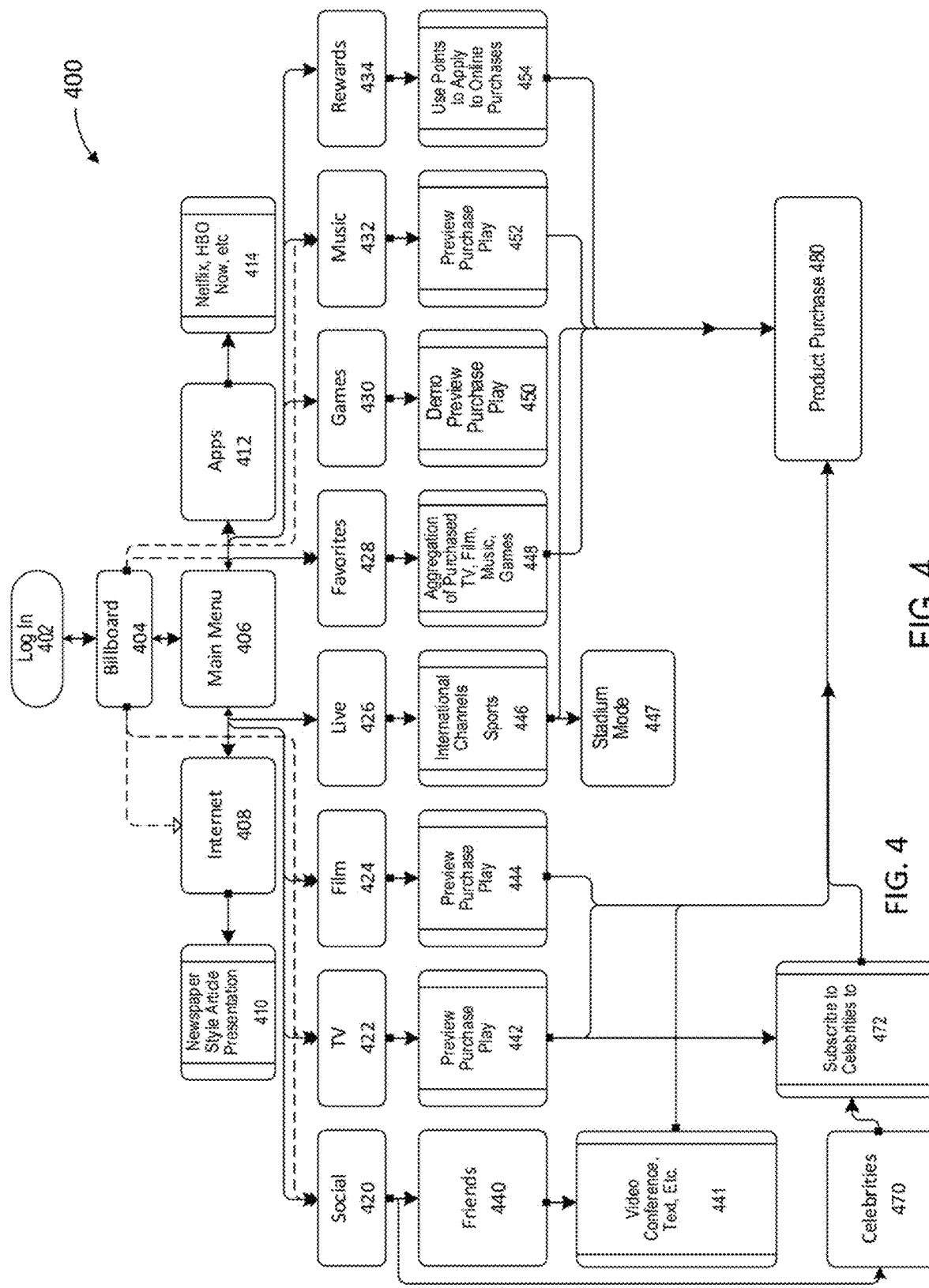
FIG. 4 illustrates a flowchart of an example graphical user interface navigational flow of a media platform system according to some embodiments.

In some embodiments, a media platform system 106 generates and/or otherwise provides an interactive programming guide capable of presenting graphical user interfaces through which a user may navigate to various screens to perform electronic activities. The individual graphical user interfaces may be context-based. For example, the interactive programming guide may generate graphical user interfaces based on user account information 152, celebrity account information 153, and/or currently available features (e.g., features requiring a network may be presented only if an active network connection is detected), as discussed elsewhere herein. An example flow capable of being generated and/or navigated by the interactive programming guide is shown in FIG. 4.

In some embodiments, a media platform system 106 generates a billboard graphical user interface (or, simply, "billboard" or "billboard screen"). The media platform system 106 may dynamically generate the billboard screen in response to a user logging in to a media platform system 106 (e.g., by entering username/password credential that a verified by the media, social and market delivery system 108). Since it is dynamically generated, different users, or the same user logging in at different times, may be presented with a different billboard screen. In some embodiments, the billboard screen is capable of providing a user with media options that are associated with the user and enables the user to more efficiently proceed to screens and/or media items that the user is interested in. In one embodiment, the billboard screen is displayed before a main menu screen is displayed.

In some embodiments, a media platform system 106 functions to generate context-specific graphical user interface navigation tools. For example, the media platform system 106 may generate a smart bar for display on a suitable output subsystem of the media platform system 106 (e.g., a TV). In one example, the smart bar may be a content-specific graphical user interface that dynamically changes display media therein based on media presented to a user. The smart bar is formed in an applicable direction depending on various criteria. For example, the smart bar extends horizontally or vertically depending on an aspect ratio of a display device for displaying media content. In another example, the smart bar extends horizontally or vertically depending on user setting. In still another example, the smart bar is formed in a fixed direction. Further, the smart bar is positioned at an applicable position depending on various criteria. For example, the smart bar is positioned at a bottom edge or a top edge of the entire screen depending on media content to be displayed on the main screen. In another example, the smart bar is positioned at a user-specified position. In still another example, the smart bar is positioned at a fixed position. Moreover, the smart bar is in an applicable size depending on various criteria. For example, the smart bar is in an applicable size depending on various criteria. For example, the smart bar is in a full screen size (e.g., extending the entire screen) or in a smaller screen size (than the full screen size) depending on media content displayed on the main screen. In another example, the smart bar is in a user-specified size. In still another example, the smart bar is in a fixed size.

In some embodiments, a media platform system 106 functions to present on-demand and/or live media items 120 (e.g., a basketball game). The media platform system 106 may also provide a "stadium mode" that enables a user to watch media items 120 without advertisement interruption in a main screen, and provides an advertisement item 130 in a different portion of the screen (e.g., a portion dedicated to a banner advertisement 130). In one embodiment, the stadium mode can be activated by selecting a selectable object corresponding to the stadium mode in a smart bar. In some embodiments, the portion of the presented media item 120 that would typically be associated with a commercial break, or other advertisement break, can be associated with other media (e.g., a live feed of an arena during a basketball game, sideline interviews, and/or the like) while in stadium mode.

In some embodiments, the media platform system 106 functions to provide split presentation capabilities. Generally, split presentation allows the user to view multiple activities within a single display screen (e.g., TV screen). For example, one or more activities may be presented in different portions (e.g., windows) of the same display screen. It will be appreciated that any of the functionalities described herein (e.g., streaming, stadium mode, smart bar, and/or the like) may be performed simultaneously and/or in parallel using split presentation. In one example, a first window may display a movie, while a second window may display a sports program. Any number of such windows may be provided. In some embodiments, each portion of the split presentation may be executed by a different thread and/or set of threads. This may allow, for example, faster and/or more efficient execution of split presentation.

In some embodiments, a media platform system 106 functions to overlay media. For example, a user may select a first media stream (e.g., a video of a basketball game) and overlay and/or combine one or more additional media streams with the first media stream (e.g., music, third-party audio commentary, and/or the like). This may allow, for example, the user to achieve a more customized experience. For example, the user may view a live basketball and listen to audio commentary provided by a third-party instead of the audio commentary provided with the first video stream.

The media, social and market delivery system 108 may function to facilitate provision of media to media platform systems 106. In some embodiments, functionality of the media, social and market delivery system 108 is performed by one or more servers, workstations, desktop computers, laptop computers, mobile devices, and/or the like. In some embodiments, the media, social and market delivery system 108 comprises a cloud-based system. In some embodiments, the media, social and market delivery system 108 utilizes one or more delivery system interfaces 150 to facilitate communication between media provider systems 102, advertisement provider systems 104, and/or media platform systems 106.

In some embodiments, the media, social and market delivery system 108 stores user account information 152. The user account information 152 may be associated with users of the media platform systems 106. For example, the user account information 152 may include account name, account credentials (e.g., username/password), account subscriptions (e.g., HBO subscription), purchased media (e.g., movies) viewing history, linked social media accounts, and/or the like. The user account information 152 may be used to authenticate users logging in to media platform systems 106, determine targets advertisements 130 to display, specific billboard configurations, and/or the like. The user account information 152 may be used to generate personal portals.

In some embodiments, the media, social and market delivery system 108 stores user celebrity account information 153. The celebrity account information 153 may be associated with celebrity users of the media platform systems 106. For example, the celebrity account information 153 may include celebrity account name, celebrity account credentials (e.g., username/password), celebrity activities, celebrity communications (e.g., instant communications with other celebrity users), endorsed content, linked social media accounts, and/or the like. The celebrity account information 153 may be used to authenticate celebrity users logging in, determine targets advertisements 130 to display on their celebrity portals, and/or the like. The celebrity account information 153 may be used to generate celebrity portals.

In some embodiments, the media, social and market delivery system 108 functions to store and/or provide delivery system media items 154. The delivery system media items 154 may comprise the same type of media items 120 and/or may comprise other types of media. For example, the delivery system media items 154 may comprise media to be inserted and/or otherwise presented at particular times during stadium mode (e.g., when a commercial break would typically be presented).

The communications network 110 may represent one or more computer networks (e.g., LAN, WAN, or the like) or other transmission mediums. The communication network 110 may provide communication between systems 102-108 and/or components (e.g., engines, datastores) thereof. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
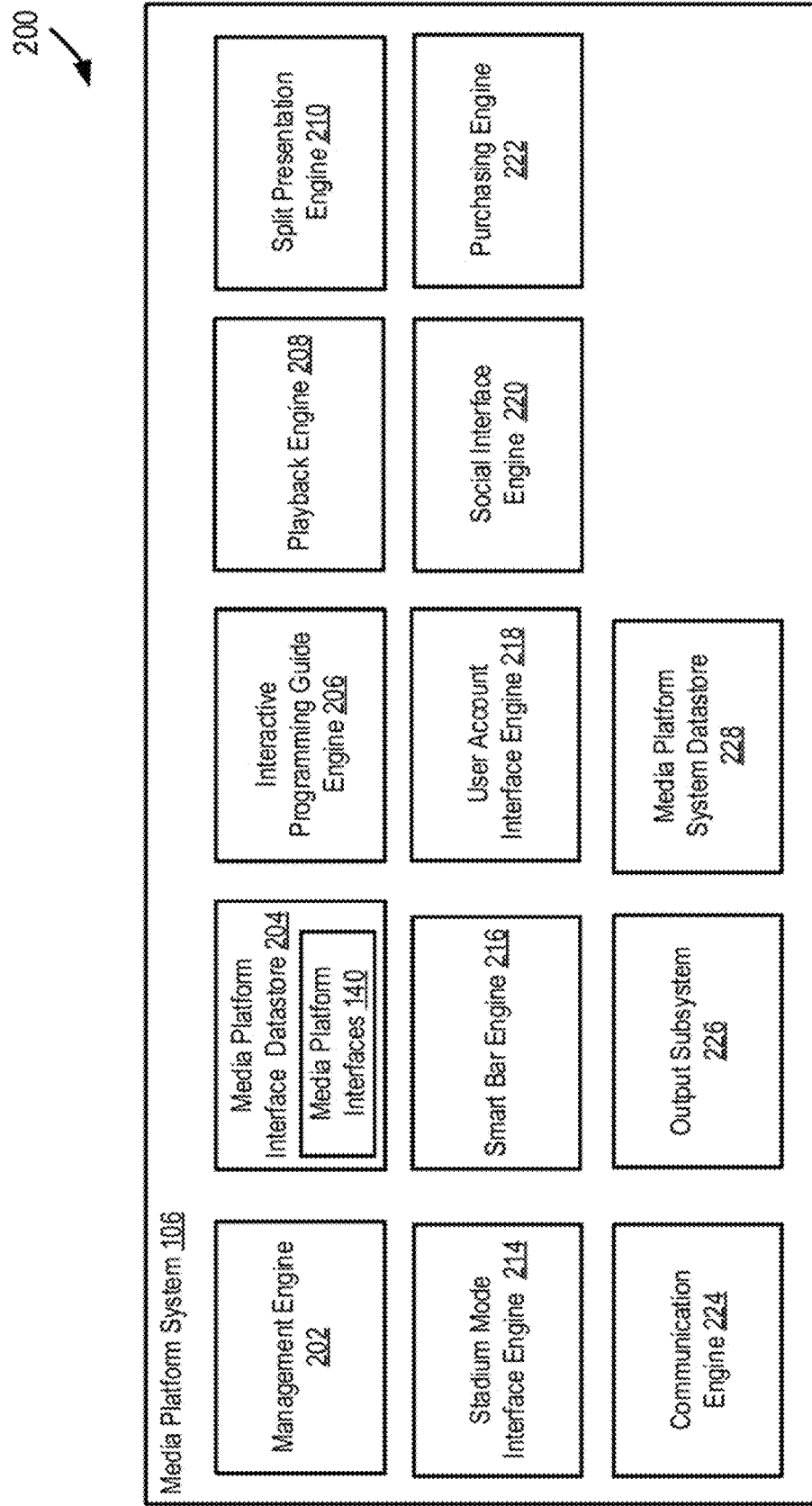
FIG. 2 illustrates a diagram of an example of an media platform system according to some embodiments.

FIG. 2 illustrates a diagram 200 of an example of an media platform system 106 according to some embodiments. In the example of FIG. 2, the media platform system 106 includes a management engine 202, media platform interface datastore 204, an interactive programming guide engine 206, a playback engine 208, a split presentation engine 210, a stadium mode interface engine 214, a smart bar engine 216, a user account interface engine 218, a social interface engine 220, a purchasing engine 222, a communication engine 224, an output subsystem 226, and a media platform system datastore 228.

The management engine 202 may function to manage (e.g., create, read, update, delete, or otherwise access) information. For example, the management engine 202 may function to manage media platform interfaces 140 stored in the media platform interface datastore 204, and/or other information stored temporarily (e.g., cached) and/or persistently by the media platform system 106 (e.g., by the media platform system datastore 228). The management engine 202 may perform any of these operations manually (e.g., by a user interacting with a GUI) and/or automatically (e.g., triggered by one or more of the engines 206-224, discussed herein). In some embodiments, the management engine 202 comprises a library of executable instructions, which are executable by one or more processors for performing any of the aforementioned management operations. Like the other engines described herein, some or all of the functionality of the management engine 202 may be implemented and/or included within one or more other engines and/or systems.

The interactive programming guide engine 206 may function to generate an interactive programming guide. The interactive programming guide engine 206 may function to generate graphical user interfaces and navigation flow for the features and/or graphical user interfaces described herein. For example, the interactive programming guide engine 206 may provide login graphical user interfaces, a billboard screen, a main menu screen, channel guide listings, television listings, movie listings, live media listings, favorites listings, games listings, music listings, friends listings, and/or the like. The interactive programming guide engine 206 may generate graphical user interfaces based on user account information 152, media provider information, and/or the like. An example navigational flow facilitated by the interactive programming guide engine 206 is shown in FIG. 4.

In some embodiments, the interactive programming guide engine 206 function to generate a billboard graphical user interface (or, simply, "billboard" or "billboard screen"). The media platform system 106 may dynamically generate the billboard screen in response to a user logging in to media platform system 106 (e.g., by entering username/password credentials that are verified by the media, social and market delivery system 108). Since it is dynamically generated, different users, or the same user logging in at different times, may be presented with a different billboard screen. In some embodiments, the billboard screen is capable of providing a user with media options that are associated with the user and enables the user to more efficiently proceed to media items and/or screens that the user is interested in. In one embodiment, the billboard screen is displayed before a main menu screen is displayed.

The playback engine 208 may function to playback media. The playback engine 208 may playback on-demand and/or live media. For example, the playback engine 208 may playback movies, music, live sporting events, and/or the like, for presentation through the output subsystem 226. The output subsystem 226 may comprise a TV display or other presentation device (e.g., computer screen, mobile device screen). Although the output subsystem 226 is shown as part of the media platform system 106, it will be appreciated that in some embodiments, the output subsystem 226 may not be included in the media platform system 106 (e.g., the media platform system 106 may connect to an output system or subsystem). The playback engine 208 may stream content in real-time, and/or decompress compressed media. In some embodiments, the playback engine 208 may execute one or more media streams simultaneously and/or in parallel (e.g., layered streams).

The split presentation engine 210 may function to provide split presentation capabilities. Generally, split presentation allows the user to view multiple activities within a single display screen (e.g., TV screen). For example, one or more activities may be presented in different portions (e.g., windows) of the same display screen. It will be appreciated that any of the functionalities described herein (e.g., streaming, stadium mode, smart bar, and/or the like) may be performed simultaneously and/or in parallel using split presentation. In one example, a first window may display a movie, while a second window may display a sports program. Any number of such windows may be provided. In some embodiments, each portion of the split presentation may be executed a different thread and/or set of threads. This may allow, for example, faster and/or more efficient execution of split presentation.

The stadium mode interface engine 214 may function to provide a "stadium mode" that enables a user to be presented with media without advertisement interruption in a main screen, and provides an advertisement item in a different portion of the screen (e.g., a portion dedicated to a banner advertisement). In one embodiment, the stadium mode can be activated by selecting a selectable object corresponding to the stadium mode in a smart bar. In some embodiments, the portion of the presented media item that would typically be associated with a commercial break, or other advertisement break, can be associated with other media (e.g., a live feed of an arena during a basketball game, sideline interviews, and/or the like) while in stadium mode.

The smart bar engine 216 may function to generate context-specific graphical user interface navigation tools. For example, the media platform system 106 may generate a smart bar for display on a suitable output subsystem of the media platform system 106 (e.g., a TV). In one example, the smart bar may be a content-specific graphical user interface that dynamically changes display media therein based on media presented to a user. The smart bar may formed in an applicable direction depending on various criteria. For example, the smart bar may extend horizontally and/or vertically depending on an aspect ratio of a display device for displaying media content. In another example, the smart bar extends horizontally or vertically depending on user setting. In still another example, the smart bar is formed in a fixed direction. Further, the smart bar is positioned at an applicable position depending on various criteria. For example, the smart bar is positioned at a bottom edge or a top edge of the entire screen depending on media content to be displayed on the main screen. In another example, the smart bar is positioned at a user-specified position. In still another example, the smart bar is positioned at a fixed position.

Moreover, the smart bar is in an applicable size depending on various criteria. For example, the smart bar is in an applicable size depending on various criteria. For example, the smart bar is in a full screen size (e.g., extending the entire screen) or in a smaller screen size (than the full screen size) depending on media content displayed on the main screen. In another example, the smart bar is in a user-specified size. In still another example, the smart bar is in a fixed size.

The user account interface engine 218 may function to receive and/or provide user account information. For example, the user account interface engine 218 may present graphical user interface(s) prompting a user to input user account information during registration, login, account updating, and/or the like. The user account information may be provided to a remote system (e.g., media, social and market delivery system 108) over a communication network (e.g., communication network 110).

The social interface engine 220 may function to receive and/or provide social media information. For example, the social interface engine 220 may cooperate with a remote server system (e.g., media, social and market delivery system 108) to present social media feeds and communications, communications with friends, and/or the like.

In some embodiments, the social interface engine 220 is configured to generate a friend request based on user interaction with the media platform system 106 and cause the communication engine 224 to transmit the generated friend request to one or more media platform systems 106. In some embodiments, the social interface engine 220 is configured to receive friend request(s) transmitted from one or more other media platform systems 106 through the communication engine 224 and generate a notification of the friend request to a user on a graphical user interface displayed on the output subsystem 226. In some embodiments, the social interface engine 220 is configured to generate an acceptance message upon user acceptance of the friend request on a graphical user interface displayed on the output subsystem 226 and cause the communication engine 224 to transmit to the acceptance message to the one or more other media platform systems 106 from which the friend request has been transmitted. Upon acceptance of a friend request, a user who sent the friend request and a user who accepted the friend request are connected as friends with each other. In a specific implementation, the information of the friend connection is stored in applicable datastore, such as datastore in the media, social, market delivery system 108 and/or datastores in each of the media platform systems 106 that have communicated for friend connection.

In some embodiments, the social interface engine 220 is configured to generate a graphical user interface for searching friends to be displayed on the output subsystem 226, and perform friend search based on user input of search keys and registered information of users. For example, the search keys may include one or more of name (real user name), user name on the system, user ID, phone number, email address, mail address, affiliated organization (e.g., school, company, local community clubs, etc.), user photo, and so on. In some embodiments, registered information of users used for the friend search may be limited to authorized information by each user. For example, when a user does not allow the user's email address to be used for friend search, the social interface engine 220 does not use the user's email address for the friend search.

The purchasing engine 222 may function to receive, process, and/or provide user input and related data regarding purchases (e.g., media purchases, physical goods purchases). The purchasing engine 222 may coordinate with one or more other engines (e.g., interactive programming guide engine 206, playback engine 208) to receive and/or provide user input regarding purchases (or, "purchase information") without leaving a currently displayed screen. For example, a user viewing a basketball game may purchase a physical good (e.g., shoes) without leaving the screen displaying the basketball game. This may, for example, improve engagement with the platform.

The communication engine 224 may function to send requests, transmit and, receive communications, and/or otherwise provide communication with one or a plurality of systems (e.g., systems 102-108). In some embodiments, the communication engine 224 functions to encrypt and decrypt communications. The communication engine 224 may function to send requests to and receive data from one or more systems through a network or a portion of a network. Depending upon implementation-specified considerations, the communication engine 224 may send requests and receive data through a connection, all or a portion of which may be a wireless connection. The communication engine 224 may request and receive messages, and/or other communications from associated systems. Communications may be stored at least temporarily (e.g., cached and/or persistently) in the media platform system datastore 228.

Figure 3:
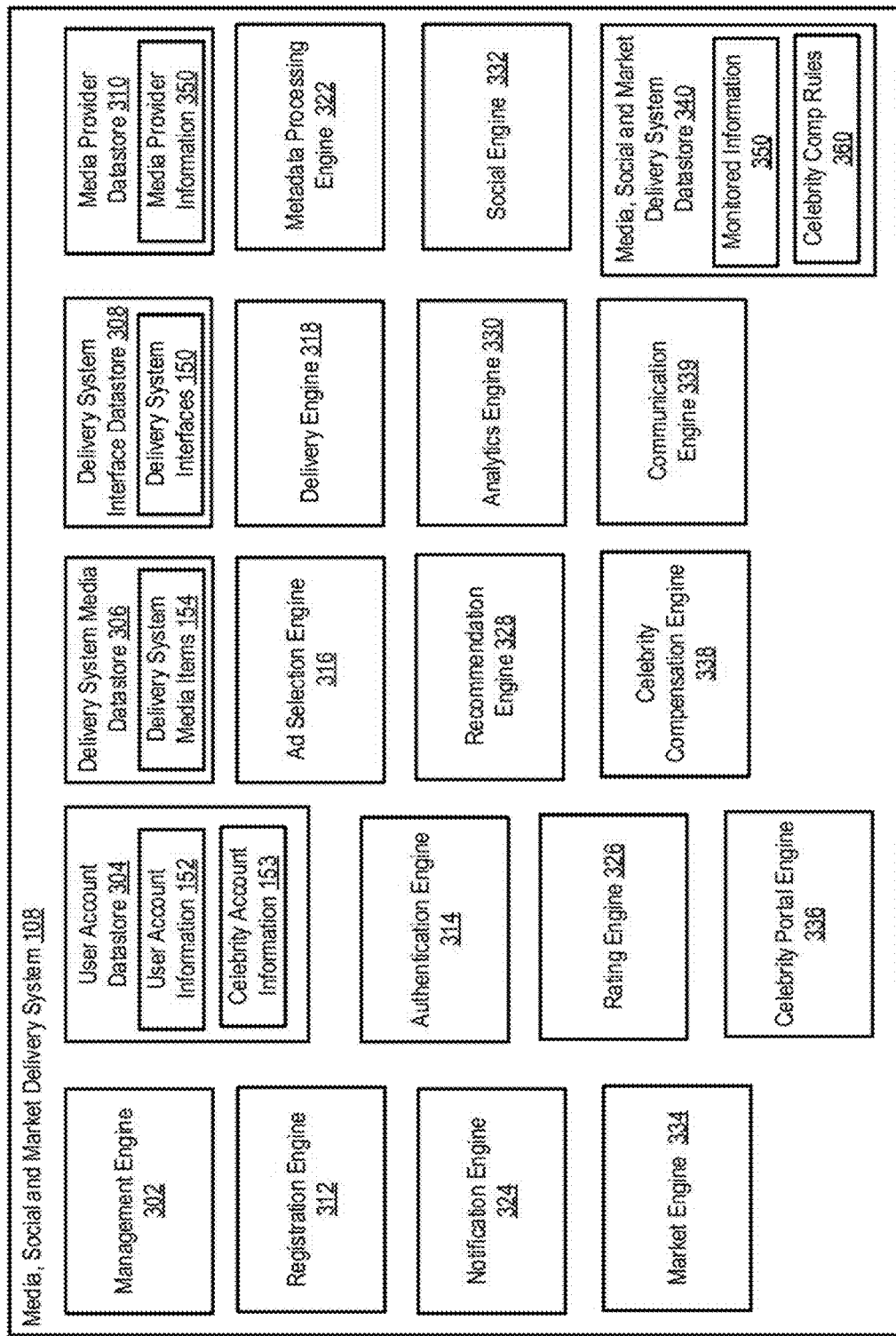
FIG. 3 illustrates a diagram of an example of a media, social and market delivery system according to some embodiments.

FIG. 3 illustrates a diagram 300 of an example of a media, social and market delivery system 108 according to some embodiments. In the example of FIG. 3, the media, social and market delivery system 108 includes a user account datastore 304, a delivery system datastore 306, a delivery system interface datastore 308, an media provider datastore 310, a registration engine 312, an authentication engine 314, an advertisement selection engine 316, a delivery engine 318, a metadata processing engine 322, a notification engine 324, a rating engine 326, a recommendation engine 328, an analytics engine 330, a social engine 332, a market engine 334, a celebrity portal engine 336, a celebrity compensation engine 338, and a media, social and market delivery system datastore 340.

The management engine 302 may function to manage (e.g., create, read, update, delete, or otherwise access) information. For example, the management engine 202 may function to manage user account information 152 and/or celebrity account information 153 stored in the user account datastore 304, delivery system media items 154 stored in the delivery system media datastore 306, delivery system interfaces 150 stored in the delivery system interface datastore 308, media provider information 350 stored in the media provider datastore 310, and/or other information stored temporarily (e.g., cached) and/or persistently by the media, social and market delivery system 108 (e.g., by the media, social and market delivery system datastore 340). The management engine 302 may perform any of these operations manually (e.g., by a user interacting with a GUI) and/or automatically (e.g., triggered by one or more of the engines 312-338, discussed herein). In some embodiments, the management engine 302 comprises a library of executable instructions, which are executable by one or more processors for performing any of the aforementioned management operations.

The user account information 152 may include a variety of data related to user accounts. For example, user account information 152 may include authentication credentials for logging a user into a media, social and market delivery system and/or media platform system 106, and/or other user account information. In some embodiments, the user account information 152 may include some or all of the following:

User Account Identifier: identifies the user account.
User Account Authentication Credentials: Username, password, and/or other authentication credentials (e.g., for multi-factor authentication).
Name: name of user (e.g., Jason Smith).
Mailing Address: mailing address of user.
Email address: email address of user.
Screenname: displayed screenname of user.
Subscriptions: subscriptions to media services (e.g., Netflix, HBO), celebrities, etc.
Media Purchases: purchased movies, television shows, music, games, and/or other media.
Favorites: favorite movies, television shows, music, games, and/or other media.
Friends: list and/or other structure of connections. Friends may comprise a tiered or other hierarchy of connections. For example, friends may be limited to only close connection (e.g., family member, close friend, etc.).
Product Purchases: products (e.g., media items, physical goods) purchased through the platform.
Linked Accounts: linked third-party accounts, such as social media accounts (e.g., Twitter), financial accounts, etc.
Communications: communication history with friends, celebrities, social media, etc.
Ratings: ratings associated with media (e.g., a thumbs up/thumbs down).
Recommendations: current and/or historical media recommendations. For example, movies that are currently recommended (e.g., based on ratings) and/or movies that have previously been recommended.
Notifications: notification and/or other messages. For example, messages received from friends, notifications regarding subscriptions, notification of events (e.g., upcoming live events).

The celebrity account information 153 may include a variety of data related to celebrity user accounts (or, simply, "celebrity users" or "celebrities"). For example, celebrity account information 153 may include authentication credentials for logging a celebrity user into a media, social and market delivery system and/or media platform system 106, and/or other user account information. In some embodiments, the celebrity user account information 153 may include some or all of the following:

Celebrity User Account Identifier: uniquely identifies the celebrity user account.
Celebrity Name: name of user (e.g., Robert Downey Jr).
Mailing Address: mailing address of celebrity user.
Email address: email address of celebrity user.
Screenname: displayed screenname of celebrity user.
Subscriptions: subscriptions to media services (e.g., Netflix, HBO), celebrities, etc.
Media Purchases: purchased movies, television shows, music, games, and/or other media.
Favorites: favorite movies, television shows, music, games, and/or other media.
Friends: list and/or other structure of connections. Friends may comprise a tiered or other hierarchy of connections. For example, friends may be limited to only close connection (e.g., family member, close friend, etc.). Friends may be limited to other celebrities.
Product Purchases: products (e.g., media items, physical goods) purchased through the platform.
Linked Accounts: linked third-party accounts, such as social media accounts (e.g., Twitter), financial accounts, etc.
Communications: communication history with friends, celebrities, social media, etc.
Ratings: ratings associated with media (e.g., a thumbs up/thumbs down).
Recommendations: current and/or historical media recommendations. For example, movies that are currently recommended (e.g., based on ratings) and/or movies that have previously been recommended.
Notifications: notification and/or other messages. For example, messages received from friends, notifications regarding subscriptions, notification of events (e.g., upcoming live events).
Activities: current and/or historical activities (e.g., media content consumed, communications, content/goods sold)
Subscribers: users subscribed to the celebrity user.
Compensation Rules: predetermined and/or negotiated compensation rules.
Compensation Account: system account and/or third-party accounts to receive celebrity compensation.

Endorsed Items

Exclusive Content: content (e.g., a celebrity "channel") exclusive to the celebrity (e.g., that may be presented through their celebrity portal).

The media provider information 350 may include a variety of data related to media providers (e.g., Netflix, HBO). For example, the media provider information 350 may be used to authenticate access and/or register for subscriptions, purchase media, and/or the like. In some embodiments, the media provider information 350 may include some or all of the following:

Media Provider: identifies the media provider.

Location: identifies a URI or other electronic location of the media provider and/or associated systems.

Services: services (e.g., subscriptions) provided by the media provider.

Subscribed users: user accounts of the of the media, social and market delivery system 108 associated with the service(s).

The registration engine 312 may function to register user accounts and media providers. For example, registration engine 312 may receive user account information 152 and create and/or update records in the user account datastore 304, receive media provider information 350 and crate and/or update records in the media provider datastore 310, and so forth.

The authentication engine 314 may function to authenticate user account login requests, subscriptions, and/or other requests. For example, the authentication engine 314 may authenticate a user login request received from a media platform system 106, authenticate a request to view a subscription service to Netflix in response to a user attempting to access Netflix on the media platform system 106.

The advertisement selection engine 316 may function to select advertisements, and/or facilitate selection of advertisements, for presentation by remote systems (e.g., media platform system 106). In some embodiments, the advertisement selection engine 316 may select advertisements based on user account information 152, and/or coordinate with a third-party service to select advertisements. Selected advertisements may be used for generating billboard screens, presenting banner advertisements during stadium mode, and/or the like.

The delivery engine 318 may function to provide media to remote systems (e.g., media platform systems 106). For example, the delivery system 318 may deliver media items 120 and/or advertisements 130 received from remote systems (e.g., media provider systems 102, advertisement provider systems 104). In some embodiments, the delivery system 318 may provide delivery system media items 154 and/or other media (e.g., during stadium mode viewing). For example, the delivery system 318 may detect a flag or other indicator during a media stream, provide the delivery system media items 154 and/or other media for a period of time, and return the media stream after conclusion of the delivery system media items 154 and/or other media.

The metadata processing engine 322 may function to process metadata received from third-party systems. For example, the metadata processing engine 322 may receive channel guide listing metadata from HBO or other remote system in a format native to the origin system (e.g., an HBO format). The metadata processing engine 322 may translate the metadata into a playlist or other format capable of being processed by media platform systems 106. The processed metadata may be provided with a media streams in order for the media streams to be properly formatted and presented by the media platform systems 106.

The notification engine 324 may function to generate and/or store alerts and/or other notifications in one or more datastores (e.g., media, social and market delivery system datastore 340). Notifications may include communications with friends, administrators; communications related to subscriptions and/or purchases; and/or the like. The notification engine 324 may provide notifications to one or more remote systems (e.g., media platform systems 106).

The rating engine 326 may function to rate media automatically and/or in response to user input. For example, the rating engine 326 may rate movies according to a thumbs up/thumbs down rating system, star rating system, and/or the like. In another example, the rating engine 326 may rate media automatically based on user activity (e.g., the movies watched, tv watched, duration of time spent watching particular movies and/or types of movies, and/or the like).

The recommendation engine 328 may function to suggest media that may be of interest to a user. For example, the recommendation engine 328 may suggest media based on historical activities performed by the user and/or other user account information 152. The recommendation engine 328 may provide suggestions in a recommendation graphical user interface and/or based on context. For example, if a user historically watches a type of media (e.g., live Warriors basketball games) above a predetermined threshold level (e.g., greater than 25% of the live games), the recommendation engine 328 may prompt the user (e.g., via a notification issued by the notification engine 324) regarding one or more Warriors basketball games that are available for viewing (e.g., within a predetermined amount time before start of the game).

The analytics engine 330 may function to analyze user activity based on user account information 152 and/or other information. The analysis may be used to provide targeted advertisements, help inform the recommendation engine 328 and/or rating engine 326, and/or the like.

Figure 27:
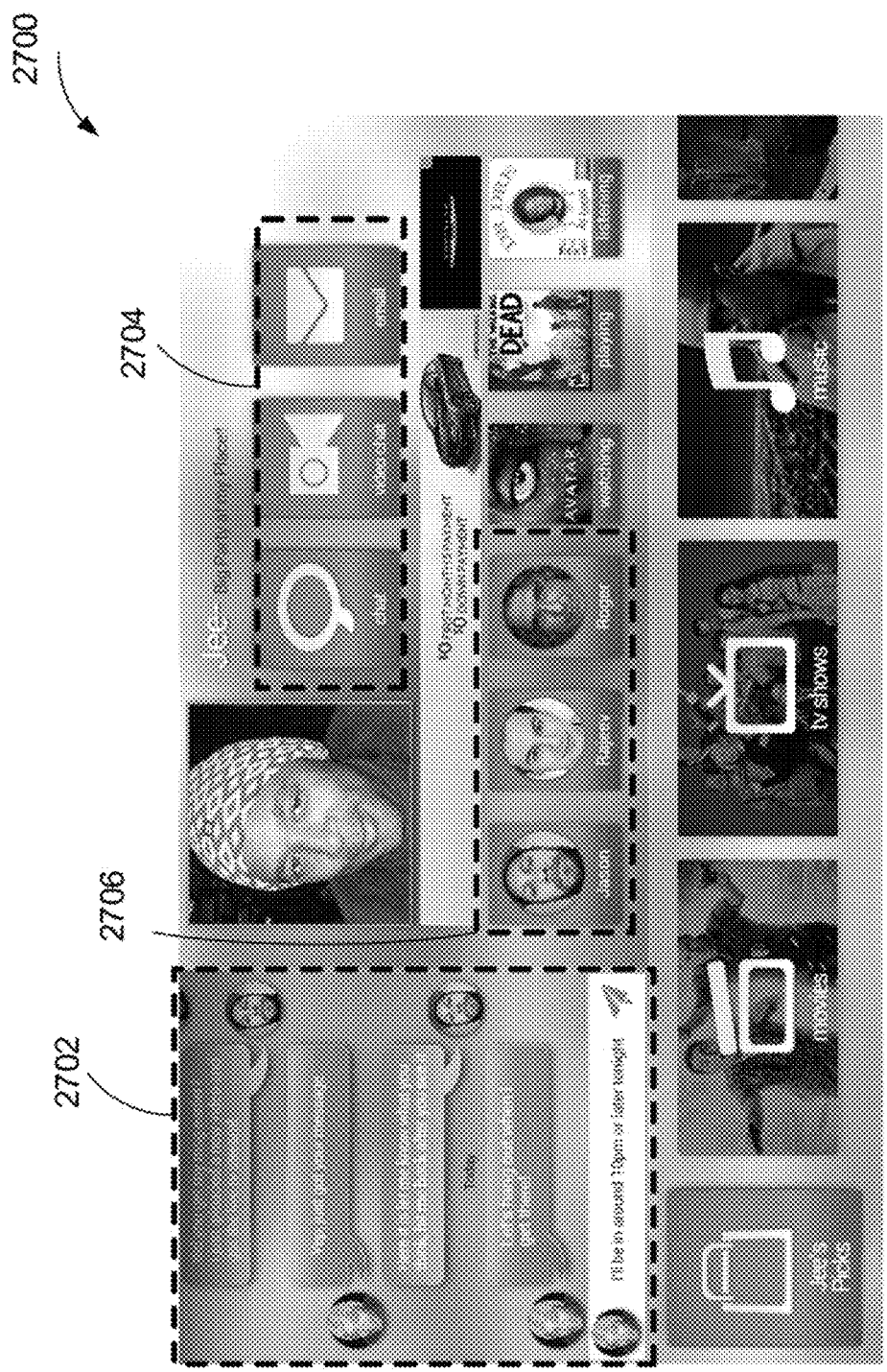
Figure 28:
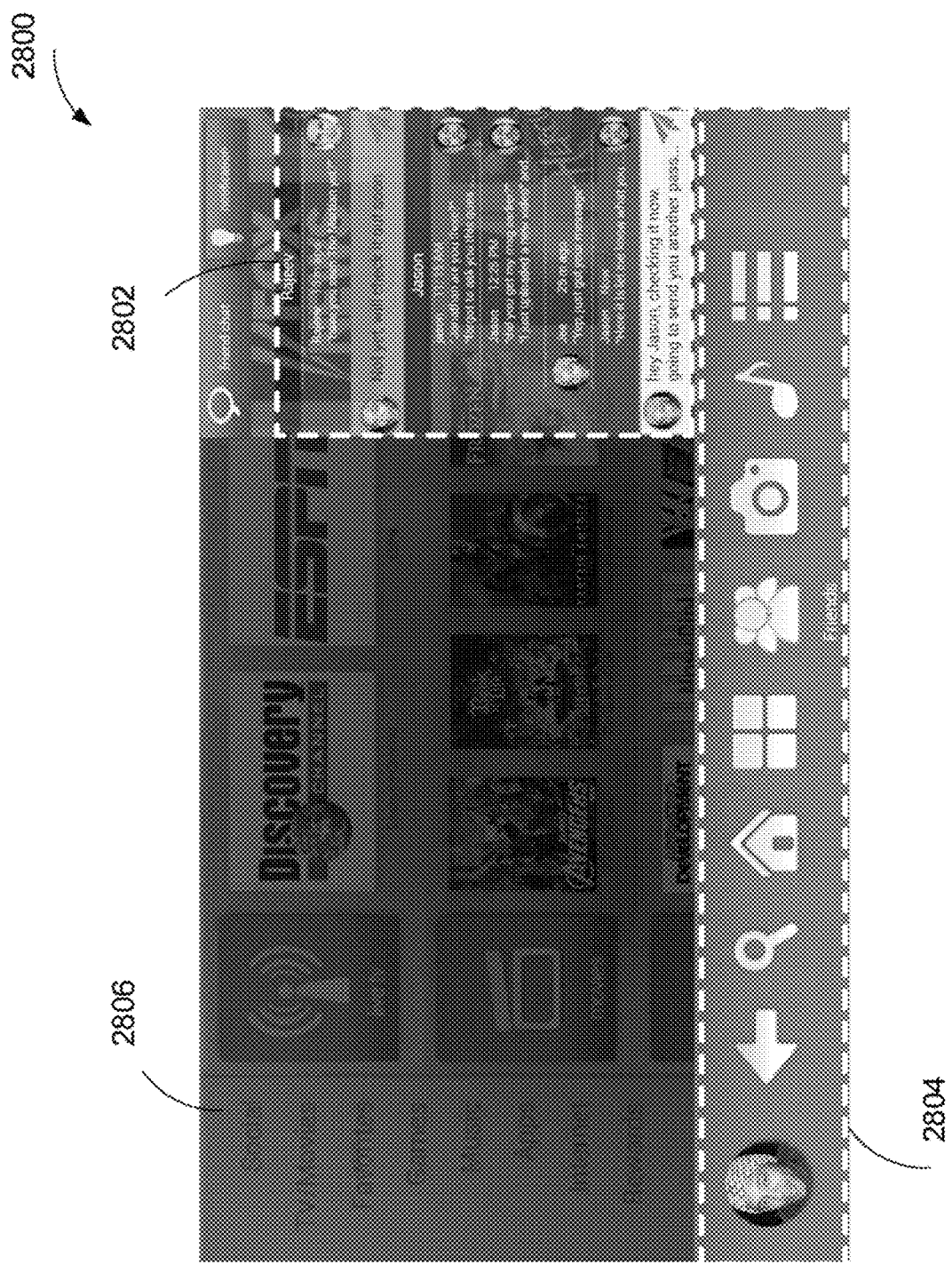
Figure 29:
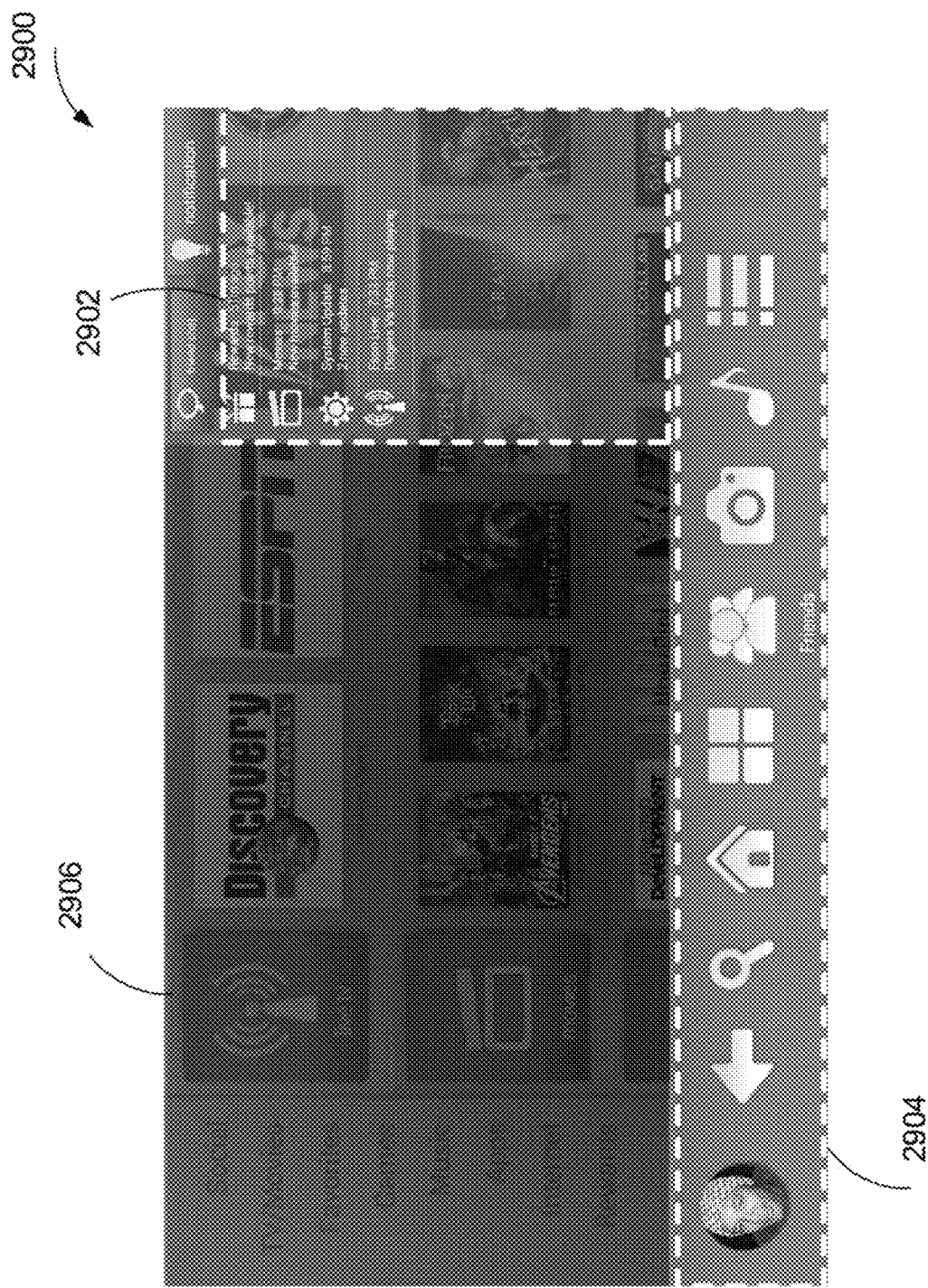
Figure 36:
FIG. 36 illustrates an example screen of a limited celebrity portal interface.

The social engine 332 may function to provide server-side functionality to provide social functions described herein. For example, the social engine 332 may cooperate with the social interface engine 220 to provide, store, and/or manage communications between friends and/or other connections. The social engine may provide personal portals (e.g., as shown in FIGS. 27-29) and/or celebrity portals (e.g., as shown in FIGS. 36-38).

In some embodiments, the social engine 332 may function to monitor user activity (e.g., social network activity) among users and/or celebrities. Monitored information 350 may be stored in the media, social and market delivery system datastore 340. Monitored information 350 can include instant communications, user activity, user consumption (e.g., of media and/or physical goods), purchase history, and/or the like.

The market engine 334 may function to provide a marketplace for users to purchase media, physical goods, and/or other products. Functionality of the marketplace may be integrated into one or more other features described herein. For example, the market engine 334 may allow a user viewing on-demand media to purchase products without leaving the screen presenting the on-demand media. The market engine 334 may interface with one or more systems to processes purchases (e.g., credit card systems, PayPal, cryptocurrency systems, and/or the like) through the system 300.

The celebrity portal engine 336 may function to present a portal for celebrities and/or other types of specialized users. For example, celebrity portals may a allow an actor (e.g., Jamie Foxx) to advertise products, provide customized media streams (e.g., live and/or on-demand), share their viewing and/or other activity (e.g., communications with other celebrities) with subscribers. In some embodiments, celebrity portal engine 336 functions to analyze a screen displayed on the display screen to determine products associated with a celebrity, such as clothing or accessories that the celebrity is wearing on the screen. The celebrity portal engine 336 may coordinate with metadata processing engine 322 to generate icons displaying physical goods or media goods, associated with the celebrity and send this to the playback engine 208 to allow a user viewing celebrity media, live or on-demand, to purchase products associated with the celebrity without leaving the screen presenting the celebrity media.

The celebrity compensation engine 338 may function to automatically compensate celebrities for activities performed by users with respect to their celebrity portal. For example, the celebrity compensation engine 338 may provide a portion of revenue generated from the purchase of goods through their portal directly to an account associated with the celebrity. This may allow, for example, celebrities to be quickly and efficiently compensated for endorsed products. In some embodiments, celebrity compensation is determined and/or provided based on one or more celebrity compensation rules 360. Celebrity compensation rules 360 may be stored in the media, social and market delivery system datastore 340.

Celebrity compensation rules 360 may define rules to facilitate real-time and/or near real-time payment to celebrity users for purchases through the system 108. For example, celebrity users may be compensated at substantially the same time as a purchase is processed and/or when a user pays for a purchase (e.g., of media content and/or physical goods). Compensation may be based on a percentage (e.g., 5%) of the sale amount, and may be negotiated by the celebrity user. The compensation amount may be based on a number of subscribers a celebrity has. For example, celebrities with a higher number of subscribers may receive a larger percentage of the purchase amount.

In some embodiments, multiple celebrities may be compensated for a single item. For example, a product purchased through a first celebrity portal may provide compensation to the first celebrity, and other celebrities along a link path to that purchase may also be compensated. For example, the link path may be the celebratory portals and/or other interfaces of the system 302 that lead to the purchase by the user. The link path may be limited by the number of hops (e.g., interfaces/portals visited) and/or time (e.g., within 5 minutes before the purchase). For example, a user may visit a first celebrity portal, select a celebrity friend from the celebrities friend list, visit the celebrity portal of the celebrity friend, and make the purchase through the celebrity portal of the friend. The first celebrity may be compensated (e.g., in addition to the celebrity friend).

In some embodiments, embodiments, celebrities may be compensated for endorsed products. For example, a celebrity may endorse a pair of shoes, and anytime a those pair of shoes are sold through the system 302, the celebrity may be compensated.

The communication engine 339 may function to send requests, transmit and, receive communications, and/or otherwise provide communication with one or a plurality of systems (e.g., systems 102-108). In some embodiments, the communication engine 339 functions to encrypt and decrypt communications. The communication engine 339 may function to send requests to and receive data from one or more systems through a network or a portion of a network.

Depending upon implementation-specified considerations, the communication engine 339 may send requests and receive data through a connection, all or a portion of which may be a wireless connection. The communication engine 339 may request and receive messages, and/or other communications from associated systems. Communications may be stored at least temporarily (e.g., cached and/or persistently) in the media, social and market delivery system datastore 340.

FIG. 4 illustrates a flowchart 400 of an example graphical user interface navigational flow of a media platform system (e.g., media platform system 106) according to some embodiments. An interactive programming guide engine (e.g., interactive programming guide engine 206) may control the navigation flow (e.g., in response to user input and/or automatically) and/or generate some or all of the associated graphical user interfaces. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. It will further be appreciated that singular terms (e.g., "graphical user interface") may include the singular and/or plural variants (e.g., "graphical user interfaces").

In step 402, a media platform system (e.g., media platform system 106) logs a user into a user account. The user account may be managed by a remote server system (e.g., a media, social and market delivery system 108). The login may occur automatically (e.g., a user logged in previously and the credentials were stored on the media platform system), and/or the login may occur manually (e.g., a login screen may be displayed and the user may be prompted to enter a username and password). The media platform system may provide the credentials to the remote server system for authentication.

In step 404, the media platform system presents a billboard screen. In some embodiments, the billboard screen is presented in response to user account authentication. In some embodiments, the billboard screen may be generated dynamically and/or in-real time.

In step 406, the media platform system presents a main menu screen. From the main menu screen, a user may navigate to various graphical user interfaces and/or features of the system, such as an application graphical user interface (4012), Internet access graphical user interface (4008), social graphical user interface (4020), TV media graphical user interface (4022), film media features graphical user interface (4024), live media graphical user interfaces (4026), favorite media graphical user interface (4028), game media graphical user interface (4030), music media graphical user interface (4032), and rewards graphical user interface (4034).

In the example of FIG. 4, the media platform system allows the user to navigate to a friends graphical user interface (4040) from the social graphical user interface. In the friends graphical user interface, for example, users may video conference and/or text and/or see what games friends are playing, what they are watching, what they are listening to, and/or other perform other activities. From the TV media graphical user interface, the system may provide functionality for previewing, purchasing, and/or playing TV media (4042). From the film media graphical user interface, the system may provide functionality for or previewing, purchasing, and/or playing film media (4044). From the live media graphical user interface, the system may provide functionality for presenting international channels, sports, and/or other live media (4048). From the favorites media graphical user interface, the system may provide functionality for viewing favorites (4048). From the games media graphical user interface, the system may provide functionality to demo, preview, purchase and/or play games (4044). From the music media graphical user interface, the system may provide functionality for previewing, purchasing, and/or playing music media (4052). From the rewards graphical user interface, the system may provide functionality for using points to apply to online purchase.

In step 447, the media platform system may present a stadium mode. Although the stadium mode is shown here with respect to live media, it will be appreciated that various embodiments may provide stadium mode functionality for any type of media presentation.

In step 470, the media platform system presents a celebrity portal graphical user interface, from which users may subscribe to favorite celebrities to gain access to exclusive content (4072).

In step 480, the media platform system provides functionality to purchase products (e.g., from some or all of other graphical user interfaces described herein). For example, a user viewing live basketball game stream in stadium mode may be able to purchase a product without leaving the stadium mode graphical user interface.

Figure 5:
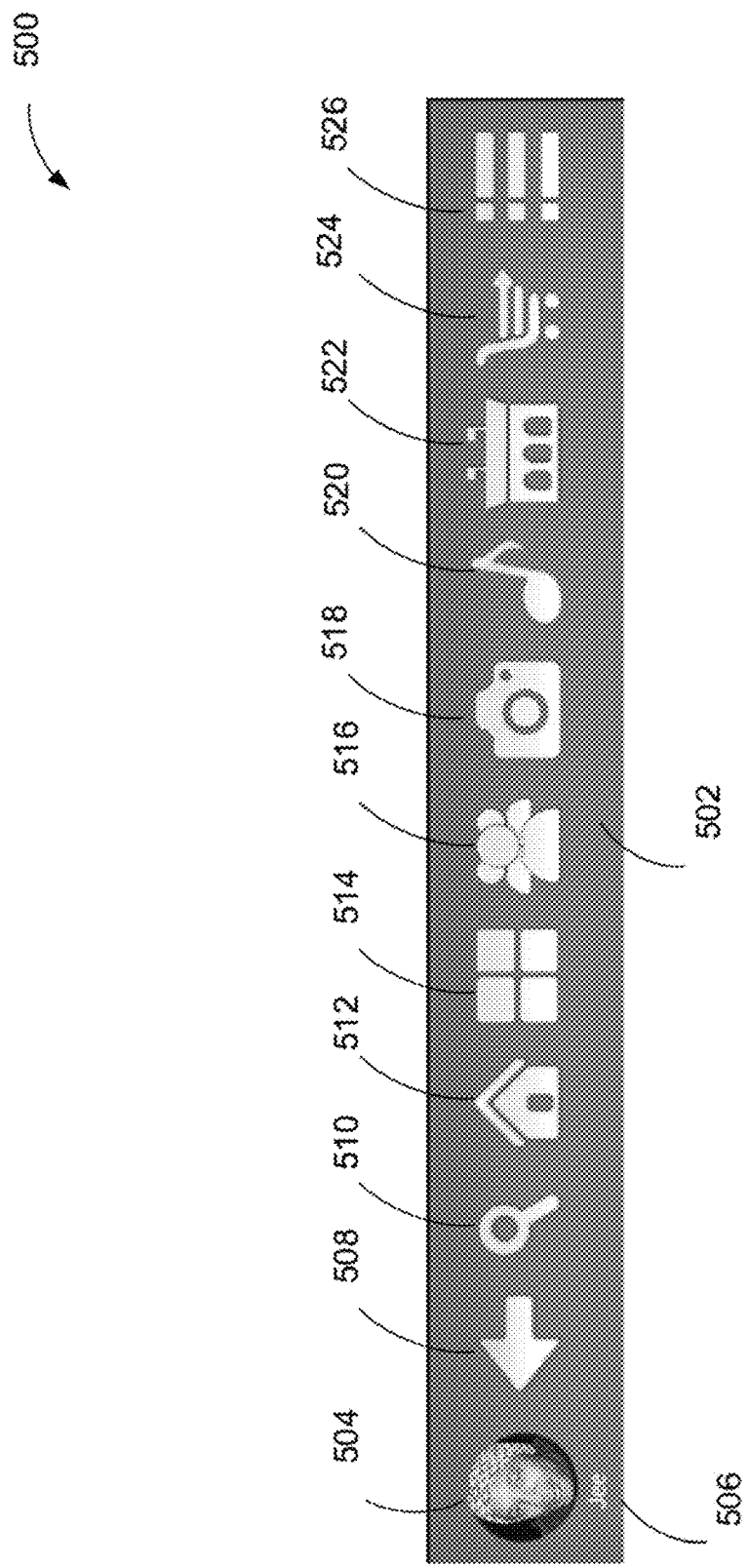
FIG. 5 illustrates a portion of an example of a display corresponding to a smart bar according to some embodiments.

FIG. 5 illustrates a portion 500 of an example of a display corresponding to a smart bar 502 according to some embodiments. In some embodiments, display media content of the smart bar 502 is generated by an applicable GUI engine, such as the smart bar engine (e.g., the smart bar engine 216 in FIG. 2) discussed in this paper. In some embodiments, the smart bar 502 is caused to be displayed on an applicable display device, such as the output subsystem (e.g., the output subsystem 226 in FIG. 2) discussed in this paper. For example, the applicable display device display may include a television, a monitor, a laptop computer, a tablet, a smartphone, a watch, a signage system, a projector screen, and so on.

In the example of FIG. 5, the portion 500 includes a smart bar 502, which is a content-specific GUI that dynamically changes display media content therein based on content presented to a user. The smart bar 502 is formed in an applicable direction depending on various criteria. For example, the smart bar 502 extends horizontally or vertically depending on an aspect ratio of a display device for displaying media content. In another example, the smart bar 502 extends horizontally or vertically depending on user setting. In still another example, the smart bar 502 is formed in a fixed direction. Further, the smart bar 502 is positioned at an applicable position depending on various criteria. For example, the smart bar 502 is positioned at a bottom edge or a top edge of the entire screen depending on media content to be displayed on the main screen. In another example, the smart bar 502 is positioned at a user-specified position. In still another example, the smart bar 502 is positioned at a fixed position. Moreover, the smart bar 502 is in an applicable size depending on various criteria. For example, the smart bar 502 is in an applicable size depending on various criteria. For example, the smart bar 502 is in a full screen size (e.g., extending the entire screen) or in a smaller screen size (than the full screen size) depending on media content displayed on the main screen. In another example, the smart bar 502 is in a user-specified size. In still another example, the smart bar 502 is in a fixed size.

In the example depicted in FIG. 5, the smart bar 502 includes a user-specific window 504, a user-specific label 506, a plurality of selectable objects 508-526 for selecting functions. The user-specific window 504 includes user-specific content, which is intended to indicate that the smart bar 502 is associated with a specific user. In a more specific implementation, the user-specific window 504 indicates a user-specific image, such as a user-specific picture, a user-specific illustration, a user-specific logo, and so on. For example, a face picture of a user is displayed in the user-specific window 504 as depicted in FIG. 5. Further, the user-specific window 504 is in an applicable shape. In an example, the user-specific window 504 is in a shape of a circle, oval, square, rectangular, and so on. Moreover, the shape of the user-specific window 504 may be fixed, or the shape of the user-specific window 504 may be modifiable in accordance with user preference. Furthermore, a background of the smart bar 502 is in an applicable format depending on various criteria. For example, depending on media content in a main screen, on which, in one embodiment, the smart bar 502 is overlaid, the smart bar 502 is switched between a transparent background and a non-transparent background.

In the example depicted in FIG. 5, the user-specific label 506 includes user-specific content similarly to the user-specific window 504. In a more specific implementation, the user-specific label 506 indicates user-specific text, such as user name and user ID. Further, the user-specific label 506 can be in an applicable format. In an example, the user-specific label 506 is a specific font, a specific size, a specific color, a specific background, and so on. Moreover, the format of the user-specific label 506 may be fixed, or the shape of the user-specific label 506 may be modifiable in accordance with user preference.

Figure 15:
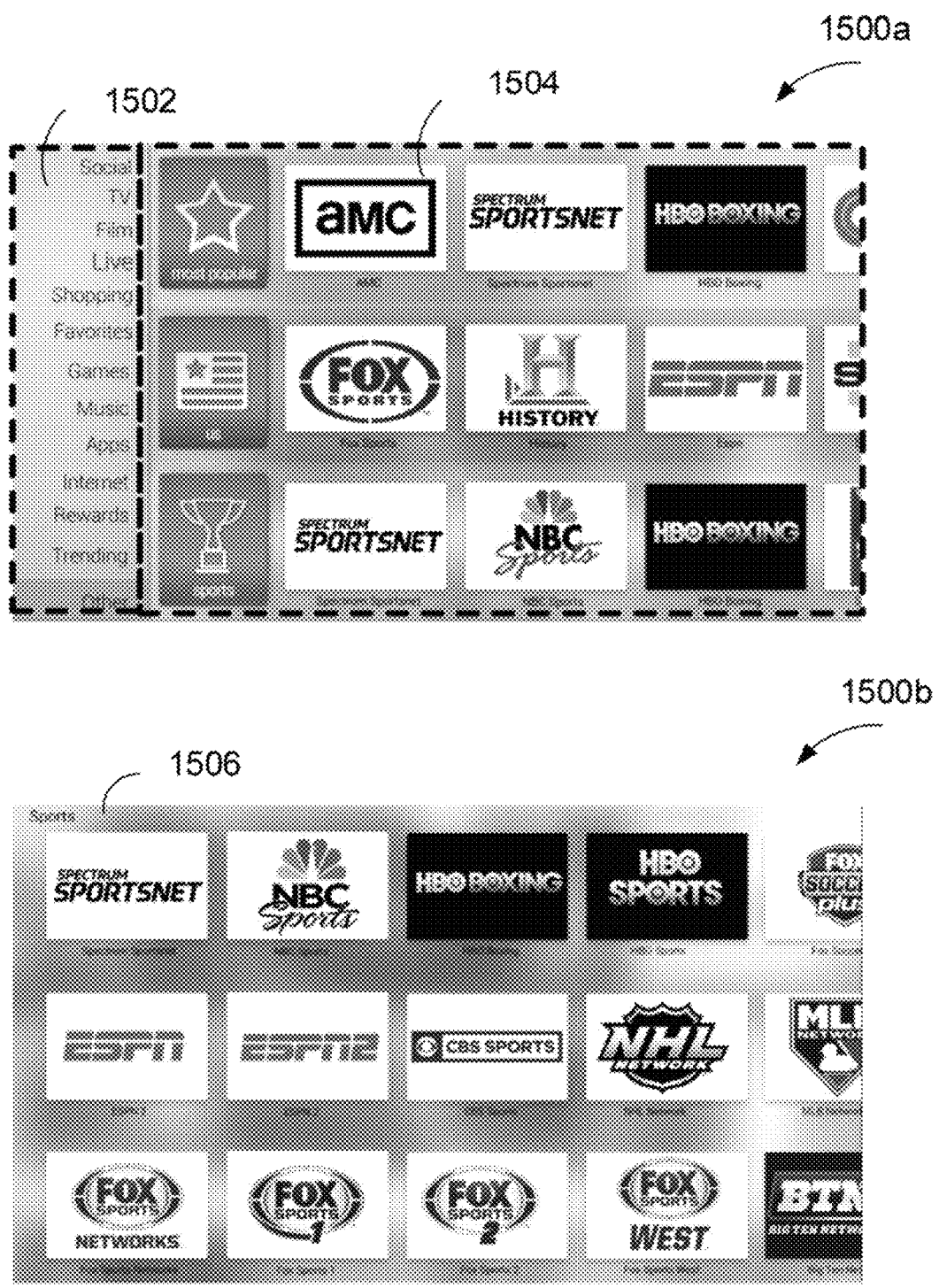
FIGS. 15-17 illustrate an example of screen transition to activate a stadium mode.
Figure 23:
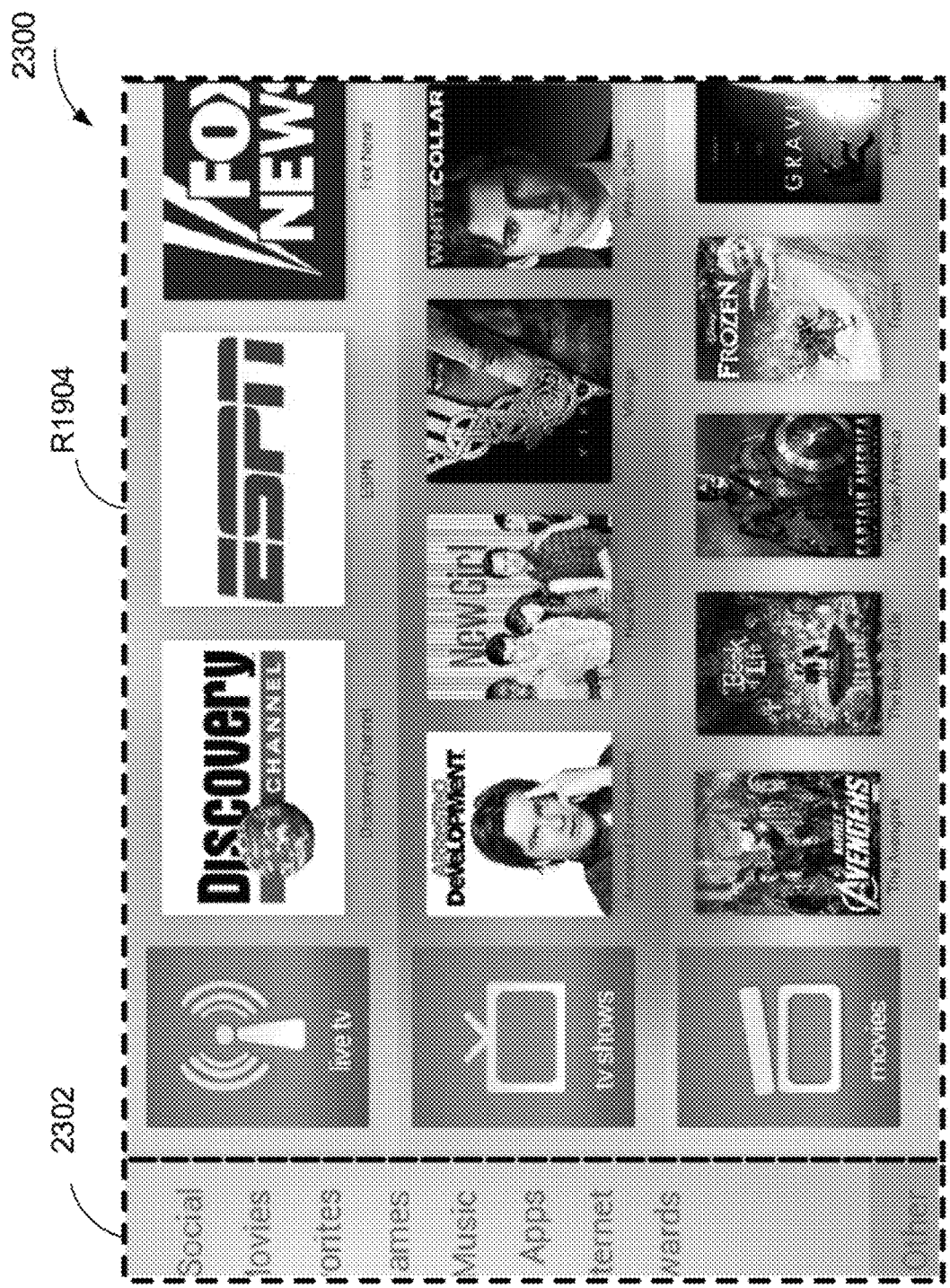

In the example depicted in FIG. 5, the plurality of selectable objects 508-526 include a selectable object 508 for exiting the smart bar 502, a selectable object 510 for searching, a selectable object 512 for going to a main menu (e.g., the main menu in FIG. 15 (specifically, 1500a), and FIG. 23), a selectable object 514 for splitting a main screen of the display, a selectable object 516 for interacting with friends, a selectable object 518 for using an imaging device (e.g., camera) coupled to a media platform system (e.g., the media platform system 106 in FIG. 1), a selectable object 520 for accessing audio content, a selectable object 522 for activating/deactivating a stadium mode, a selectable object 524 for activating/deactivating a purchasing mode, and a selectable object 526 for pulling up one or more additional functions. Further, each of the selectable objects 508-526 can be in an applicable format (shape, size, and color). In an example, a color of the selectable objects 508-526 are the same when an indicator (e.g., cursor) for selection is not placed in the selectable objects 508-526, and the color of one of the selectable objects 508-526 at which the indicator (e.g., cursor) for selection is placed is changed to a different color. Moreover, the format of the selectable objects 508-526 may be fixed, or the format of the selectable objects 508-526 may be modifiable in accordance with user preference. Specific functions corresponding to the selectable objects 514-526 are described elsewhere herein in more detail.

In some embodiments, among the plurality of selectable objects 508-526, one or more selectable objects corresponding to available functions are selectively displayed in the smart bar 502. That is, one or more selectable objects corresponding to unavailable functions are not displayed in the smart bar 502. In some embodiments, the available functions and the unavailable functions vary depending on media content presented to the user through the media platform system. For example, the available functions and the unavailable functions vary depending on display media content displayed on the main screen of the display. In another example, the available functions and the unavailable functions vary depending on audio content presented. It is noted that, in some embodiments, the user-specific window 504 and the user-specific label 506 are displayed in the smart bar 502 regardless of available functions.

In some embodiments, one or more of the plurality of selectable objects 508-526 corresponding to available functions are arranged in an applicable order depending on various criteria. For example, one or more of the selectable objects 508-526 corresponding to available functions are arranged in an ascending or descending order of use frequency of the selectable objects 508-526. In another example, one or more of the selectable objects 508-526 corresponding to available functions are arranged in a user-specified order. In still another example, one or more of the selectable objects 508-526 corresponding to available functions are arranged in a fixed order. In a more specific implementation, when the one or more of the selectable objects 508-526 corresponding to available functions are arranged in a fixed order, the one or more of the selectable objects 508-526 are aligned to be at a regular interval each other (e.g., the arrangement shown in FIG. 6).

Depending upon a specific implementation of the embodiment, a display manner of the smart bar 502 after one of the selectable objects corresponding to available functions is selected can employ various options. For example, the smart bar 502 disappears in response to selection of one of the selectable objects corresponding to available functions. In another example, the smart bar 502 disappears only upon selection of the selectable object 508 for exiting the smart bar function.

Figure 6:
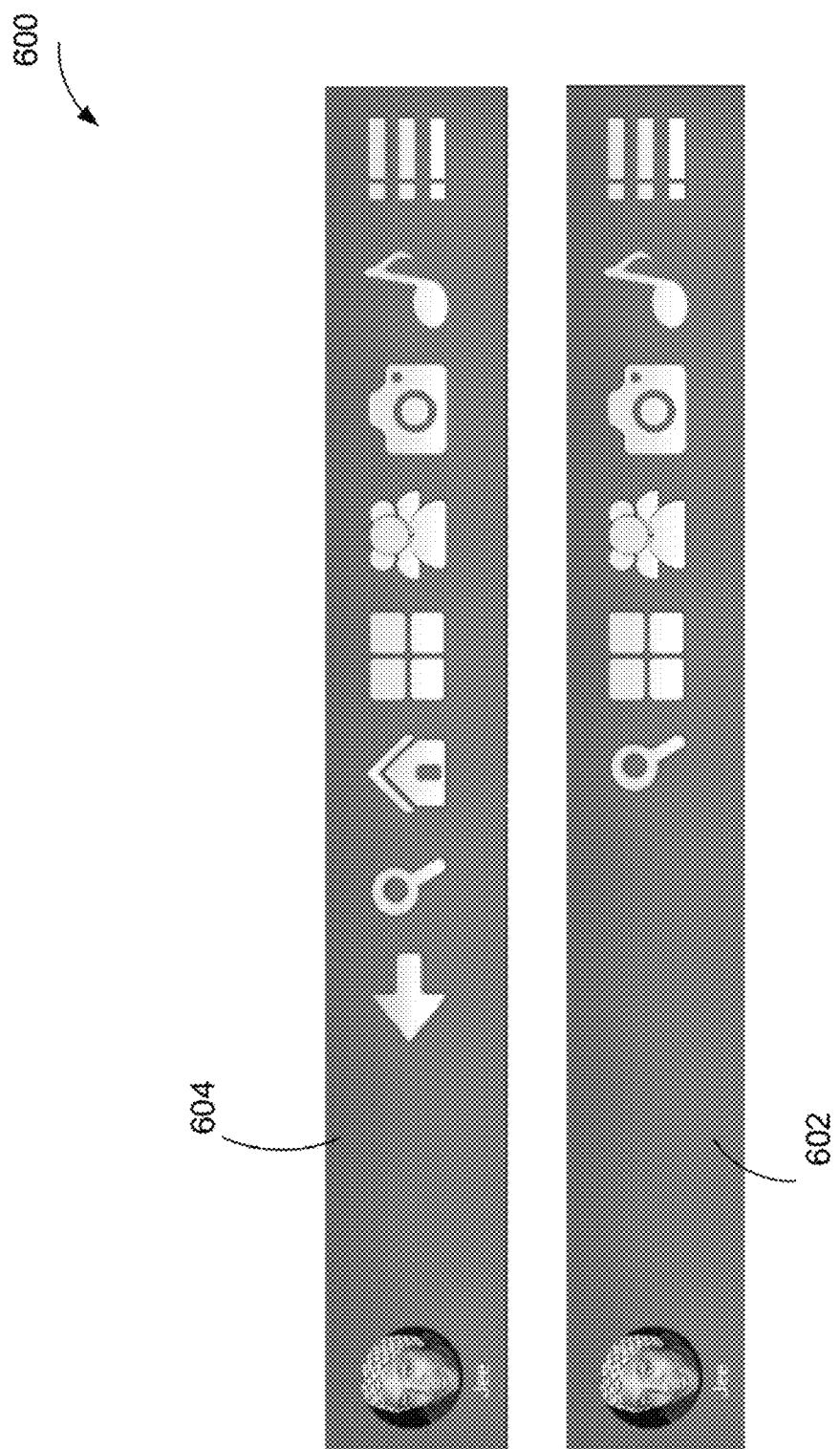
FIG. 6 illustrates an example of two smart bars in two different states according to some embodiments.

FIG. 6 illustrates an example of two smart bars 602 and 604 in two different states according to some embodiments. In the example of FIG. 2R, the smart bar 602 corresponds to a state where functions of exiting the smart bar, searching, going to the main menu, splitting screen, interacting with friends, using a imaging device, accessing audio content, and going to additional function(s) are available. In other words, the other functions (e.g., the stadium mode and the purchase mode) than these functions are not available. On the other hand, the smart bar 604 corresponds to a state where functions of searching, splitting screen, interacting with friends, using a imaging device, accessing audio content, and going to additional function(s) are available. In other words, the other functions (e.g., exiting the smart bar, going to the main menu, the stadium mode and the purchase mode) than these functions are not available.

Advantageously, since (non-selectable) objects corresponding to unavailable functions are not displayed in the smart bar, it is possible to provide a more user-friendly graphical user interface (GUI). Specifically, a user can more efficiently select one of selectable objects corresponding to available functions without being destructed to (non-selectable) objects corresponding to unavailable functions. In other words, it is possible to prevent user operation to select objects corresponding to unavailable functions repeatedly.

Figure 7:
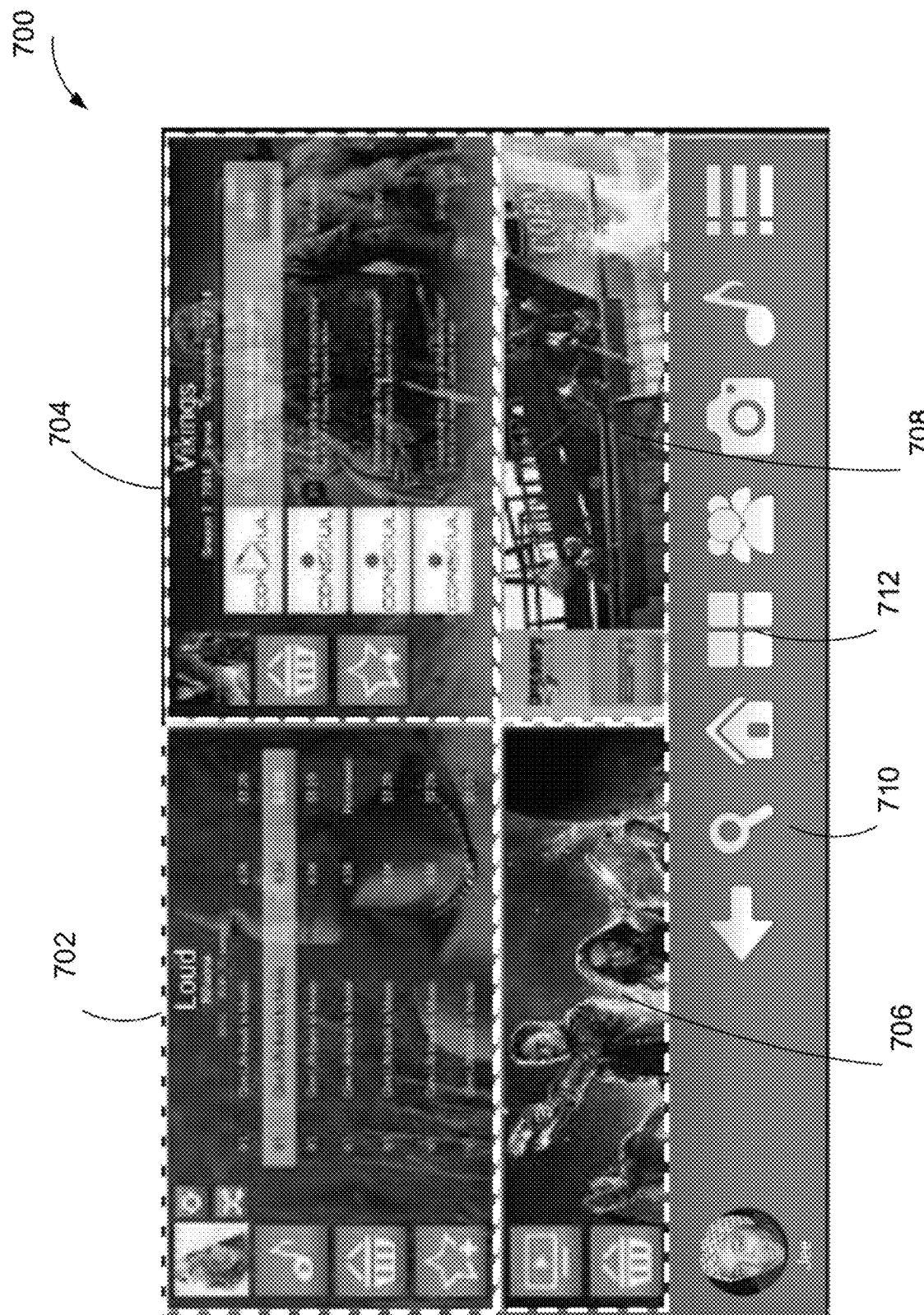
FIG. 7 illustrates an example of a screen 700 displayed on a display screen by a media platform system when a selectable object for splitting screen was selected according to some embodiments.

FIG. 7 illustrates an example of a screen 700 displayed on a display screen by a media platform system when a selectable object for splitting screen was selected according to some embodiments. In the example depicted in FIG. 7, the screen 700 includes a main screen that includes four split screens 702, 704, 706, and 708, and a smart bar 710 overlaid on the main screen at the bottom edge of the main screen. The smart bar 710 includes a non-transparent background and a selectable object 712 for splitting screen, and the main screen is at a state after the selectable object 712 has been selected.

When the selectable object 712 for splitting screen is selected in the smart bar 710, a user is capable of splitting the main screen into two sub-screens. For example, when a main screen includes a non-split single screen, by selecting the selectable object 712 in the smart bar 710, a user is capable of splitting the non-split single screen into two sub-screens. In another example, when a main screen includes the two sub-screens, a user is capable of splitting one or both of the two sub-screens into two mini screens, respectively (i.e., four mini screens). In a more specific implementation, when a main screen includes the two sub-screens and a user splits only one of the two sub-screens, four mini screens are displayed and one of the four mini screens may display a blank space or a main menu.

In some embodiments, the function of splitting screen is implemented by an applicable engine such as a split presentation engine (e.g., the split presentation engine 210 in FIG. 2). In some embodiments, the function of splitting screen is available unless the main screen has been already split into a maximum number. The maximum number is, in an implementation, an exponential number of two. For example, the maximum number is four. In some embodiments, a size of split screens (e.g., the sub-screens and mini screens) is in an applicable size. For example, the split screens have a size so as to fill the entire main screen. In another example, the split screens have a size so as to create some gaps between the split screens. An aspect ratio of the split screens is in an applicable ratio. For example, the split screens have an equal aspect ratio, which may be the same aspect ratio of the non-split screen.

Figure 8:
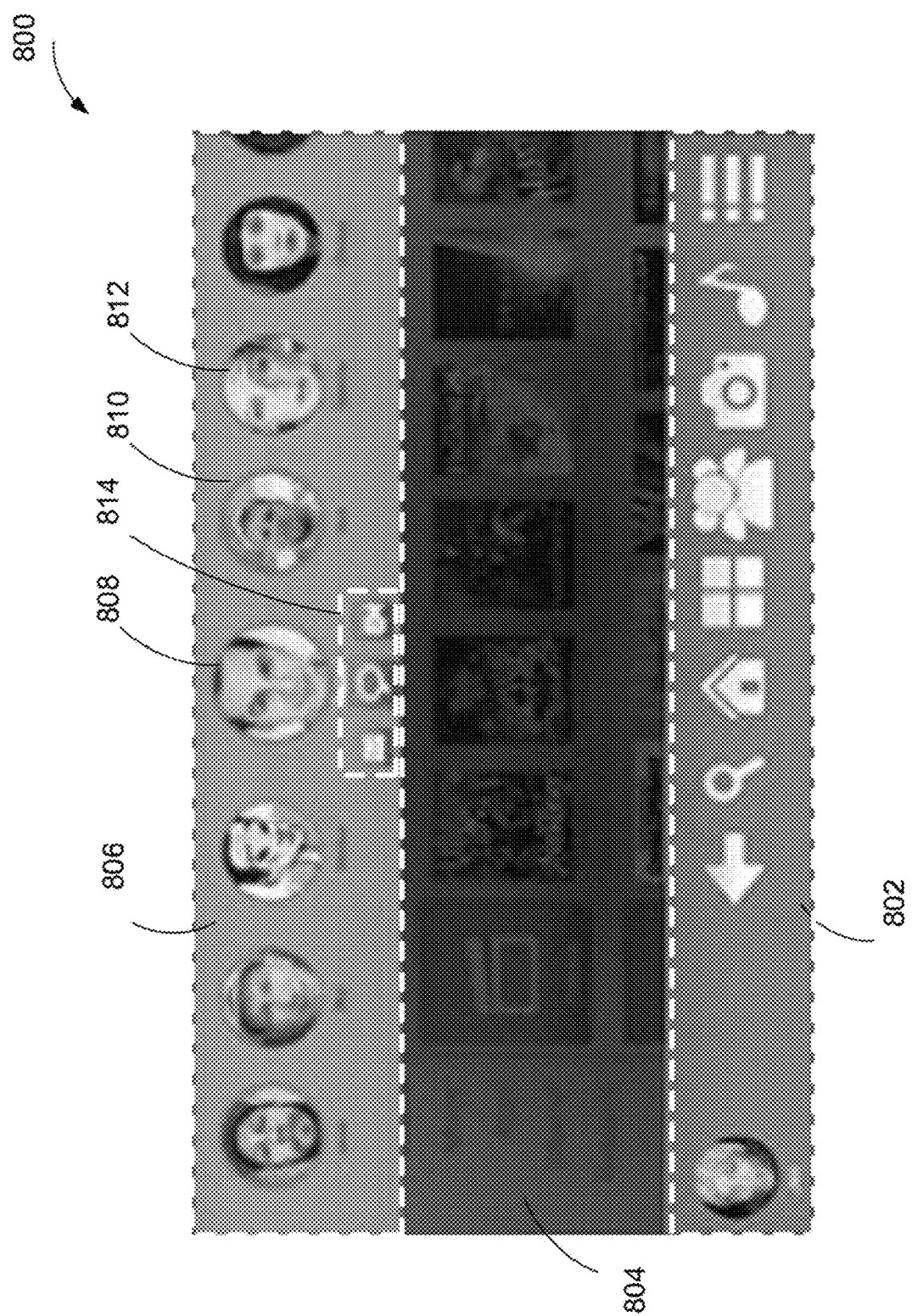
FIG. 8 illustrates another example of a screen displayed on a display screen by a media platform system when a selectable object for interacting with friends was selected according to some embodiments.

FIG. 8 illustrates another example of a screen 800 displayed on a display screen by a media platform system when a selectable object for interacting with friends was selected according to some embodiments. In the example depicted in FIG. 8, the screen 800 includes a main screen 802, a smart bar 804 overlaid on the main screen 802 at the bottom edge of the main screen 802, and a tool bar 806 for interaction with friends that is also overlaid on the main screen 802 at the top edge of the main screen 802. The smart bar 804 includes a selectable object 808 for interacting with friends, and the main screen 802 is at a state after the selectable object 808 has been selected.

When the selectable object 808 for interacting with friends is selected in the smart bar 804, a user is capable of interacting with friends who have accounts for a service of media, social, and market delivery provided by a media, social, market delivery system (e.g., the media, social, market delivery system 108 in FIG. 1), and also are online, i.e., currently using the service. In the example of FIG. 8, the tool bar 806 includes an on-target selectable object 810, which is positioned at a center of the tool bar 806, selectable objects 812 for online friends, selectable object 814 for offline friends, and communication tool objects R416 for the on-target selectable object 810. In some embodiments, the on-target selectable object 810, the selectable objects 812 for online friends, the selectable object 814 for offline friends includes an image specific to the friends, which are for example, pictures of the friends and illustration of the friends.

In some embodiments, the on-target selectable object 810 is for a friend user for whom communication can be started using the communication tool objects R416. In a specific implementation, the size of the on-target selectable object 810 is larger than the size of the selectable objects 812 for online friends and the size of the selectable object 814 for offline friends. In a specific implementation, the selectable objects 812 for online friends are indicated with a highlighted contour, and the selectable object 814 for offline friends are not indicated with the highlighted contour, such that the online friends and the offline friends can be efficiently distinguished. In a specific implementation, the communication tool objects R416 include one or more selectable objects corresponding to different communication tools, such as emails, instant messages (IM), voice conversation, and video conversation. Further, when a plurality of selectable objects are included in the communication tool objects R416, the selectable objects include an on-target selectable object for which communication can be instantly started by selection thereof, and off-target selectable object for which the off-target selectable object has to be selected first to switch the off-target selectable object to an on-target selectable object before starting communication.

In some embodiments, the function of interacting with friends is implemented by an applicable engine such as a social interface engine (e.g., the social interface engine 220 in FIG. 2). In some embodiments, the function of interacting with friends is available when a user has at least one friend user (either online or offline) and not available when the user has no friend user (either online or offline). In another embodiment, the function of interacting with friends is available when a user has at least one friend user who is online and not available when the user has no friend user who is online. In some embodiments, when the number of friends of a user is greater than a maximum number that fit in the tool bar 806, the selectable objects 810, 812, and 814 are scrollable. In still another embodiment, the function of interacting with friends is available when media content presented to a user (e.g., display media content displayed on a screen) is associated with interaction with friends. For example, the presented media content provides a chat space for interaction with friends.

Figure 9:
FIG. 9 illustrates another example of a screen displayed on a display screen by a media platform system when a selectable object for using an imaging device was selected according to some embodiments.

FIG. 9 illustrates another example of a screen 900 displayed on a display screen by a media platform system when a selectable object for using an imaging device was selected according to some embodiments. In the example depicted in FIG. 9, the screen 900 includes a main screen 902, a tool bar 904 for using imaging device that is separately provided from the main screen 902 at the right edge of the main screen 902, and a smart bar 906 overlaid on the main screen 902 and the tool bar 904 at the bottom edge of the main screen 902. The smart bar 906 includes a selectable object 908 for using imaging device, and the main screen 902 is at a state after the selectable object 908 has been selected.

When the selectable object 908 for using imaging device is selected in the smart bar 906, a user is capable of using an imaging device (e.g., camera) that is coupled to the media platform displaying the main screen 902. In the example of FIG. 9, the tool bar 904 includes an selectable object 910 for taking a picture and a selectable objects 912 for taking video. In a specific implementation, one of selectable objects included in the tool bar 904 is an on-target selectable object that is selectable for instantly starting the corresponding function by selecting the selectable object, and the other of the selectable objects included in the tool bar 904 are off-target selectable objects that needs selection of the selectable object to switch to an on-selectable object before starting the corresponding function.

In some embodiments, the function of using imaging device is available when an applicable imaging device is coupled to the media platform system that displays the main screen 902 and not available when no applicable imaging device is coupled to the media platform system. In another embodiment, the function of using imaging device is available when media content presented to a user (e.g., display media content displayed on a screen) is associated with user interaction using imaging device. For example, the presented media content provides an interactive event that user can participate in.

Figure 10:
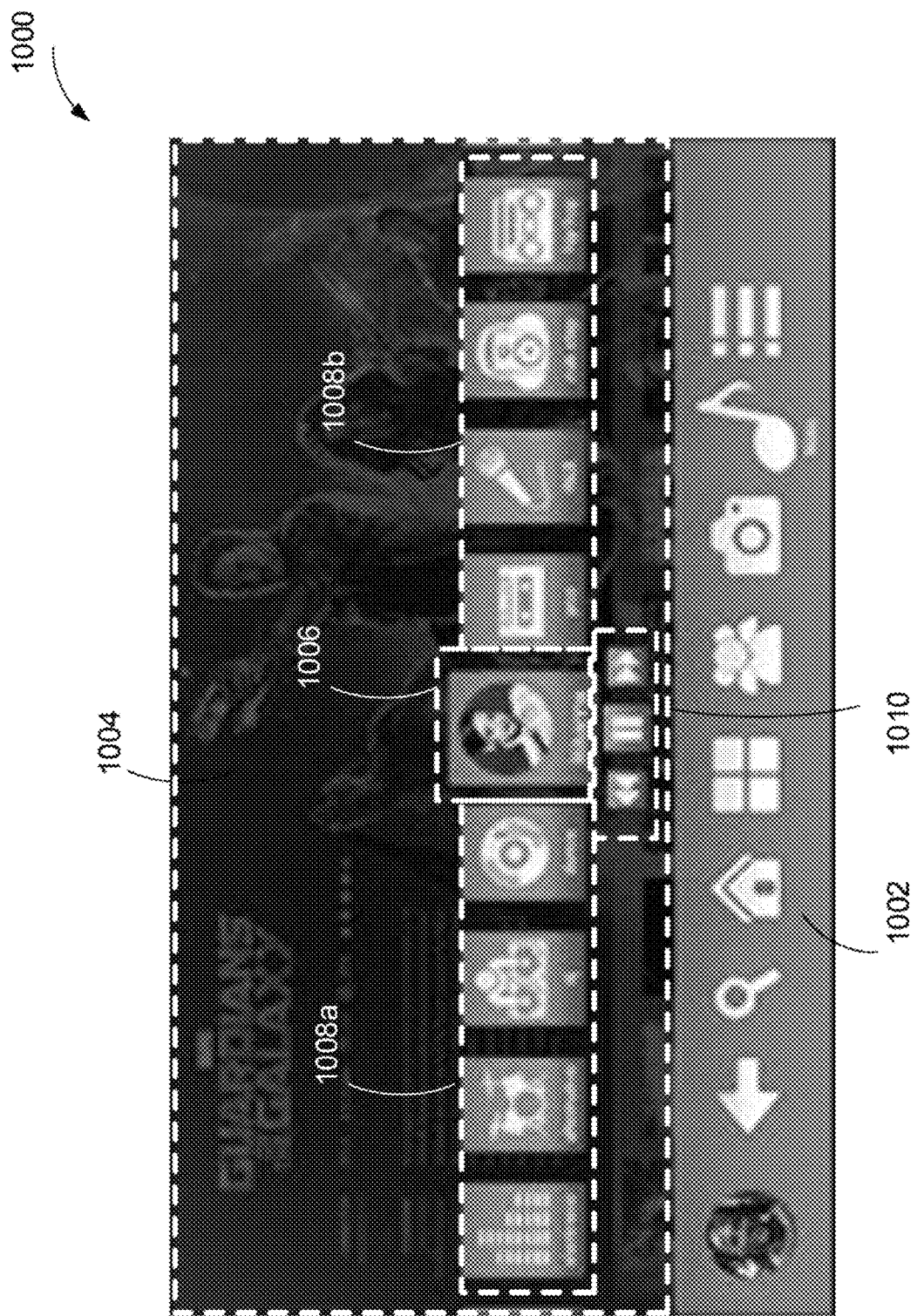
FIG. 10 illustrates another example of a screen displayed on a display screen by a media platform system when a selectable object for accessing audio content was selected according to some embodiments.

FIG. 10 illustrates another example of a screen 1000 displayed on a display screen by a media platform system when a selectable object for accessing audio content was selected according to some embodiments. In the example depicted in FIG. 10, the screen 600 includes a main screen 1002, a smart bar 1004 overlaid on the main screen 1002 at the bottom edge of the main screen 1002, and a tool bar 1006 for accessing audio content that is also overlaid on the main screen 1002 at the middle of the main screen 1002. The smart bar 1004 includes a selectable object 1008 for accessing audio content, and the main screen 1002 is at a state after the selectable object 1008 has been selected.

When the selectable object 1008 for accessing audio content is selected in the smart bar 1004, a user is capable of accessing audio content, which may include live streaming content (e.g., radio content), recorded streaming content (e.g., a music album), and local content stored locally in the media platform system. In the example of FIG. 10, the tool bar 1006 includes an on-target selectable object 1010, which is positioned at a center of the tool bar 1006, off-target selectable objects 1012, and communication tool objects 1014 for the on-target selectable object 1010. In some embodiments, the on-target selectable object 1010 and the off-target selectable objects 1012 include an image specific to audio content, which are for example, pictures of an artist and a genre of audio content.

In some embodiments, the on-target selectable object 1010 is for audio content for which content can be played back using the communication tool objects 1014. In a specific implementation, the size of the on-target selectable object 1010 is larger than the size of the off-target selectable objects 1012. In a specific implementation, the communication tool objects 1014 include one or more selectable objects to manipulate playback of the audio content, such as a selectable object for pause, a selectable object for skipping content, a selectable object for returning to previous content, and so on.

In some embodiments, the function of accessing audio content is implemented by an applicable engine such as a playback engine (e.g., the playback engine 208 in FIG. 2). In some embodiments, the function of accessing audio content is available when a user has at least one accessible audio content and not available when the user has no accessible audio content.

Figure 11:
FIG. 11 illustrates another example of a screen displayed on a display screen by a media platform system when a selectable object for a purchasing mode was selected according to some embodiments.

FIG. 11 illustrates another example of a screen 1100 displayed on a display screen by a media platform system when a selectable object for a purchasing mode (e.g., the selectable object 524 in FIG. 5) was selected according to some embodiments. In the example depicted in FIG. 11, the screen 700 includes a main screen 1102 and a sub screen 1104 disposed separately from the main screen 1102 at the bottom edge of the main screen 1102. In a specific implementation, the sub screen 1104 includes an on-target selectable object 1106 associated with the main screen 1102 and one or more off-target selectable objects 1108. Further, in a specific implementation, each of the on-target selectable object 1106 and the one or more off-target selectable objects 1108 includes a thumbnail image of a corresponding product, a product name, a price, and so on. Moreover, in a specific implementation, the main screen 1102 includes an enlarged image of a corresponding product, an enlarged product name, an enlarged price, a brand logo, and so on.

In some embodiments, the function of the purchasing mode is implemented by an applicable engine such as a purchasing engine (e.g., the purchasing engine 222 in FIG. 2). In some embodiments, the function of the purchasing mode is available when at least an applicable product is associated with media content presented to a user in association with a main screen (before starting the purchasing mode), and not available when no applicable product is associated with the media content presented to the user. In a more specific implementation, when display media content includes an image of a product (e.g., a sunglasses worn by an actor) that is purchasable through the purchasing mode, the purchasing mode becomes available. The time period during which the purchasing mode is available is set depending on various criteria. For example, the purchasing mode is available only during a time period while the purchasable product is on a screen. In another example, the purchasing mode is available for a predetermined period of time (e.g., 3 mins) after the purchasable product has been shown on a screen. In still another example, the purchasing mode is available during a media content program after the purchasable product has been shown on a screen. In still another example, the purchasing mode is available during the entire media content program even before the purchasable product is shown on a screen.

Figure 12:
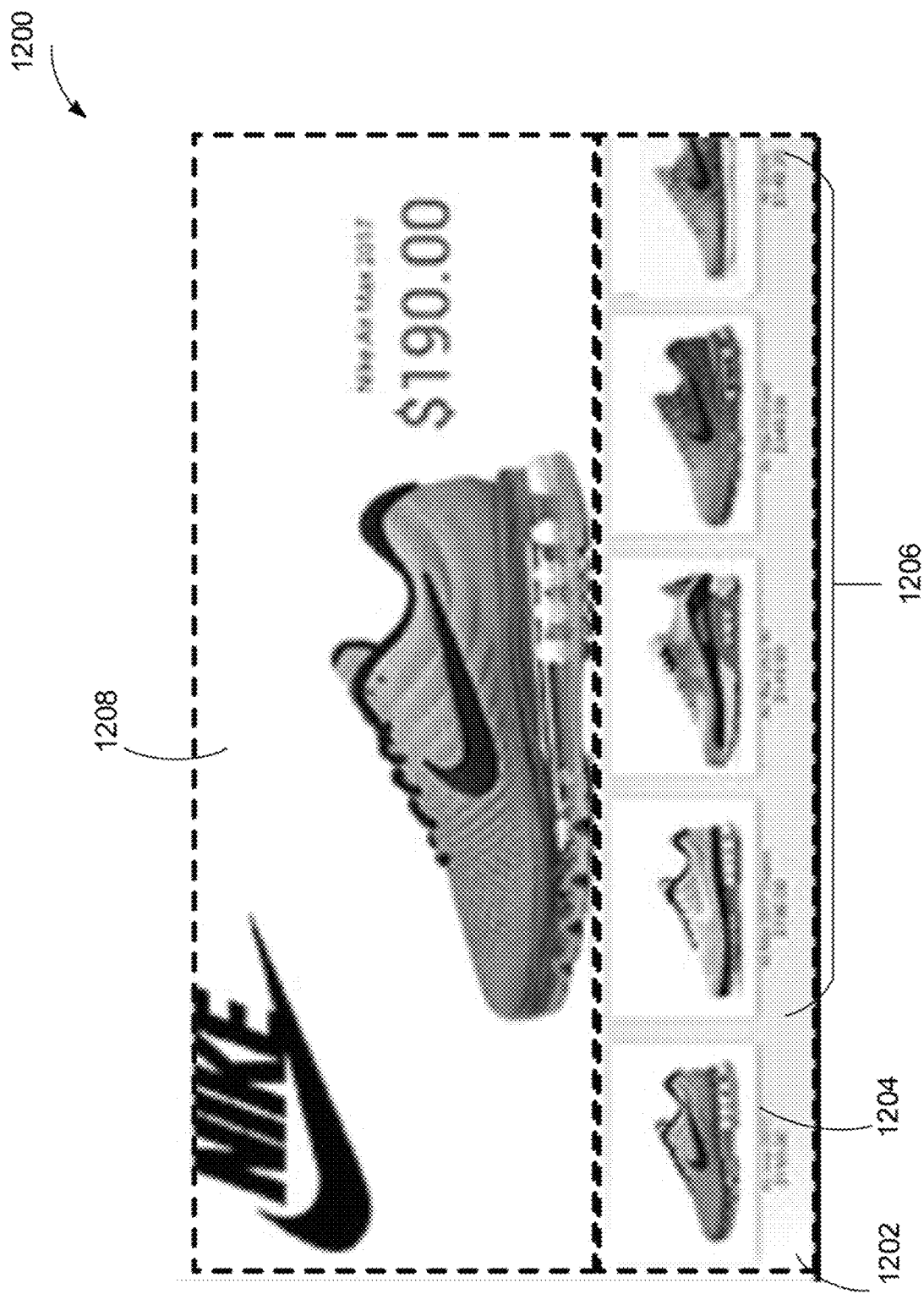
FIG. 12 illustrates another example of a screen displayed on a display screen by a media platform system when a selectable object for additional functions was selected according to some embodiments.

FIG. 12 illustrates another example of a screen 1200 displayed on a display screen by a media platform system when a selectable object for additional functions (e.g., the selectable object 526 in FIG. 5) was selected according to some embodiments. In the example depicted in FIG. 12, the screen 800 includes a main screen 1202 and an extended smart bar 1204 overlaid on the main screen 1202 at the bottom edge of the main screen 1202. In a specific implementation, the extended smart bar 804 includes a set of selectable objects different from selectable objects included a smart bar (e.g., the smart bar 502 in FIG. 1). For example, the set of selectable objects includes an on-target selectable object 1206 and one or more off-target selectable objects 1208. Further, in a specific implementation, each of the on-target selectable object 1206 and the one or more off-target selectable objects 1208 includes a representative image of a corresponding additional function, such as sending emails, reviewing invoices, weather, time, setting, and so on.

In some embodiments, the function of the additional functions is available when at least one applicable additional function is available, and not available when no applicable additional function is available. Further in some embodiments, availability of the additional function is determined based on media content presented to a user (e.g., a display media content displayed on a screen).

Figure 13:
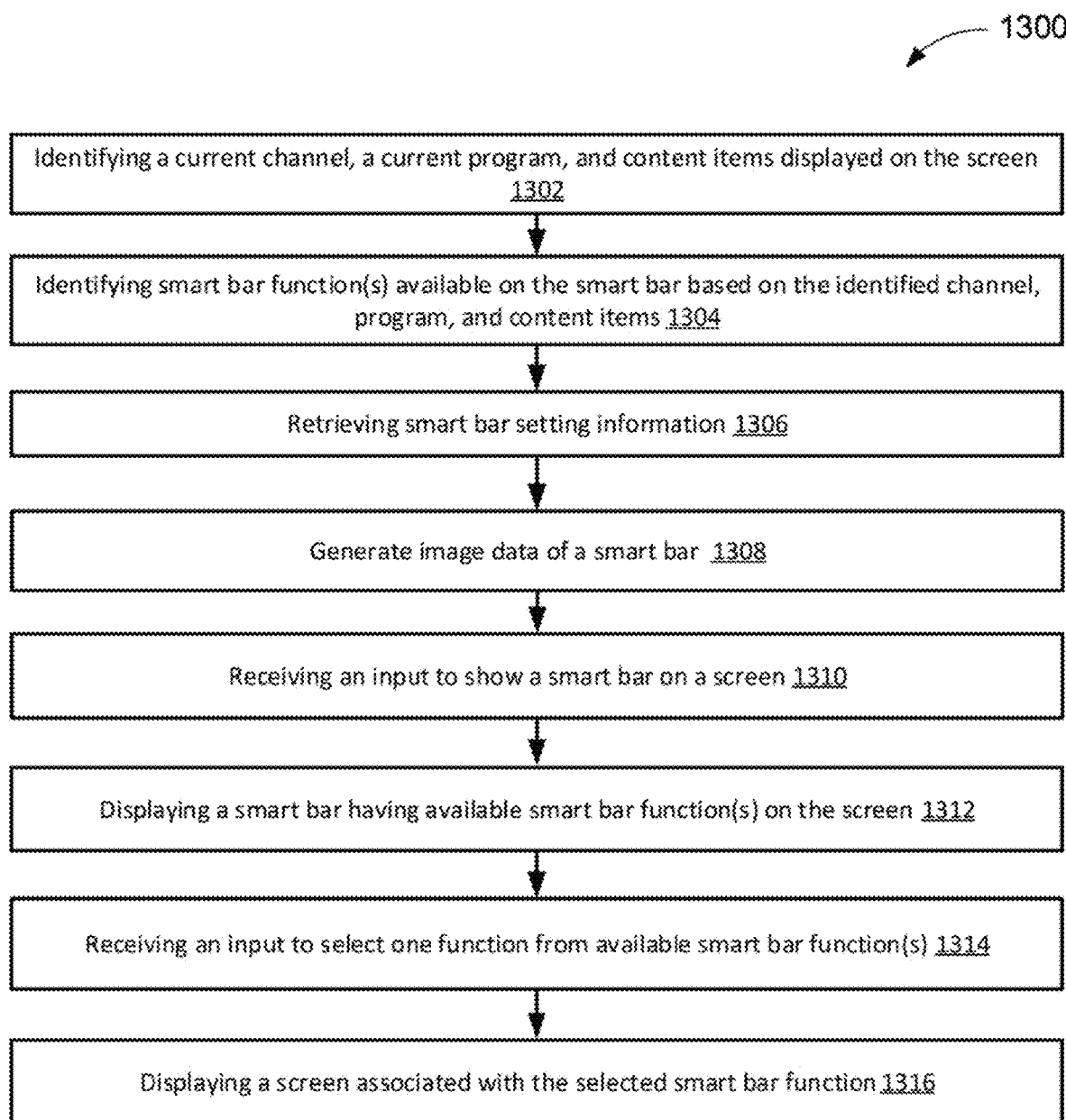
FIG. 13 illustrates a flowchart of an example method of operation for a smart bar function according to some embodiments.

FIG. 13 illustrates a flowchart 1300 of an example method of operation for a smart bar function according to some embodiments. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In step 1302, content parameters of current media content presented to a user are identified. An applicable engine for identifying content parameters, such as the smart bar engine (e.g., the smart bar engine 216 in FIG. 2) described in this paper, can identify the content parameters. In some embodiments, the content parameters include one or more of a current media channel (e.g., NBC, CBA, FOX, ESPN, etc.), a current media program (e.g., evening news) presented in the media channel, and a current media content (e.g., a live report from a sport venue, an interview scene, etc.). In a specific example, the content parameters may include a genre of music as the current media channel, a title of a music album as the current media program, and a title of a song as the current media content.

In step 1304, one or more smart bar functions available on the smart bar are identified based on the identified content parameters. An applicable engine for identifying available smart bar functions, such as the smart bar engine (e.g., the smart bar engine 216 in FIG. 2) described in this paper, can identify the available smart bar functions. In some embodiments, the smart bar functions include one or more of exiting a smart bar, searching, going to a main menu (e.g., the main menu in FIG. 15 (specifically, 1500*a*), and FIG. 23), splitting a main screen, interacting with friends, using an imaging device, accessing audio content, activating/deactivating a stadium mode, activating/deactivating a purchasing mode, and pulling up one or more additional functions. Depending on a specific implementation of the embodiment, one or more of the smart bar functions may be available regardless of the presented media content (content parameters), and other one or more the smart bar functions are available or unavailable depending on the presented media content.

In step 1306, optionally, display setting of the smart bar and selectable objects corresponding to the available smart bar functions are obtained. An applicable engine for obtaining display setting, such as the smart bar engine (e.g., the smart bar engine 216 in FIG. 2) described in this paper, can obtain the display setting. In some embodiments, the display setting includes one or more of a display position of the smart bar, a display format (e.g., size, color) of the smart bar, a display format (e.g., size, color) of the selectable objects, and a display order of the selectable objects. In some embodiments, some of the display setting may vary depending on the presented media content (content parameters). In some embodiments, at least some of the display setting may be statically or dynamically stored in applicable datastore (e.g., the media platform system datastore 228 in FIG. 2).

In step 1308, smart bar data, including image data of a smart bar to be displayed on a screen, are generated based on the identified available smart bar functions, and the smart bar display setting, which is optionally obtained. An applicable engine for generating smart bar data, such as the smart bar engine (e.g., the smart bar engine 216 in FIG. 2) described in this paper, can generate the smart bar data. In some embodiments, at least some of the smart bar data may be statically or dynamically stored in applicable datastore (e.g., the media platform system datastore 228 in FIG. 2).

In step 1310, it is determined whether or not an input to show a smart bar on a screen is received. An applicable engine for determining an input (e.g., the smart bar engine 216 in FIG. 2) described in this paper, can determine the input. In some embodiments, the input is received from a dedicated remote control device coupled to the media platform system. In another embodiment, the input is received from a wireless mobile device (e.g., smartphone, tablet, laptop, etc.) coupled to the media platform system. In another embodiment, the input may be voice or gestures made by human agents, such as users or viewers. If a decision result of step 1310 is Yes (Y in FIG. 13), the flowchart 900 proceeds to step 1312; if the decision result is No (N in FIG. 13), the flowchart 900 returns to step 1302, and steps 1302-1310 are repeated. Therefore, as the media content presented to a user is updated, the smart bar data is updated so as to reflect the updated media content.

In another embodiment, step 1310 may be carried out before step 1302, and steps 1302-1308 may be carried out upon a determination result in step 1310 is Yes. Depending on a processing capability of the media platform system, applicable order of the step 1310 can be determined. For example, when the media platform system requires some noticeable amount of time to generate the smart bar data after receiving an input to show a smart bar, the recurring background process of steps 1302-1308 may be carried out. In another example, when the processing speed of the media platform system is sufficiently fast, steps 1302-1308 may be carried out upon an input to show a smart bar being received.

In step 1312, a smart bar having the identified available smart bar functions is displayed on a screen based on the generated smart bar data. An applicable system for displaying a smart bar (e.g., the output subsystem 216 in FIG. 2) described in this paper, can display the smart bar.

In step 1314, an input to select a selectable object corresponding to an available smart bar function is received. An applicable engine for receiving an input to select a selectable object input (e.g., the smart bar engine 216 in FIG. 2) described in this paper, can receive the input to select the selectable object corresponding to an available smart bar function. In some embodiments, the input to select the selectable object is received from a dedicated remote control device coupled to the media platform system or a wireless mobile device, similarly to the input to show the smart bar.

In step 1316, a screen associated with the selected smart bar function is displayed An applicable system for displaying an associated screen (e.g., the output subsystem 216 in FIG. 2) described in this paper, can display the screen associated with the selected smart bar function.

Advantageously, according to the smart bar discussed above, since the smart bar selectively presents available functions, it is possible to provide a more use-friendly GUI and navigate a user to an intended function of the user without being distracted to unavailable functions. Further, availability of at least some of the functions that can be indicated in the smart bar dynamically changes depending on a channel that is currently selected or media content of the channel displayed in a screen. For that reason, by simply pulling up the smart bar and selecting a content-specific function, a user can conveniently start the content-specific function without having to perform complicated operations.

Figure 14:
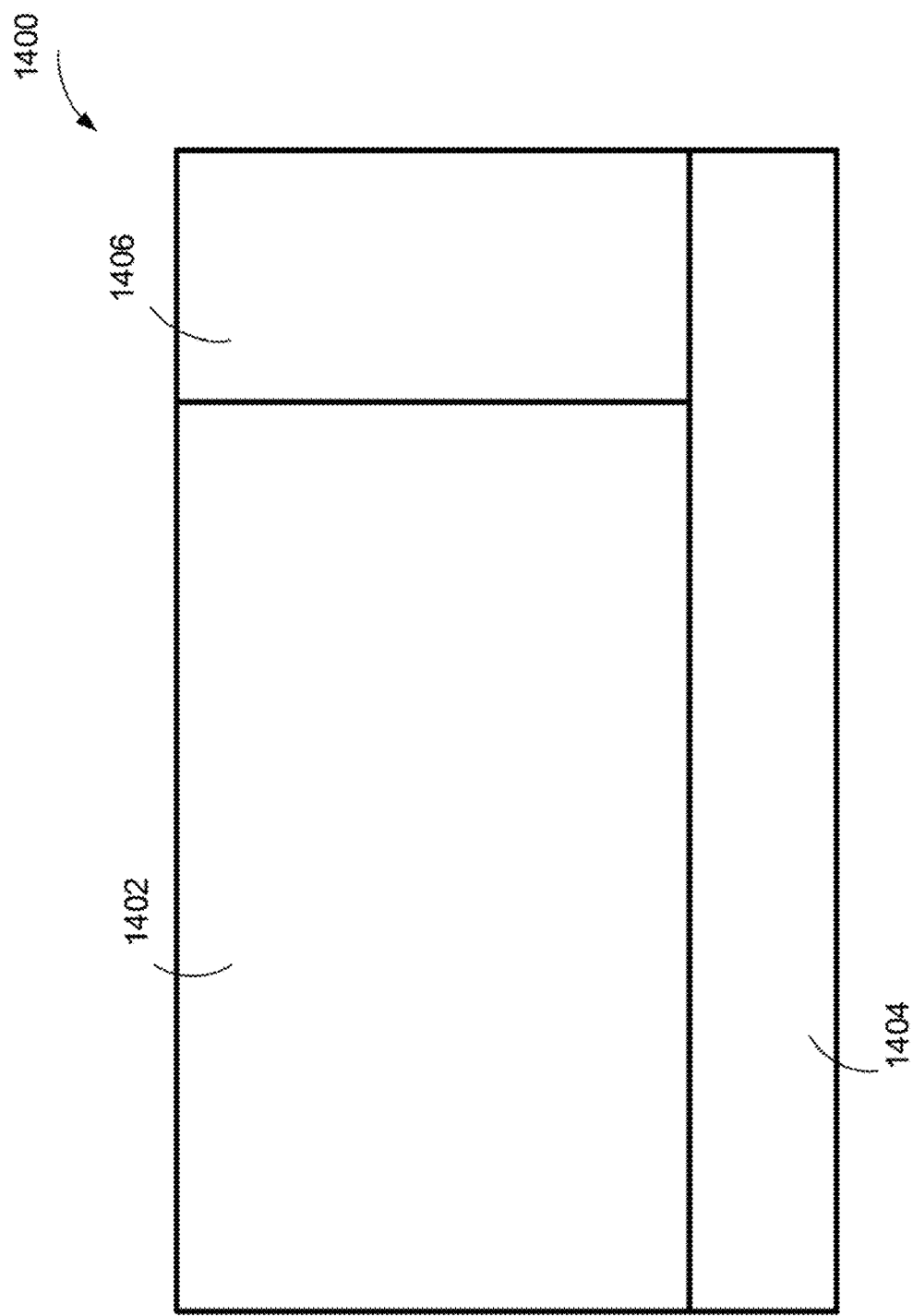
FIG. 14 illustrates an example of a screen that is displayed when a stadium mode is activated according to some embodiments.

FIG. 14 illustrates an example of a screen 1400 that is displayed when a stadium mode is activated according to some embodiments. The stadium mode enables a user to watch content without advertisement interruption in a main screen and instead occupies a portion of an entire screen for advertisement purpose. In some embodiments, the stadium mode can be activated by selecting a selectable object corresponding to the stadium mode (e.g., the selectable object 522 in FIG. 5) in a smart bar (e.g., the smart bar 502 in FIG. 1), when the selectable object is included in the smart bar. In the example in FIG. 14, the screen 1400 includes a main screen 1402, a vertical secondary screen 1404 at a right edge of the main screen 1402, and a horizontal secondary screen 1406 at a bottom edge of the main screen 1402 and the vertical secondary screen 1404.

In some embodiments, the main screen 1402 is provided to display media content of a channel or a program that is currently selected. In a more specific implementation, the media content displayed in the main screen 1402 during the stadium mode include live media content, such as live sports content, live performance content, live debate content, and so on. Further, in some embodiments, the media content displayed on the main screen 1402 are original media content that do not include advertisement interruption (e.g., original media content prepared separately from media content including advertisement interruption) or filtered media content from which advertisement content are filtered out. When the filtered media content are displayed on the main screen 1402, content (e.g., replay scene) relevant to the original media content (e.g., live sports scene) may be filled in place of the advertisement content.

An aspect ratio of the main screen 1402 is in an applicable ratio. For example, the main screen 1402 have the same aspect ratio as a full screen when the stadium mode is deactivated. Further, a size of the main screen 1402 is in an applicable size. For example, the size of the main screen 1402 is fixed to a predetermined size, which is for example, greater than 50% (e.g., 70-80%) of the entire screen. In another example, the size of the main screen 1402 dynamically changes in accordance with content displayed in the main screen 1402 and/or in one or both of the secondary screens 1404 and 1406.

In some embodiments, the media content displayed in the main screen 1402 are received from an applicable source such as a media provider system (e.g., the media provider system 102 in FIG. 1) and a media, social, market delivery system (e.g., the media, social, market delivery system 108 in FIG. 1).

In some embodiments, at least one of the vertical secondary screen 1404 and the horizontal secondary screen 1406 is provided to display advertisement content. The advertisement content may be a still image, a sequence of still images with limited movement (e.g., each containing different advertisement objects), or a video image. For example, the limited movement may be implemented by applicable animations, such as wiping out an advertisement image and wiping in another advertisement image, and fading out an advertisement image and fading in another advertisement image. Depending upon a specific implementation of the embodiment, the direction of the wiping in/out may be in an applicable direction such as a horizontal or vertical direction. Advantageously, no or limited movement of images in the advertisement content are less likely distract viewers from media content displayed in the main screen 1402. Further, advertisement content may be without audio content, for the similar advantage as the no or limited movement of images.

In some embodiments, the number and location of the secondary screen(s) (e.g., the vertical secondary screen 1404 and the horizontal secondary screen 1406) can be selected appropriately. For example, the secondary screen(s) are located at fixed position(s). In another example, the secondary screen(s) are located at user-specified position(s). Further, a size of the secondary screen(s) is in an applicable size. For example, the size of the secondary screen(s) is fixed to a predetermined size. In another example, the secondary screen(s) is in a user-specified size. In still another example, the size of the secondary screen(s) dynamically changes in accordance with content displayed in the secondary screen(s) and/or content displayed in the main screen 1402.

Depending upon a specific implementation of the embodiment, the advertisement content may be associated with various applicable parameters. In a specific implementation, the advertisement content may be associated with media content displayed in the main screen 1402, such that an efficient promoting effect can be provided to advertisers. For example, when the media content displayed in the main screen 1402 are a live sports scene, the advertisement content may contain one or more of athletic clothes, beverages, and food products. In a specific implementation, the advertisement content may be associated with a user profile of the media platform system. For example, the advertisement content are associated with a use history of the user, which may be stored in applicable datastore of the media platform system and provided to an applicable destination such as an advertisement provider system (e.g., the advertisement provider system 104 in FIG. 1) and a media, social, market delivery system (e.g., the media, social, market delivery system 108 in FIG. 1) at a predetermined timing (e.g., daily). The use history may include one or more of a channel selection history, a program view history, and a product purchase history through the purchase mode.

Depending upon a specific implementation of the embodiment, one or both of the vertical secondary screen 1404 and the horizontal secondary screen 1406 display advertisement content at applicable timing and duration. For example, one or both of the vertical secondary screen 1404 and the horizontal secondary screen 1406 may solely display advertisement content. In another example, one or both of the vertical secondary screen 1404 and the horizontal secondary screen 1406 may display advertisement content in an occasion and non-advertisement content in another occasion. In still another example, when one of the vertical secondary screen 1404 and the horizontal secondary screen 1406 displays advertisement content, the other of the vertical secondary screen 1404 and the horizontal secondary screen 1406 displays non-advertisement content. In still another example, one or both of the vertical secondary screen 1404 and the horizontal secondary screen 1406 displays advertisement content unless non-advertisement content are available, and switches display content from the advertisement content to the non-advertisement content upon the non-advertisement content being available. In still another example, advertisement content displayed in the vertical secondary screen 1404 and the horizontal secondary screen 1406 may be synchronized, such that a single advertisement scene can be displayed.

Depending upon a specific implementation of the embodiment, the non-advertisement content may include content associated with the media content displayed in the main screen 1402. For example, when the main screen 1402 displays a live sports scene, the non-advertisement content may include information relevant to the sports (e.g., player stats, game stats, fantasy stats, scoring details, information of other venues of the same sports, SNS feeds related to the sports event, news related to the sports event, etc.).

In some embodiments, the advertisement content displayed in one or both of the vertical secondary screen 1404 and the horizontal secondary screen 1406 are received from an applicable source such as an advertisement provider system (e.g., the advertisement provider system 104 in FIG. 1). In some embodiments, the non-advertisement content displayed in one or both of the vertical secondary screen 1404 and the horizontal secondary screen 1406 are received from an applicable source such as a media provider system (e.g., the media provider system 102 in FIG. 1) and a media, social, market delivery system (e.g., the media, social, market delivery system 108 in FIG. 1).

In some embodiments, the stadium mode is implemented by an applicable engine such as a stadium mode interface engine (e.g., the stadium mode interface engine 214 in FIG. 2). In some embodiments, the stadium mode is available when content metadata (e.g., channel, program, and media content) of the media content, which are received from an applicable source (e.g., the media provider system 102 or the media, social, market delivery system 108 in FIG. 1), indicates that the media content are compatible with the stadium mode. In some embodiments, the stadium mode may require preapproval (e.g., user authentication) by an applicable system (e.g., the media, social, market delivery system 108 in FIG. 1) to use the function before activating the stadium mode, and the preapproval may also require fees.

Figure 16:
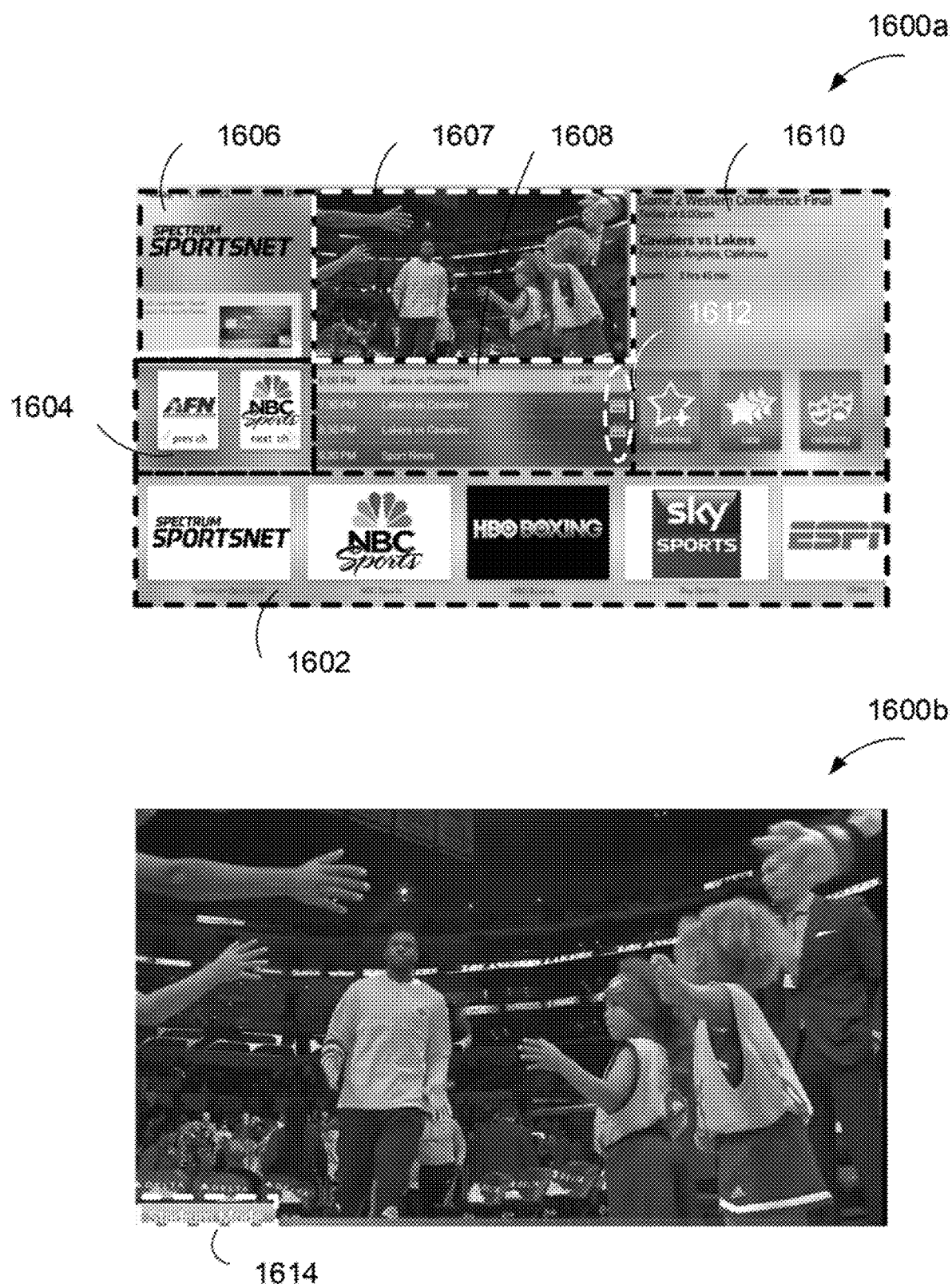
Figure 17:
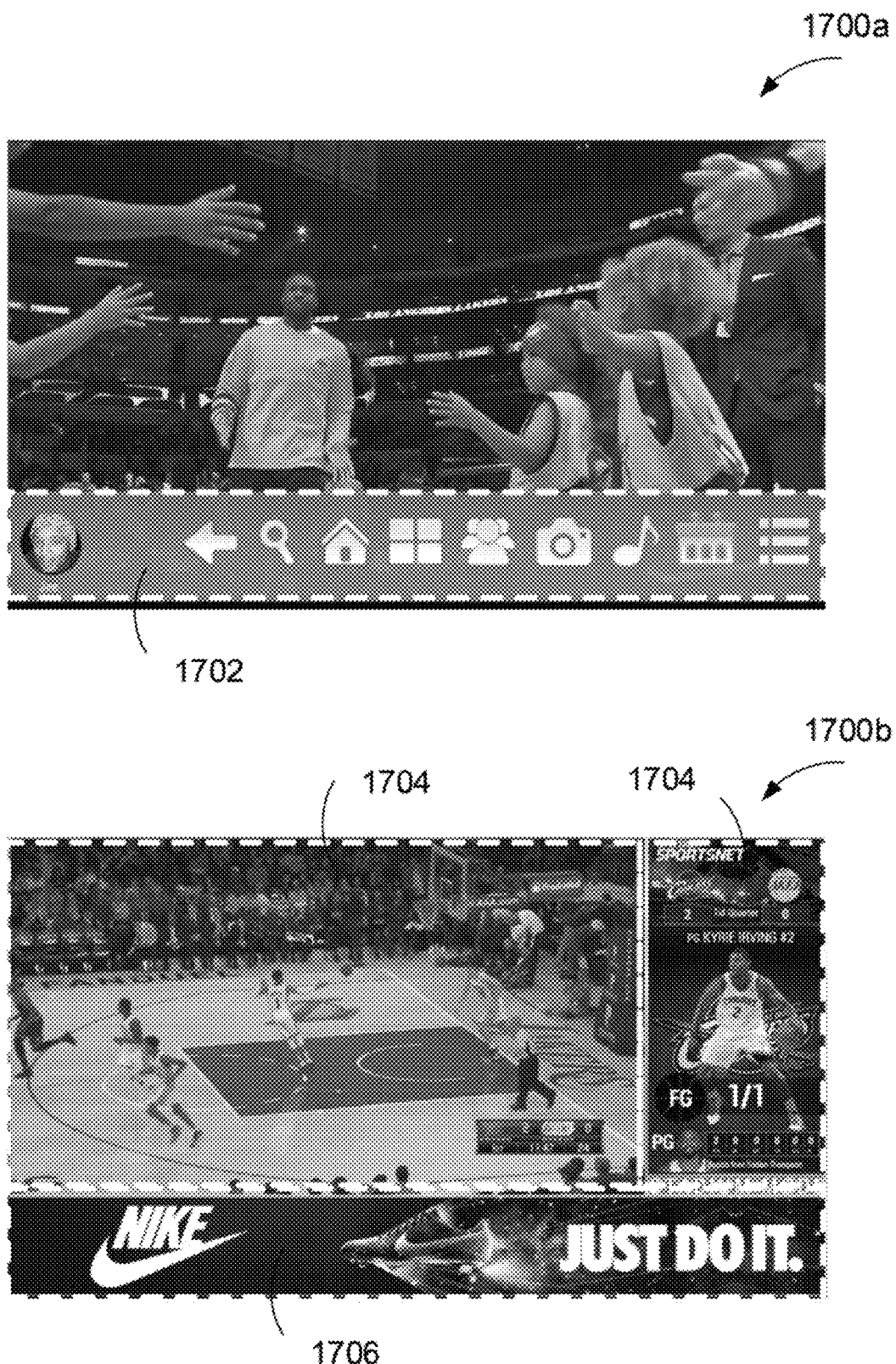

FIGS. 15-17 illustrate an example of screen transition to activate a stadium mode. FIGS. 15-17 illustrate screens 1500a and 1100b, 1200a and 1200b, and 1300a and 1300b, respectively, and the screen transition is assumed to occur in this order.

In the example of FIG. 15, the screen 1500a corresponds to a main menu, and includes a menu bar 1502 and a main navigation panel 1504. More particularly, the screen 1500a is at a state where a selectable object indicating "live" is selected in the menu bar 1502 and objects corresponding to live content are displayed in the main navigation panel 1504.

In the example of FIG. 15, the screen 1500b corresponds to a screen after a selectable object indicating "sports" is selected in the main navigation panel 1504 of the screen 1500a, and includes a group of selectable objects 1506 each of which corresponds to a channel that broadcasts unique media content.

In the example of FIG. 16, the screen 1600a corresponds to a screen after a selectable object indicating "sportsnet" on the left top corner is selected from the group of selectable objects 1506, and includes a channel selection bar 1602, a channel shift window 1604, a selected channel window 1606, a selected channel content screen 1608, a selected channel time table 1610, and a current program window 1612.

The channel selection bar 1602 includes one or more selectable objects corresponding to the group of selectable objects 1506 included in the screen 1500b in FIG. 15. In some embodiments, the channel selection bar 1602 indicates the selected object in the screen 1500b at a predetermined position (e.g., end of the displayed selectable objects). In some embodiments, when one of the selectable objects in the selection bar 1602 is selected, the screen 1600a is updated for the channel corresponding to the selectable object selected in the selection bar 1602.

The channel shift window 1604 includes selectable objects corresponding to a previous channel and a next channel of the channel corresponding to the selected object in the screen 1500b. In some embodiments, when one of the selectable objects in the channel shift window 1604 is selected, the screen 1600a is updated for the next channel or the previous channel. The selected channel window 1606 includes an applicable image (e.g., the title logo) of the channel selected in the screen 1500b.

The selected channel content screen 1608 includes media content that is currently played back in the channel selected in the screen 1500b. An aspect ratio of the selected channel content screen 1608 is in an applicable ratio. For example, the selected channel content screen 1608 have the same aspect ratio as a full screen of the media content.

The selected channel time table 1610 includes a time table of the channel selected in the screen 1500b. The time table includes one or more entries each of which corresponds to a unique time frame of a content program in the selected channel. Depending on a specific implementation, an entry including the current time is highlighted and selectable, which causes transition to full screen of the current media content in the selected channel. Further, one or more entries in the time table for which a stadium mode is available includes a mark 1614 indicating that the corresponding time frame is stadium-mode-compatible.

The current program window 1612 includes information of the current media content played back in the channel selected in the screen 1500b. In some embodiments, the current program window 1612 also includes one or more selectable objects to put tags the selected channel or the media content. For example, the tags include favorites bookmark, rating, and so on. In some embodiments, the current program window 1612 also includes one or more selectable objects to view information of celebrity associated with the media content. For example, when a sports game is on the media content, information of a famous player associated with the sports game is accessible from the one or more selectable objects in the current program window 1612.

In the example of FIG. 16, the screen 1600b corresponds to a full screen of the current media content of the selected channel. In some embodiments, the screen 1600b includes an indicator 1614 that the media content in the screen 1600b is compatible with the stadium mode.

In the example of FIG. 17, the screen 1700a corresponds to a screen when a smart bar 1702 is pulled up in a state where the full screen of the current media content is displayed. Since the stadium mode is available for the current media content, the smart bar 1702 includes a selectable object 1704 for the stadium mode. In some embodiments, the selectable object 1704 is highlighted to emphasize that the stadium mode is available.

In the example of FIG. 17, the screen 1700b corresponds to a screen after the selectable object 1704 for the stadium mode is selected in the screen 1700a, and includes a main screen 1702, a vertical secondary screen 1704, and a horizontal secondary screen 1706. In the example of FIG. 17, the main screen 1702 is a smaller version of the full-screen current media content, the vertical secondary screen 1704 includes game stats, and the horizontal secondary screen 1706 includes advertisement content associated with the media content.

In some embodiments, when the current media content end and the next media content in the same channel are not compatible with the stadium mode, the main screen 1702 automatically expands to a full-screen and the vertical secondary screen 1704 and the horizontal secondary screen 1706 disappear. In some embodiments, when the current media content end and the next media content in the same channel are not compatible with the stadium mode, the main screen 1702, the vertical secondary screen 1704, and the horizontal secondary screen 1706 are maintained, and media content including advertisement content are displayed in the main screen 1702.

Figure 18:
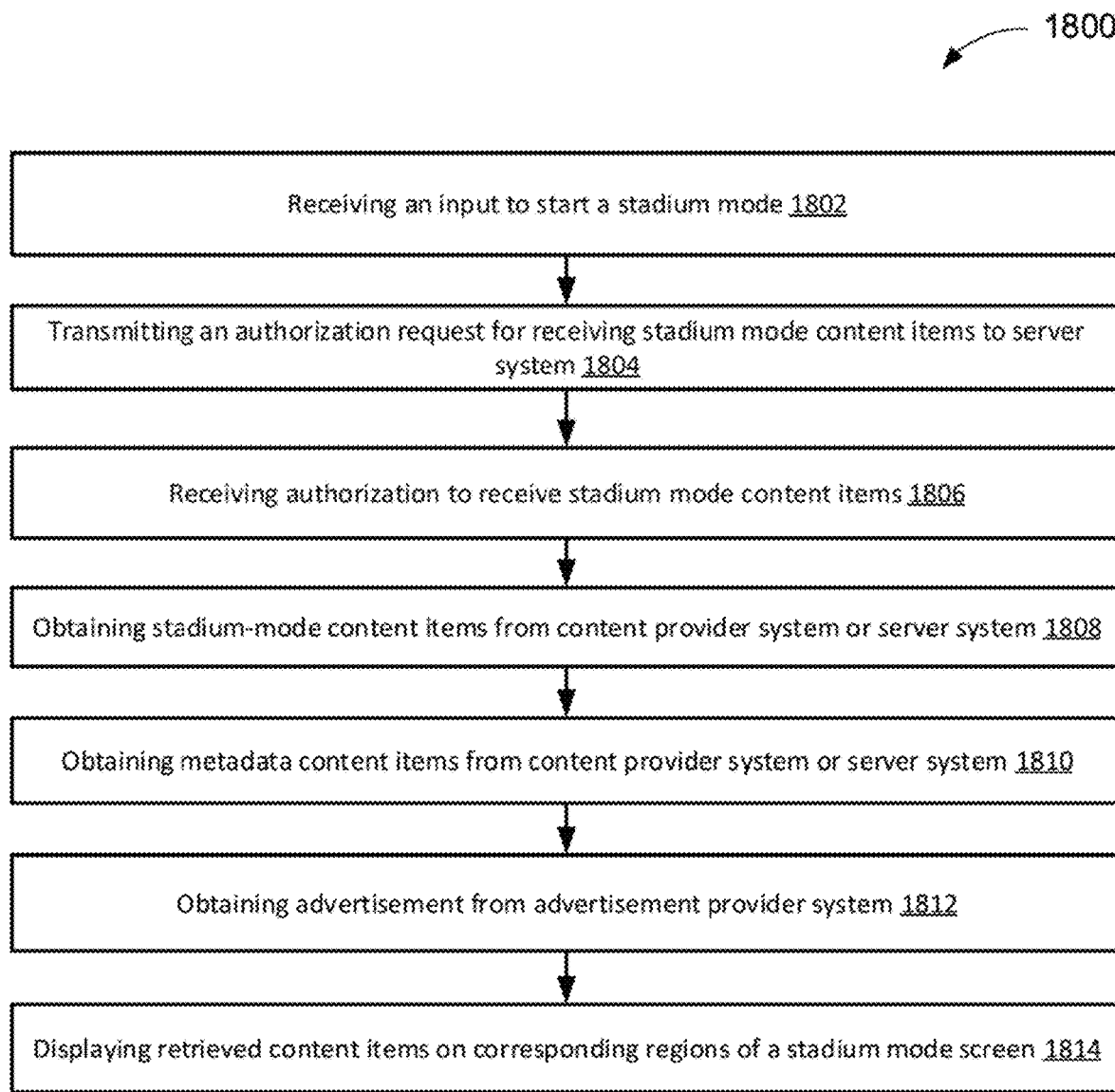
FIG. 18 illustrates a flowchart of an example method of operation of a stadium mode according to some embodiments.

FIG. 18 illustrates a flowchart 1800 of an example method of operation of a stadium mode according to some embodiments. In step 1802, an input to start (activate) a stadium mode is received. An applicable engine for receiving an input to start a stadium mode (e.g., the stadium mode interface engine 214 in FIG. 2) described in this paper, can receive the input to start the stadium mode. In some embodiments, the input to start the stadium mode is received from a dedicated remote control device coupled to the media platform system or a wireless mobile device, when the smart bar including the selectable object for the stadium mode is displayed on a screen. In another embodiment, the inputs may be voice or gestures made by human agents, such as users or viewers.

In step 1804, optionally, an authorization request for receiving stadium mode content is transmitted to an applicable system (e.g., the media, social and market delivery system 108 in FIG. 1). An applicable engine for transmitting an authorization request (e.g., the stadium mode interface engine 214 in FIG. 2) described in this paper, can transmit the authorization request through an applicable interface connected to a communication network (e.g., the communications network 112 in FIG. 1).

In step 1806, optionally when step 1804 is carried out, authorization to receive stadium mode content is received from an applicable system (e.g., the media, social and market delivery system 108 in FIG. 1). An applicable engine for receiving authorization (e.g., the stadium mode interface engine 214 in FIG. 2) described in this paper, can receive the authorization to receive stadium mode content.

In step 1808, stadium mode content are obtained. An applicable engine for obtaining stadium mode content (e.g., the stadium mode interface engine 214 in FIG. 2) described in this paper, can obtain stadium mode content from an applicable source (e.g., the media provider system 102 and/or the media, social and market delivery system 108 in FIG. 1). In some embodiments, the stadium mode content are original media content that do not include advertisement interruption or filtered media content from which advertisement content are filtered out.

In step 1810, optionally, non-advertisement content are obtained. An applicable engine for obtaining non-advertisement content (e.g., the stadium mode interface engine 214 in FIG. 2) described in this paper, can obtain non-advertisement content from an applicable source (e.g., the media provider system 102 and/or the media, social and market delivery system 108 in FIG. 1). In some embodiments, the non-advertisement content include content associated with the stadium mode content obtained in step 1808.

In step 1812, advertisement content are obtained. An applicable engine for obtaining advertisement content (e.g., the stadium mode interface engine 214 in FIG. 2) described in this paper, can obtain advertisement content from an applicable source (e.g., the advertisement provider system 104 in FIG. 1). In some embodiments, the advertisement content include content associated with the stadium mode content obtained in step 1808.

In step 1814, content obtained in steps 1808, (1810 optionally), and 1812 are presented on corresponding regions of a stadium mode screen. An applicable engine for presenting obtained content (e.g., the stadium mode interface engine 214 in FIG. 2) described in this paper, can present the obtained content on a stadium mode screen. In some embodiments, the stadium mode screen includes a main screen (e.g., the main screen 1402 in FIG. 14) for displaying the stadium mode content and one or more secondary screens (e.g., the secondary screens 1404 and 1406) for displaying the advertisement content and the non-advertisement content.

Advantageously, according to the stadium mode discussed above, a media platform system can provide viewers live media content without interruption or with limited interruption of the live media content by advertisement content, while providing advertisement space for media providers of the live media content. Further, according to the stadium mode discussed above, the stadium mode screen can also display non-advertisement content associated with the live media content. Since, viewers can access some useful information through the non-advertisement content while watching the live media content, use of the stadium mode can be further promoted.

Figure 19:
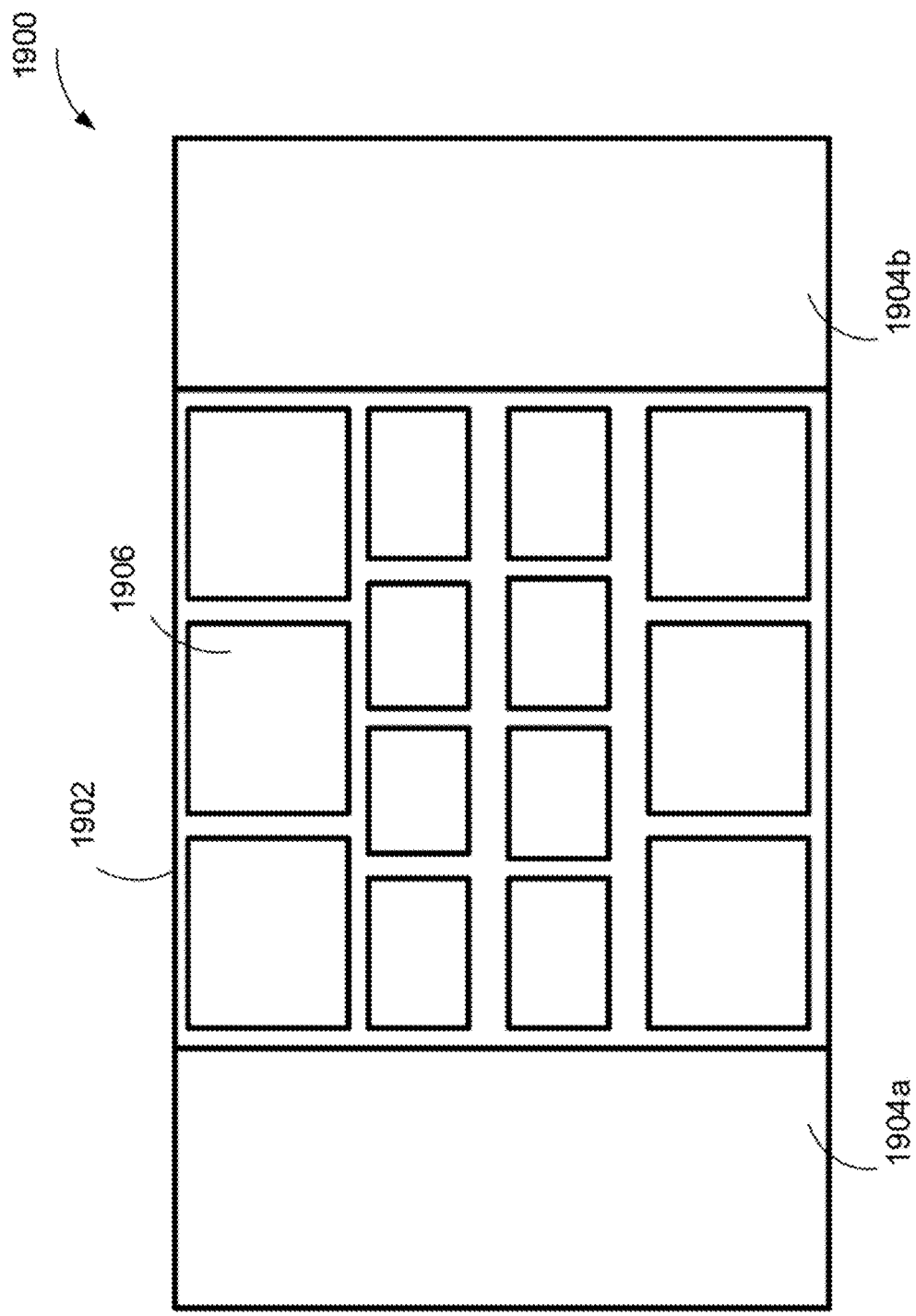
FIG. 19 illustrates an example of a billboard screen that is displayed when a media platform system is started according to some embodiments.

FIG. 19 illustrates an example of a billboard screen 1900 that is displayed when a media platform system is started according to some embodiments. The billboard screen 1900 is capable of providing a user with content options that are associated with the user and enables the user to more efficiently proceed to a media content that the user is interested in. In some embodiments, the billboard screen 1900 is displayed as an initial screen after user authentication or user login has been completed, and before a main menu screen (e.g., the screen 2300 shown in FIG. 23) is displayed. In the example in FIG. 19, the billboard screen 1900 includes a main billboard screen 1902, a left secondary screen 1904a at a left edge of the main billboard screen 1902, and a right secondary screen 1904b at a right edge of the main billboard screen 1902.

In some embodiments, the main billboard screen 1902 is provided to display a plurality of panels 1906 that represent media content such as channels or programs that are available or promoted to viewers. In a more specific implementation, the panels 1906 displayed in the main billboard screen 1902 include selectable panels corresponding to media content, such as movies, television programs, music, live sports content, and live performance content, and so on. In addition, the panels 1906 may also include selectable panels corresponding to news feeds, celebrity pages, shopping pages, user pages, games, internet pages, friends social pages, and applications (e.g., Netflix, HBO, Now, etc.) to name a few. Once a selectable panel is selected, a screen transitions to a screen associated with the content included in the selected panel.

The panels 1906 in the main billboard screen 1902 may be a still image, a sequence of still images with limited movement (e.g., each containing different advertisement objects), a video image, or combination thereof. For example, the limited movement may be implemented by applicable animations, such as flipping of the panels, sliding in/out of the panels and so on. Depending upon a specific implementation of the embodiment, the flipping direction of the panels may be in an applicable direction such as a horizontal or vertical direction. Advantageously, some movement of the panels 1906 in the main billboard screen 1902 are more likely to attract viewers to the panels 1906 in the main billboard screen 1902. Further, advertisement content may be with audio content associated with the movement of the panels 1906, for the similar advantage as the movement of the panels 1906.

Depending upon a specific implementation of the embodiment, when the panels 1906 are provided with animation, various applicable display techniques may be employed. For example, the content displayed on the flipped side of a panel may include different content from the content on the original side of the panel. That is, an original side of a panel may include a movie, and the opposite side of the panel may include a newsfeed. In another example, the timing to flip the panels 1906 may be appropriately determined. In some implementations, the timing to flip the panels 1906 are independent from each other, so as to attract more attention of viewers to the flipped panel. In alternative implementations, the timing to flip the panels 1906 are interrelated to each other, so as to provide more organized animation to viewers. Content on the flipped panels may recurrently displayed on the same panel or different panel according to an applicable algorithm.

Depending upon a specific implementation of the embodiment, the sizes of the panels 1906 may be associated with various applicable parameters. For example, a size of a panel that represents content of greater association (e.g., higher frequency to visit the content, inclusion in favorites, most recent visit to the content, and so on, with a user may be larger than a size of a panel that represents content of lesser association with the user. In another example, a size of a panel that represents content having more viewers to may be larger size of a panel that represents content having less viewers.

Depending upon a specific implementation of the embodiment, the arrangement of the panels 1906 may be associated with various applicable parameters. For example, a panel that represents content of greater association (e.g., higher frequency to visit the content, inclusion in favorites, most recent visit to the content, and so on, with a user may be located at a center (or top) in the main billboard screen 1902. In another example, a panel that represents content having more viewers to may be located at a position closer to the center (or top) in the main billboard screen 1902, than a panel that represents content having less viewers is. In some implementations, a larger panel may be located at a position closer to the center in the main billboard screen 1902, than a smaller panel.

Depending upon a specific implementation of the embodiment, a plurality of panels among the panels 1906 may correspond to a single media content. For example, each of the plurality of panels among the panels 1906 may represent a single movie content.

Depending upon a specific implementation of the embodiment, an aspect ratio of the main billboard screen 1902 is in an applicable ratio. For example, the main billboard screen 1902 has the same aspect ratio (e.g., 16:9) as a full screen during a normal display of media content. Further, a size of the main billboard screen 1902 is in an applicable size. For example, the size of the main billboard screen 1902 is fixed to a predetermined size, which is for example, greater than 50% (e.g., 70-80%) of the entire screen. In another example, the size of the main billboard screen 1902 dynamically changes in accordance with content displayed in the main billboard screen 1902 and/or in one or both of the left and right secondary screens 1904a and 1904b.

Depending upon a specific implementation of the embodiment, an aspect ratio of the main billboard screen 1902 is in an applicable ratio. For example, the main billboard screen 1902 has the same aspect ratio (e.g., 16:9) as a full screen during a normal display of media content. Further, a size of the main billboard screen 1902 is in an applicable size. For example, the size of the main billboard screen 1902 is fixed to a predetermined size, which is for example, greater than 50% (e.g., 70-80%) of the entire screen. In another example, the size of the main billboard screen 1902 dynamically changes in accordance with content displayed in the main billboard screen 1902 and/or in one or both of the left and right secondary screens 1904a and 1904b.

Depending upon a specific implementation of the embodiment, an aspect ratio of the panels 1906 is in an applicable ratio. For example, the panels 1906 has the same aspect ratio (e.g., 16:9) as each other. In another example, the panels 1906 has different aspect ratio depending on content to be displayed therein.

In some embodiments, the content displayed in the panels 1906 of the main billboard screen 1902 are associated with a user (e.g., user account). In a more specific implementation of the embodiment, the content displayed in the panels 1906 are associated with access frequency by the user. For example, a panel representing a content (e.g., channel) that has been accessed by the user above a predetermined threshold (e.g., at least once in the past week) is configured to be displayed in the main billboard screen 1902. In another specific implementation of the embodiment, the content displayed in the panels 1906 are associated with user's selection. For example, a panel representing a content (e.g., channel) that has been selected as a favorite is configured to be displayed in the main billboard screen 1902. In this case, the panel representing a content (e.g., channel) that has been selected as favorite may be fixed (pinned) at a user-selected or predetermined position in the main billboard screen 1902 along with an indicator (e.g., pin). In another specific implementation of the embodiment, the content displayed in the panels 1906 are displayed along with an indicator (e.g., icon, mark, emoji, etc.) indicating a type (e.g., TV, movie, music, sports, game, etc.) of media content accessible therethrough. For example, when media content corresponding to a panel is a game, a mark of a game controller may be overlaid on the panel. In another specific implementation of the embodiment, indicators overlaid on the panels 1906 are located at an applicable position that provides high contrast with respect to main images on the panels 1906. For example, when a white indicator is overlaid on a dark-color portion (e.g., black, gray, navy, etc.) of an main image, if any. In another example, a color of the indicator is selected depending on color of an main image.

In some embodiments, the content to be displayed in the panels 1506 of the main billboard screen 1902 are received from an applicable source such as a media provider system (e.g., the media provider system 102 in FIG. 1) and a media, social, market delivery system (e.g., the media, social, market delivery system 108 in FIG. 1). Further, for the media provider system and/or the media, social, market delivery system to generate the content to be displayed in the panels 1506, the media platform system provides user's interaction manner (e.g., use history) to the media provider system and/or the media, social, market delivery system.

In FIG. 19, at least one of the left secondary screen 1904*a* and the right secondary screen 1904*b* is provided to display advertisement content. The advertisement content may be a still image, a sequence of still images with limited movement (e.g., each containing different advertisement objects), or a video image. For example, the limited movement may be implemented by applicable animations, such as wiping out an advertisement image and wiping in another advertisement image, and fading out an advertisement image and fading in another advertisement image. Depending upon a specific implementation of the embodiment, the direction of the wiping in/out may be in an applicable direction such as a horizontal or vertical direction. Advantageously, no or limited movement of images in the advertisement content are less likely distract viewers from media content displayed in the main billboard screen 1902. Further, advertisement content may be without audio content, for the similar advantage as the no or limited movement of images.

In some embodiments, at least one of the left secondary screen 1904*a* and the right secondary screen 1904*b* includes a plurality of panels in which the advertisement content are displayed in a similar manner as the panels 1506 in the main billboard screen 1902. In this case, the manner of displaying the panels may employ the similar display manner as that of the panels 1506. For example, a plurality of panels in at least one of the left secondary screen 1904*a* and the right secondary screen 1904*b* may correspond to one advertisement object (e.g., advertised product). In another example, the panels in at least one of the left secondary screen 1904*a* and the right secondary screen 1904*b* flip to display different content (e.g., different advertisement object). In another example, the panels in at least one of the left secondary screen 1904*a* and the right secondary screen 1904*b* are selectable. Upon selection of one of the panels in the left secondary screen 1904*a* or the right secondary screen 1904*b*, a new screen (e.g., webpage) corresponding to advertisement object included in the selected panel may be displayed.

In some embodiments, the number and location of the secondary screen(s) (e.g., the left secondary screen 1904*a* and the right secondary screen 1904*b*) can be selected appropriately. For example, the secondary screen(s) are located at fixed position(s). In another example, the secondary screen(s) are located at user-specified position(s). Further, a size of the secondary screen(s) is in an applicable size. For example, the size of the secondary screen(s) is fixed to a predetermined size. In another example, the secondary screen(s) is in a user-specified size. In still another example, the size of the secondary screen(s) dynamically changes in accordance with content displayed in the secondary screen(s) and/or content displayed in the main billboard screen 1902. In another example, the size of a plurality of secondary screens is the same.

Depending upon a specific implementation of the embodiment, the advertisement content may be associated with various applicable parameters. In a specific implementation, the advertisement content may be associated with media content displayed in the main billboard screen 1902, such that an efficient promoting effect can be provided to advertisers. For example, when the media content displayed in the main billboard screen 1902 includes an emphasized panel representing a drama, the advertisement content may contain one or more of another drama started by a main actor of the drama in the panel. In another specific implementation, the advertisement content may be associated with a user profile of the media platform system. For example, the advertisement content are associated with a use history of the user, which may be stored in applicable datastore of the media platform system and provided to an applicable destination such as an advertisement provider system (e.g., the advertisement provider system 104 in FIG. 1) and a media, social, market delivery system (e.g., the media, social, market delivery system 108 in FIG. 1) at a predetermined timing (e.g., daily or weekly). The use history may include one or more of a channel selection history, a program view history, and a product purchase history through the purchase mode. In another example, the advertisement content may be associated with a celebrity followed by a user (e.g., endorsed by the celebrity) in the media platform system, associated with a product that is liked or endorsed by the user's friends, and an entity that sponsors media content in a panel.

Depending upon a specific implementation of the embodiment, one or both of the left secondary screen 1904*a* and the right secondary screen 1904*b* display advertisement content at applicable timing and duration. For example, one or both of the left secondary screen 1904*a* and the right secondary screen 1904*b* may solely display advertisement content. In another example, one or both of the left secondary screen 1904*a* and the right secondary screen 1904*b* may display advertisement content in an occasion and non-advertisement content in another occasion. In still another example, when one of the left secondary screen 1904*a* and the right secondary screen 1904*b* displays advertisement content, the other of the left secondary screen 1904*a* and the right secondary screen 1904*b* displays non-advertisement content. In still another example, one or both of the left secondary screen 1904*a* and the right secondary screen 1904*b* displays advertisement content unless non-advertisement content are available, and switches display content from the advertisement content to the non-advertisement content upon the non-advertisement content being available. In still another example, advertisement content displayed in the left secondary screen 1904*a* and the right secondary screen 1904*b* may be synchronized, such that a single advertisement scene can be displayed.

In some embodiments, the advertisement content displayed in one or both of the left secondary screen 1904*a* and the right secondary screen 1904*b* are received from an applicable source such as an advertisement provider system (e.g., the advertisement provider system 104 in FIG. 1) on an applicable timing. In some embodiments, the non-advertisement content displayed in one or both of the left secondary screen 1904*a* and the right secondary screen 1904*b* are received from an applicable source such as a media provider system (e.g., the media provider system 102 in FIG. 1) and a media, social, market delivery system (e.g., the media, social, market delivery system 108 in FIG. 1) on a regular basis (e.g., daily or weekly).

In some embodiments, the stadium mode is implemented by an applicable engine such as an interactive programming guide engine (e.g., the interactive programming guide engine 206 in FIG. 2).

FIGS. 20-23 illustrate an example of screen transition including a billboard screen according to some embodiments. FIGS. 20-23 illustrate screens 2000, 2100, 2200, and 2300, respectively, and the screen transition is assumed to occur in this order.

Figure 20:
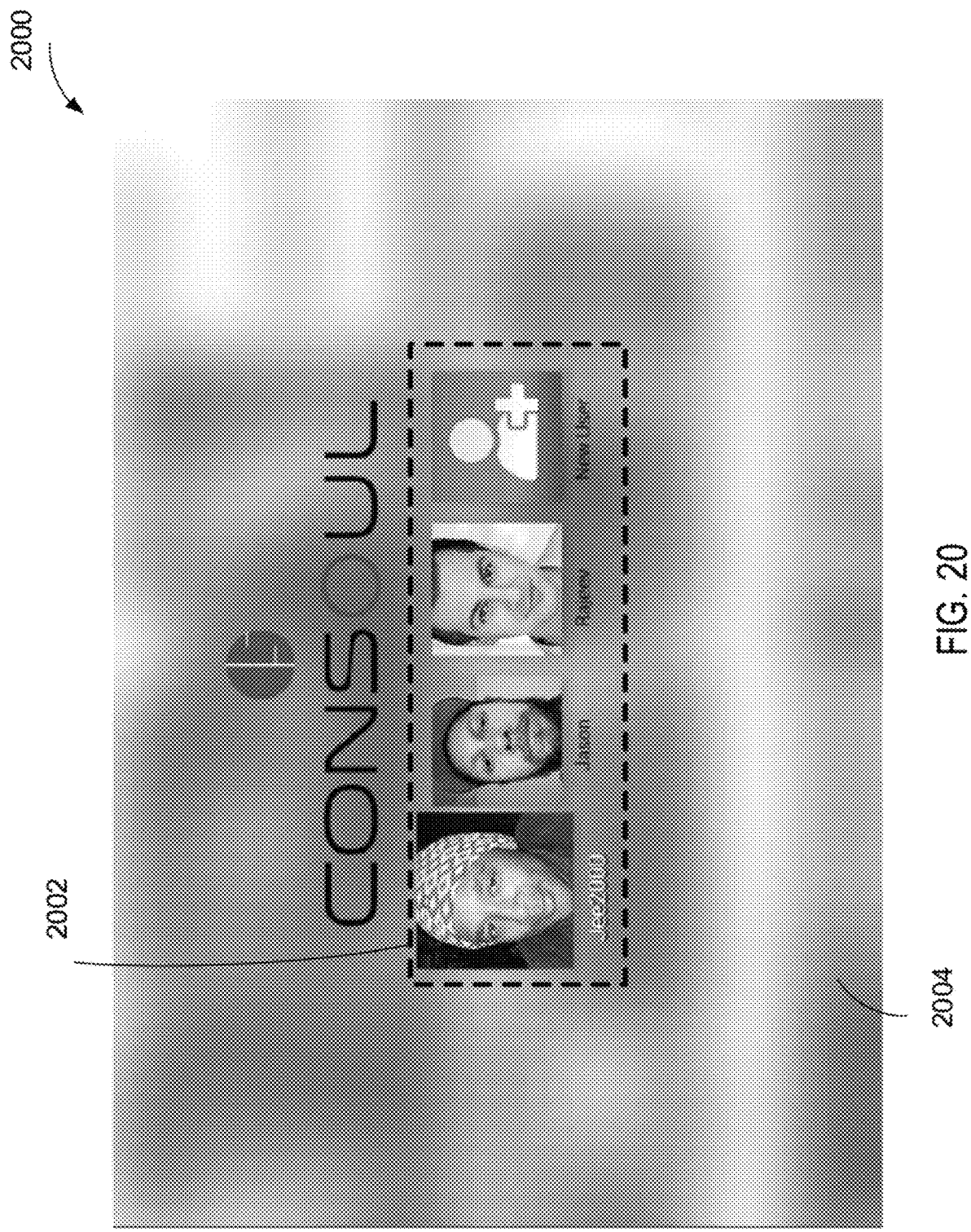
FIGS. 20-23 illustrate an example of screen transition including a billboard screen according to some embodiments.

In the example of FIG. 20, the screen 2000 corresponds to a login screen, and includes a user selection region 2002 overlaid on a background 2004. In some embodiments, the screen 2000 is displayed upon start (e.g., power on) of the media platform system. The user selection region 2002 is provided to select a user from one or more users associated with the media platform system. In a specific implementation, users that are registered with the media platform system are displayed in the user selection region 2002. When a new user is added, a selectable object to be registered as a new user is also provided in the user selection region 2002. The background 2004 may display applicable content. In some embodiments, as depicted in FIG. 20, blurred or scramble content (e.g., a billboard screen or a menu screen) may be displayed.

Figure 21:
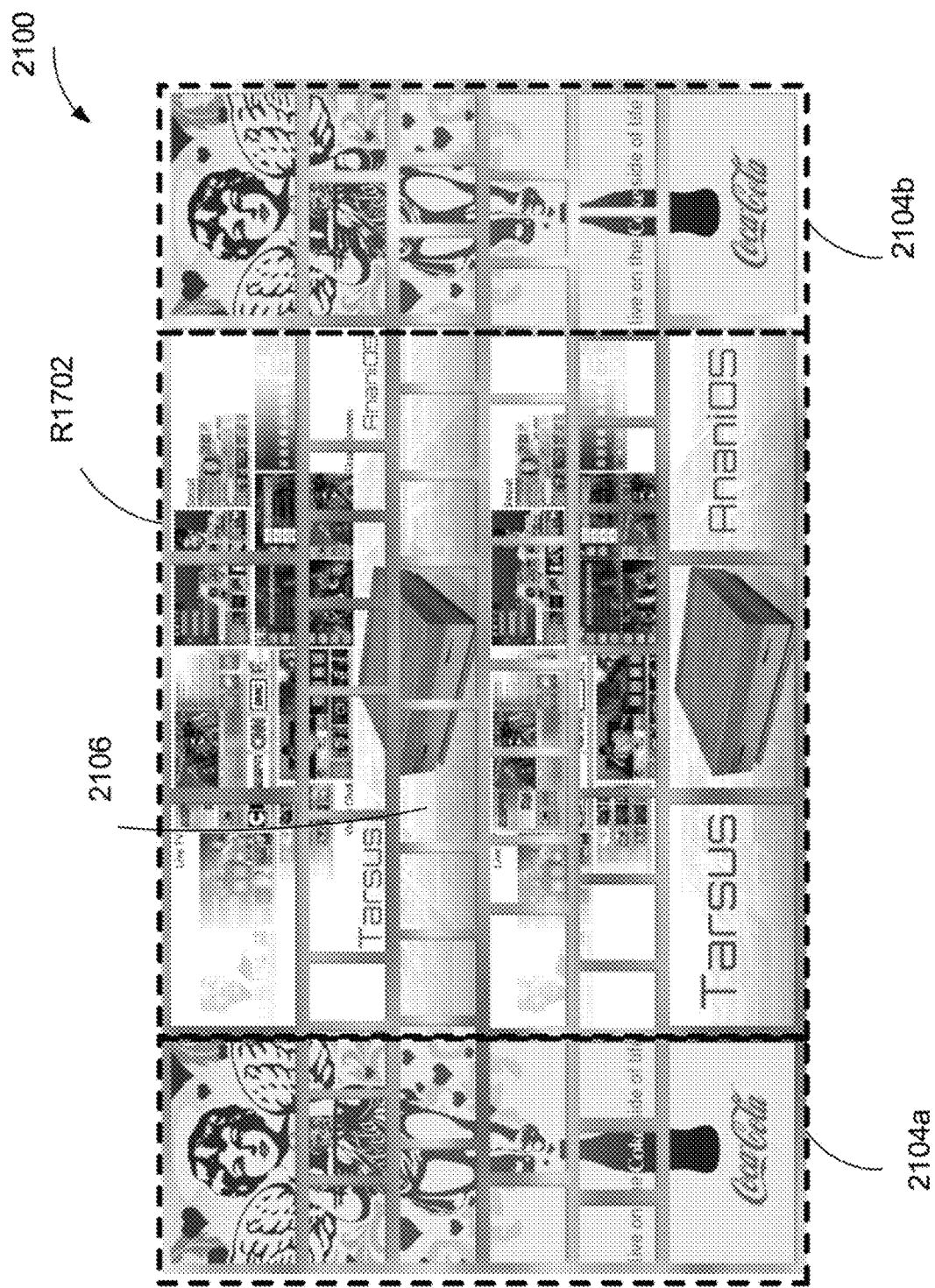

In the example of FIG. 21, the screen 2100 corresponds to an initial billboard screen after login through the screen 2000 in FIG. 20, and includes a main billboard screen 2102, a left secondary screen 2104*a*, and a right secondary screen 2104*b*. The main billboard screen 2102 includes a plurality of panels 2106 that indicate initial content, which may be unique to the user or predetermined content not associated with the user.

Figure 22:
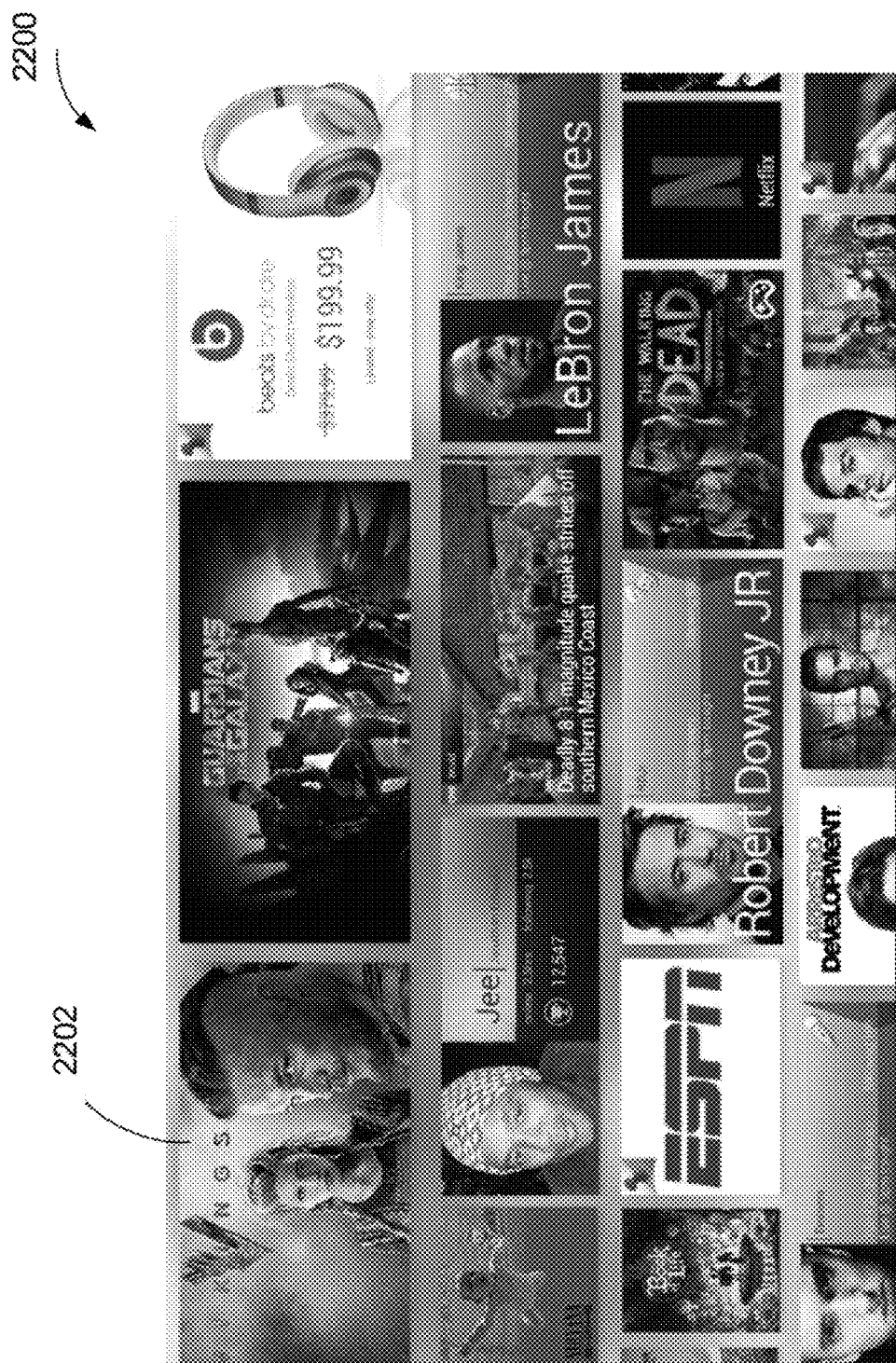

In the example of FIG. 22, the screen 2200 corresponds to a portion of a main billboard screen that transitions from the screen 2100, and includes a plurality of selectable panels 2202 at least part of which correspond to content available through the media platform system. By selecting one of the panels 2202, the user can proceed to a screen associated with the selected panel. For example, a user is able to proceed to an initial screen to playback a movie, by selecting a panel corresponding to the movie.

In the example of FIG. 23, the screen 2300 corresponds to a portion of a main menu, and includes a menu bar 2302 and a main navigation panel 2304. In some embodiments, the screen 2300 is displayed when none of selectable panels displayed in the main billboard screen 2200 is selected for a predetermined period of time and/or when a user input to proceed to the main menu is received, for example, through a remote controller. From the screen 2300, the user can proceed to user selected media content, such as the Internet, apps, social network content, TV, film (movie), live content, favorite content of the users, games, music, rewards, and so on.

Figure 24:
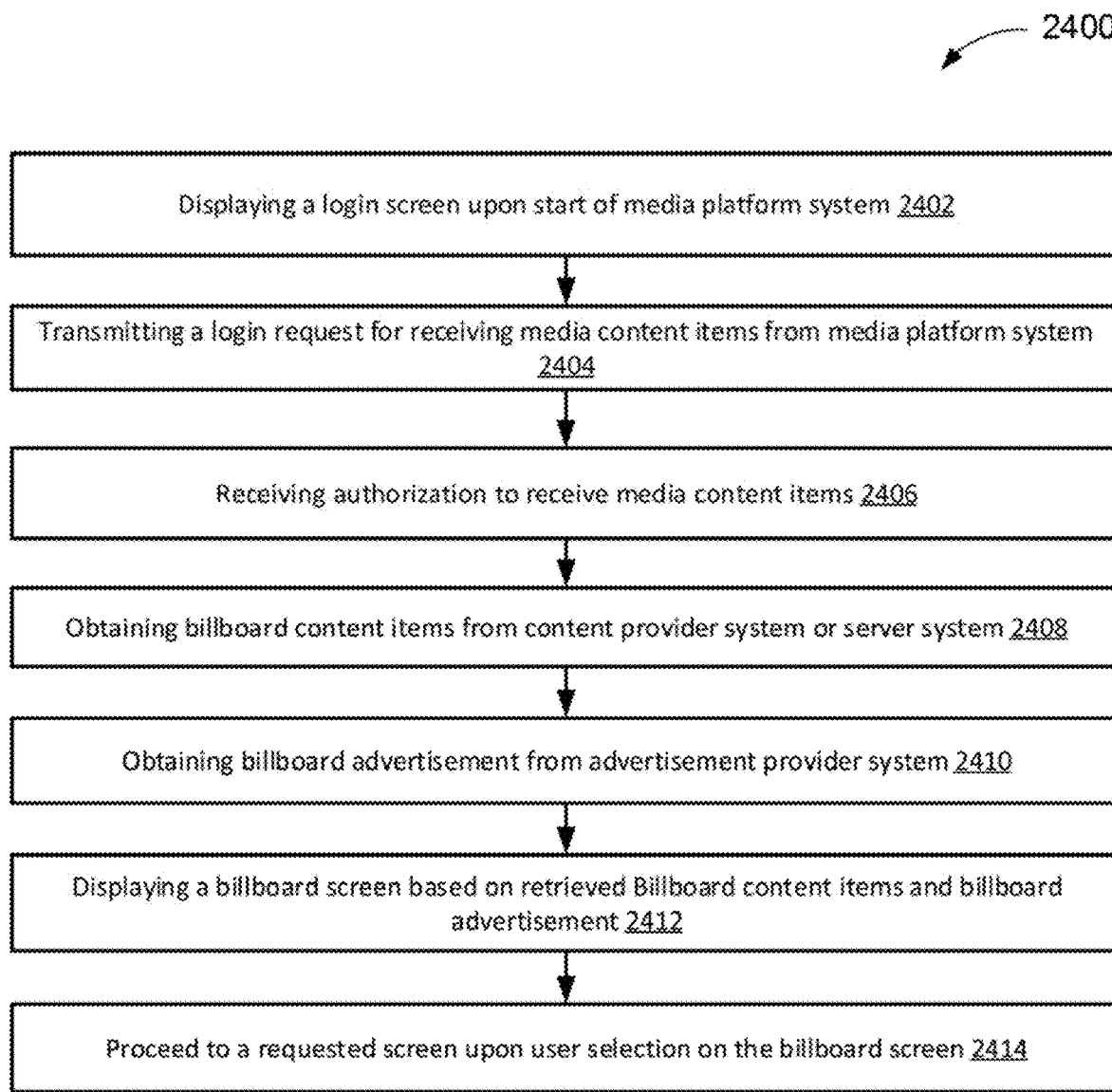
FIG. 24 illustrates a flowchart of an example method of displaying initial screens after start of a media platform system according to some embodiments.

FIG. 24 illustrates a flowchart 2400 of an example method of displaying initial screens after start of a media platform system according to some embodiments. In step 2402, a login screen is displayed upon start (e.g. power on) of a media platform system. An applicable engine for displaying a login screen (e.g., the interactive programming guide engine 206 in FIG. 2) described in this paper, can display the login screen on an applicable output device (e.g., the output subsystem 2206 in FIG. 2).

In step 2404, optionally, an authorization request for receiving media content items is transmitted to an applicable system (e.g., the media, social and market delivery system 108 in FIG. 1). An applicable engine for transmitting an authorization request (e.g., the stadium mode interface engine 214 in FIG. 2) described in this paper, can transmit the authorization request through an applicable interface connected to a communication network (e.g., the communications network 112 in FIG. 1).

In step 2406, optionally when step 2404 is carried out, authorization to receive media content items is received from an applicable system (e.g., the media, social and market delivery system 108 in FIG. 1). An applicable engine for receiving authorization (e.g., the stadium mode interface engine 214 in FIG. 2) described in this paper, can receive the authorization to receive media content items.

In step 2408, billboard content items are obtained. An applicable engine for obtaining billboard content items (e.g., the interactive programming guide engine 206 in FIG. 2) described in this paper, can obtain billboard content items from an applicable source (e.g., the media provider system 102 and/or the media, social and market delivery system 108 in FIG. 1). In some embodiments, the billboard content items are thumbnails of content available to the user and/or content promoted to the user based on a user profile (e.g., use history) of the user. In an alternative embodiment, step 2408 may be carried out regularly at predetermined timings, and therefore step 2408 may be carried out before step 2402, between steps 2402 and 2404, and between steps 2404 and 2406.

In step 2410, advertisement content are obtained. An applicable engine for obtaining advertisement content (e.g., the stadium mode interface engine 214 in FIG. 2) described in this paper, can obtain advertisement content from an applicable source (e.g., the advertisement provider system 104 in FIG. 1). In some embodiments, the advertisement content include content associated with the user profile (e.g., use history) of the user. In an alternative embodiment, step 2410 may be carried out regularly at predetermined timings, and therefore step 2410 may be carried out before step 2402, between steps 2402 and 2404, between steps 2404 and 2406, and between steps 2406 and 2408.

In step 2412, content obtained in steps 2408 and 2410 are presented on corresponding regions of a billboard screen. An applicable engine for presenting obtained content (e.g., the interactive programming guide engine 206 in FIG. 2) described in this paper, can present the obtained content on a billboard screen. In some embodiments, the billboard screen includes a main billboard screen (e.g., the main billboard screen 1902 in FIG. 19) for displaying panels corresponding to available or recommended media content and one or more secondary screens (e.g., the secondary screens 1904*a* and 1904*b*) for displaying the advertisement content and/or the non-advertisement content.

Advantageously, according to the billboard screen discussed above, a media platform system can provide a user with a user-specific initial screen (billboard) to efficiently access content without transitioning to a non-user-specific screen (e.g., main menu) after the user logs in on a media platform system. In other words, a user can access intended media content directly through the user-specific initial screen without accessing the non-user-specific screen. Since content options that the user is more likely to select can be shown in the billboard screen, it is possible to provide a more user-friendly GUI through which the user can be more efficiently navigated to the intended media content.

Figure 25:
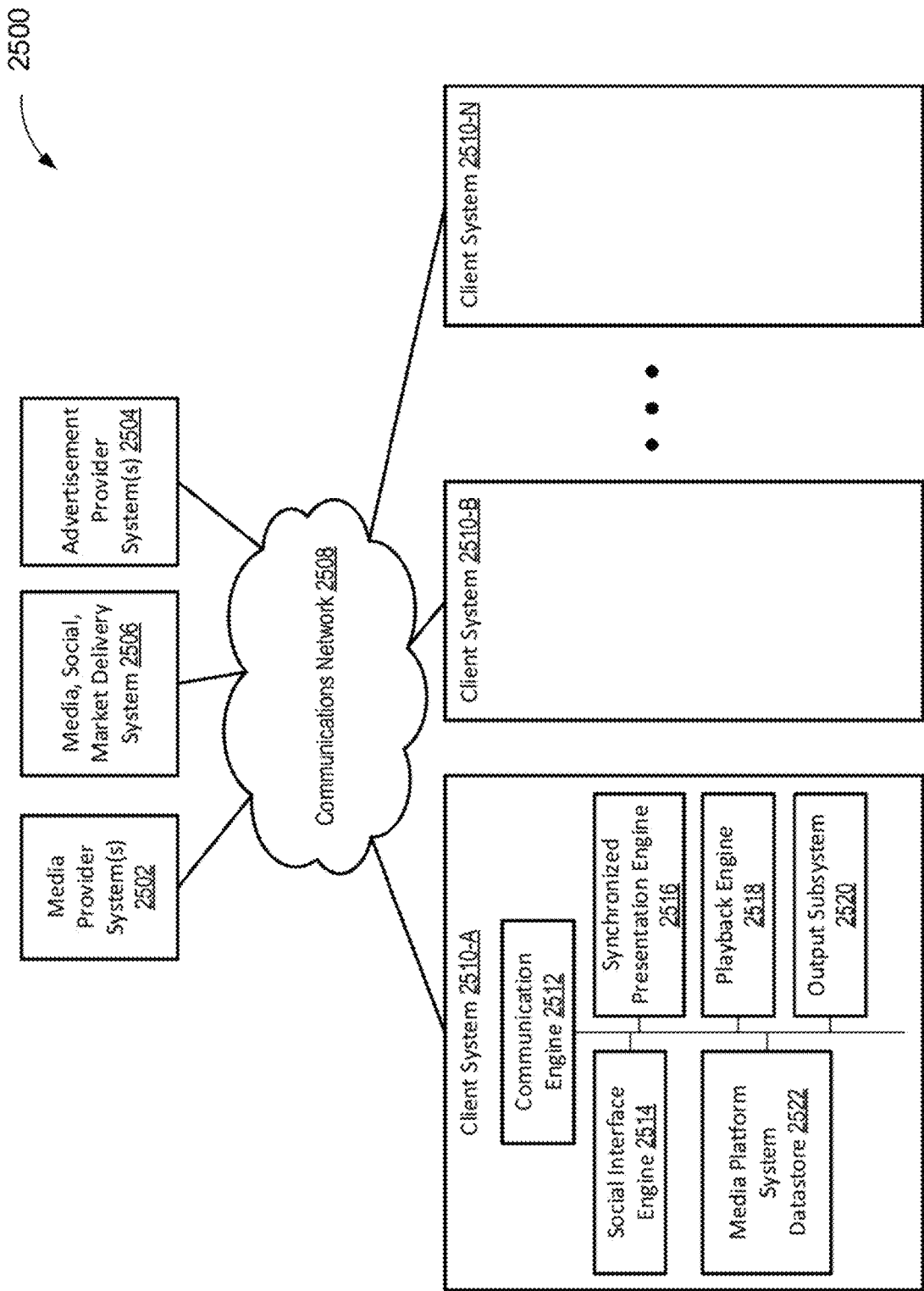
FIG. 25 illustrates an example of systems to carry out a synchronized presentation according to some embodiments.

FIG. 25 illustrates an example 2500 of systems to carry out a synchronized presentation according to some embodiments. The synchronized presentation discussed in this paper is intended to represent synchronized presentation of media content to multiple client systems simultaneously. The example 2500 of systems shown in FIG. 25 includes media provider system(s) 2502, advertisement provider system(s) 2504, a media, social, market delivery system 2506, a communication network 2508, and a plurality of client systems 2510-A, . . . 2511-N. In the example 2500 shown in FIG. 25, the media provider system(s) 2502, advertisement provider system(s) 2504, the media, social, market delivery system 2506, and the plurality of client systems 2510-A, . . . 2511-N are coupled to each other through the communication network 2508. In some embodiments, the content provider system(s) 2502, advertisement provider system(s) 2504, the media, social, market delivery system 2506, the communication network 2508, and the plurality of client systems 2510-A, . . . 2511-N correspond to the media provider system(s) 102, advertisement provider system(s) 104, the media, social, market delivery system 108, the communication network 112, and the media platform systems 106 in FIG. 1, respectively.

In the example 2500 of FIG. 25, one or more of the media provider system(s) 2502 includes a communication engine 2511, a social interface engine 2514, a synchronized presentation engine 2516, a playback engine 2518, an output subsystem 2520, and a media platform system datastore 2522. In some embodiments, the communication engine 2511, the social interface engine 2514, the synchronized presentation engine 2516, the playback engine 2518, the output subsystem 2520, and the media platform system datastore 2522 correspond to the communication engine 224, the social interface engine 220, the playback engine 208, the output subsystem 226, and the media platform system datastore 228 in FIG. 2, respectively.

In the example 2500 of FIG. 25, the communication engine 2511 is configured to communicate with external systems, such as the media provider system(s) 2502, the advertisement provider system(s) 2504, the media, social, market delivery system 2506, and other client systems 2510 through the communication network 2508. In a specific implementation, the communication engine 2511 sends a request for media content to the media provider system(s) 2502 and receives the requested media content from the media provider system(s) 2502. In another specific implementation, the communication engine 2511 sends a request for login authentication to the media provider system(s) 2502 and receives login authentication from the media provider system(s) 2502. In another specific implementation, the communication engine 2511 sends a request or permission for advertisement to the advertisement provider system(s) 2504, and receives advertisement content from the advertisement provider system(s) 2504.

In the example 2500 of FIG. 25, the social interface engine 2514 is configured to perform friend connection process for the synchronized presentation. In some embodiments, to carry out the synchronized presentation, a plurality of users who participate in the synchronized presentation have to be connected as friends with each other in the environment of the client systems. In some embodiments, the social interface engine 2514 is configured to generate a friend request based on a user interaction with the client system 2510 and cause the communication engine 2511 to transmit the generated friend request to one or more other client systems 2510. In some embodiments, the social interface engine 2514 is configured to receive friend request(s) transmitted from one or more other client systems 2510 through the communication engine 2511 and generate a notification of the friend request to a user on a GUI displayed on the output subsystem 2520. In some embodiments, the social interface engine 2514 is configured to generate an acceptance message upon user acceptance of the friend request on a GUI displayed on the output subsystem 2520 and cause the communication engine 2511 to transmit to the acceptance message to the one or more other client systems 2510 from which the friend request has been transmitted. Upon acceptance of a friend request, a user who sent the friend request and a user who accepted the friend request are connected as friends with each other. In a specific implementation, the information of the friend connection is stored in applicable datastore, such as datastore in the media, social, market delivery system 2506 and/or datastores in each of the client systems 2510 that have communicated for friend connection.

In some embodiments, the social interface engine 2514 is configured to generate a GUI for searching friends to be displayed on the output subsystem 2520, and perform friend search based on user input of search keys and registered information of users. For example, the search keys may include one or more of name (real user name), user name on the system, user ID, phone number, email address, mail address, affiliated organization (e.g., school, company, local community clubs, etc.), user photo, and so on. In some embodiments, registered information of users used for the friend search may be limited to authorized information by each user. For example, when a user does not allow the user's email address to be used for friend search, the social interface engine 2514 does not use the user's email address for the friend search.

In some embodiments, the social interface engine 2514 is configured to generate a GUI for performing instant communication between participants of a synchronized presentation during the synchronized presentation. For example, the social interface engine 2514 generates a GUI for instant text or video chat overlaid on or placed adjacent to a main screen for displaying content of the synchronized presentation, which enables the participants to share messages about the content of the synchronized presentation while accessing the content. The messages on the instant communication are transmitted and received through the communication engine 2511.

In the example 2500 of FIG. 25, the synchronized presentation engine 2516 is configured to establish a synchronized presentation session for the synchronized presentation. To establish the synchronized presentation session, the synchronized presentation engine 2516 generates a group of users who participate in the synchronized presentation session. In some embodiments, the synchronized presentation engine 2516 is configured to generate a GUI to start a synchronized presentation session and causes the output subsystem 2520 to display the generated GUI. In some embodiments, the generated GUI to establish the synchronized presentation session includes one or more selectable objects each of which corresponds to a friend of a user, and upon selection of one or more selectable objects, an invitation to participate in the synchronized presentation session is transmitted through the communication engine 2511 to one or more client systems 2510 associated with users corresponding to the one or more selectable objects. In some embodiments, the synchronized presentation engine 2516 is configured to receive invitations transmitted from one or more other client systems 2510 through the communication engine 2511 and generate a notification of the invitation to a user on a GUI displayed on the output subsystem 2520. In some embodiments, the synchronized presentation engine 2516 is configured to generate an acceptance message upon user acceptance of the invitation on a GUI displayed on the output subsystem 2520 and cause the communication engine 2511 to transmit to the acceptance message to the one or more other client systems 2510 from which the invitation has been transmitted. Upon acceptance of an invitation, a user who sent the invitation and a user who accepted the invitation are included in a group of a synchronized presentation session. In a specific implementation, the information of the group of the synchronized presentation session is stored in applicable datastore, such as datastore in the media, social, market delivery system 2506 and/or datastores in each of the client systems 2510 that have communicated for friend connection. Depending on a specific implementation of embodiments, an applicable number (e.g., two, five, ten, etc.) of users can participate in a single synchronized presentation session.

Depending on a specific implementation of embodiments, the synchronized presentation session may be established for applicable time. For example, a synchronized presentation session is established for a current time, in which case content are synchronously presented to participants as soon as preparation for the synchronized presentation session is completed. In another example, a synchronized presentation session is established for a future time, in which case content are synchronously presented to participants upon the future time coms and preparation for the synchronized presentation session is completed before the future time.

In some embodiments, to establish a synchronized presentation session, the synchronized presentation engine 2516 also determines content to be presented during the synchronized presentation session. In determining the content to be presented during the synchronized presentation session, in some embodiments, the synchronized presentation engine 2516 generates a GUI to select content to be presented during the synchronized presentation session and causes the output subsystem 2520 to display the generated GUI. In a specific implementation, the generates GUI includes one or more selectable objects each of which correspond to media content that the user is authorized to access. For example, selectable objects correspond to free content and paid content that have been purchased by the user. In a specific implementation, the generates GUI also includes one or more selectable objects corresponding to paid content that have not been purchased by the user. In such a case, selection of a selectable object corresponding to paid content that has not been purchased by the user may guide the user to a GUI for purchasing the paid content, and further may guide the user to download the purchased paid content to a corresponding client system.

In some embodiments, the synchronized presentation engine 2516 also determines whether or not each participant is authorized to access the determined content, by communicating with a synchronized presentation engine of other client systems accessed by other participants. For example, when the determined content is paid content and at least one other participant has not paid for the determined content, the synchronized presentation engine 2516 determines that said one other participant is not authorized to access the determined content, and generate an applicable GUI, such as a notification that the determined content cannot be presented in the synchronized presentation session, for display by the output subsystem 2520. Further, the synchronized presentation engine 2516 may cause the client system of the non-authorized user to present a purchase prompt that prompts the non-authorized user to purchase the determined content. In another example, when the determined content is non-copyright-protected content or use of the determine content is within fair use of copyright-protected content, in terms of a copyright law of the jurisdiction, the synchronized presentation engine 2516 determines that each participant is authorized to access the determined content.

In some embodiments, to start an established synchronized presentation session, the synchronized presentation engine 2516 determines whether or not the established synchronized presentation session is ready to be started. In determining whether or not the established synchronized presentation session is ready to be started, in some embodiments, the synchronized presentation engine 2516 of one of the participating users (e.g., participant who initiated the synchronized presentation mode) determines whether or not each participant is ready to start the established synchronized presentation session. For example, the synchronized presentation engine 2516 causes a client system of each participant to generate a GUI to inquire whether or not the participant is ready. For example, the generated GUI may be displayed by the output subsystem 2520 and includes a selectable object to answer "ready" and a selectable object to answer "not ready." In a specific implementation, the established synchronized presentation session is started when an applicable number (e.g., all participants, majority, a predetermined number, etc.) of participants are determined to be ready. In another specific implementation, no answer to the inquiry is considered as "ready." Upon determining that the established synchronized presentation session is ready, the synchronized presentation engine 2516 causes the playback engine 208 of each participant to start presenting the determined content. Depending on a specific implementation of embodiments, the determined content may be obtained from applicable source (e.g., the media platform system datastore 2511, the media provider system 2502, etc.) individually on each client system, and applicable signals such as synchronization signals and command signals are communicated among client systems.

Depending on a specific implementation of embodiments, applicable participants has control of the started synchronized presentation session. For example, one or more participants that are set as master participants have control (e.g., start, stop, forward, reverse, etc.) of the started synchronized presentation session (if the content is user controllable), and one or more participants that are set as slave participants (or not determined as the master participants) have limited or no control of the started synchronized presentation session. In another example, each participant has equal control of the started synchronized presentation session. In still another example, no participant has control except for termination of the synchronized presentation session, when the presented content is live content.

Depending on a specific implementation of embodiments, content during a synchronized presentation session are presented synchronously in an applicable manner. For example, the presented content have complete synchronization, according to which each frame presented to participants are the same, with a minor data propagation delay among the client systems, if any. In another example, the presented content have non-complete synchronization, according to which each frame presented to participants involves a slight difference. In a more specific implementation, advertisement content included in the content presented during a synchronized presentation session is different depending on various applicable parameters, such as user profiles of the participants (e.g., user preference, user location, etc.). In another more specific implementation, displayed language (e.g., captions, subtitles, or scrolling tickers) and/or audio language may be different among the participants.

FIGS. 26-29 illustrate an example of screen transition for social communication according to some embodiments. FIGS. 26-29 illustrate screens 2600, 2700, 2800, and 2900, respectively.

Figure 26:
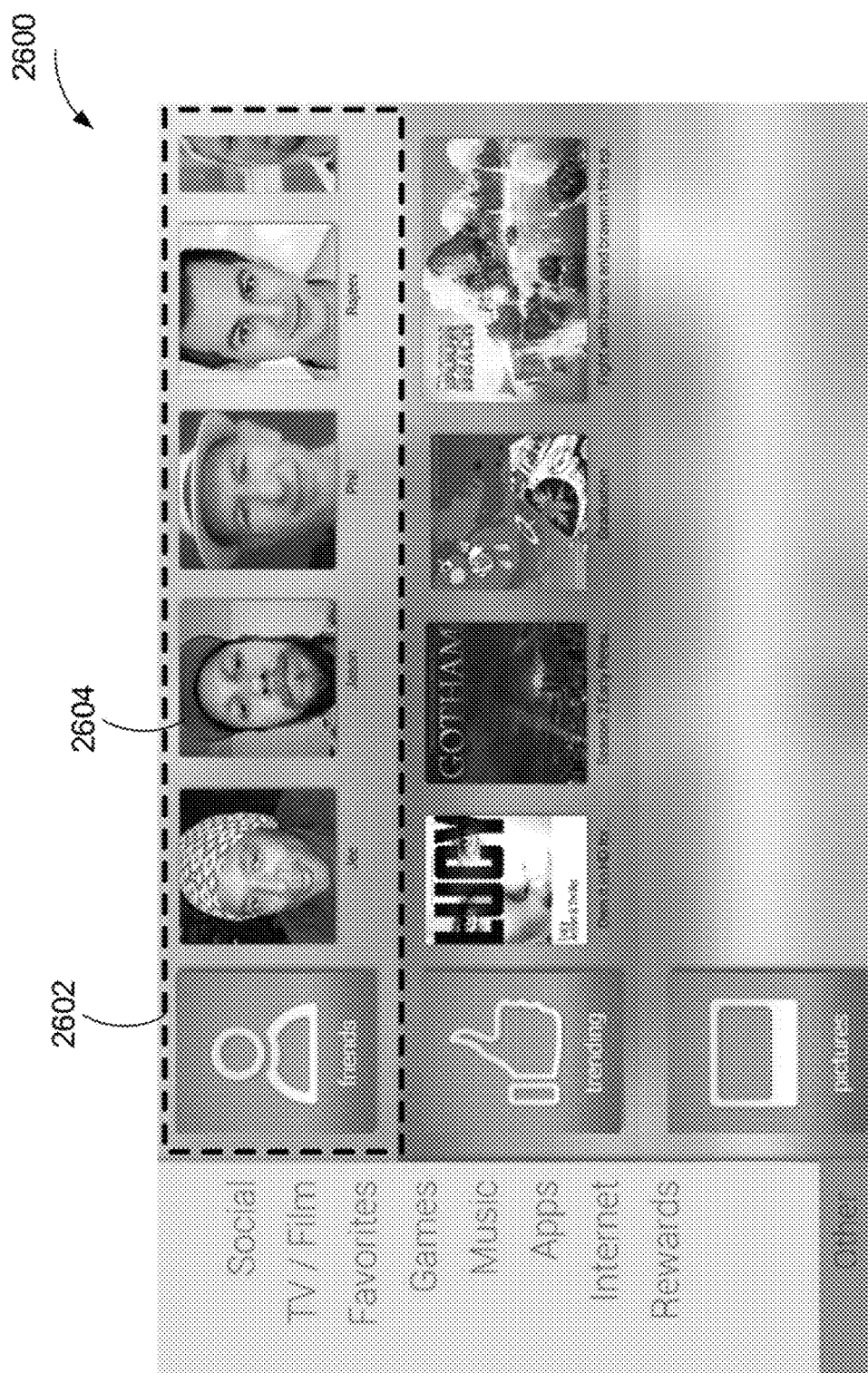
FIGS. 26-29 illustrate an example of screen transition for social communication according to some embodiments.

In the example of FIG. 26, the screen 2600 corresponds to a main menu screen, and includes a friend selection region 2602 including a plurality of selectable objects 2604 each of which represents a friend of a user. In some embodiments, the screen 2600 is displayed upon selection of a selectable object (e.g., social) on a menu region (e.g., menu bar on a left side) of a previous screen. The friend selection region 2602 is provided for the user to select a friend from one or more friends of the user. In a specific implementation, friends that accepted a friend request sent by the user and/or friends who sent friend requests to the user and have the friend requests accepted by the user are displayed in the friend selection region 2602.

In the example of FIG. 27, the screen 2700 corresponds to a user home screen (or, "personal portal"). The screen 2700 includes an instant communication region 2702, selectable objects 2704 to initiate communication with friends, and selectable objects 2706 each of which represents a friend of a user. In some embodiments, the screen 2700 is displayed upon a user input to go to a user home screen on applicable screens, such as a main menu and a smart bar, or on applicable user inputs, such as a user input on a remote controller.

The instant communication region 2702 is provided for the user to perform instant communication with one or more friends of the user. Depending on a type of instant communication, the instant communication region 2702 presents an applicable GUI for instant communication. For example, when a text chat is the type of the instant communication, input text and past-input texts are presented on the instant communication region 2702. In another example, when a video chat is the type of the instant communication, a live video stream of the user side and/or a live video stream of the friend side are displayed on the instant communication region 2702.

The selectable objects 2704 to initiate communication with friends are provided to select a type of communication to be communicated with one or more friends of the user. Depending on a type of instant communication, the selectable objects 2704 include selectable objects corresponding to applicable communication type. For example, the selectable objects 2704 include selectable objects for instant text chat, instant video chat, and mail messages.

The selectable objects 2706 to select friend are provided for the user to select to select a friend from one or more friends of the user. In a specific implementation, friends that accepted a friend request sent by the user and/or friends who sent friend requests to the user and have the friend requests accepted by the user are displayed in the selectable objects 2706.

In the example of FIG. 28, the screen 2800 corresponds to a screen including when an instant communication is carried out. The screen 2800 includes the instant communication region 2802 and a smart bar 2804 that are overlaid on a main screen 2806. In some embodiments, the screen 2800 is displayed upon a user input to start instant communication with friends on the smart bar 2804 that is pulled up by another user input to pull up a smart bar. The instant communication region 2802 is provided for the user to perform instant communication with one or more friends of the user. In some embodiments, the instant communication region 2802 has the same or similar configuration as the instant communication region 2702 on the screen 2700. The smart bar 2804 can correspond to the smart bar 502 depicted in FIG. 5. The background 2806 may display applicable content. In some embodiments, as depicted in FIG. 28, blurred or scramble content (e.g., a billboard screen or a menu screen) may be displayed.

In some embodiments, applicable screens, such as the screens 2600, 2700, and 2800, are configured to initiate the synchronized presentation mode. For example, upon selection of one of the selectable objects 2604 to select friend on the screen 2600, an option to start a synchronized presentation mode with the selected friend may be presented. In another example, upon selection of one of the selectable objects 2706 to select friend on the screen 2700, an option to start a synchronized presentation mode with the selected friend may be presented. In still another example, a selectable object to start a synchronized presentation mode may be included in selectable objects in a smart bar, such as the smart bar 2800 on the screen 2800.

In the example of FIG. 29, the screen 2900 corresponds to a screen including when a notification is received. The screen 2900 includes a notification region 2902 and a smart bar 2904 that are overlaid on a main screen 2906. In some embodiments, the screen 2900 is displayed upon a user input to pull up the notification region 2902 on applicable screens, such as a main menu and a smart bar, or on applicable user inputs, such as a user input on a remote controller. The notification region 2902 includes applicable notifications that have been received. In some embodiments, the notification includes a request to start a synchronized presentation mode from a friend, an acceptance message that a friend accepted a request to start a synchronized presentation mode sent by the user, an inquiry whether the user is ready to start playback of media content in a synchronized presentation mode, and an acknowledgement that a friend is ready to start playback of media content in a synchronized presentation mode. The smart bar 2904 can correspond to the smart bar 502 depicted in FIG. 5. The background 2906 may display applicable content. In some embodiments, as depicted in FIG. 29, blurred or scramble content (e.g., a billboard screen or a menu screen) may be displayed.

Figure 30:
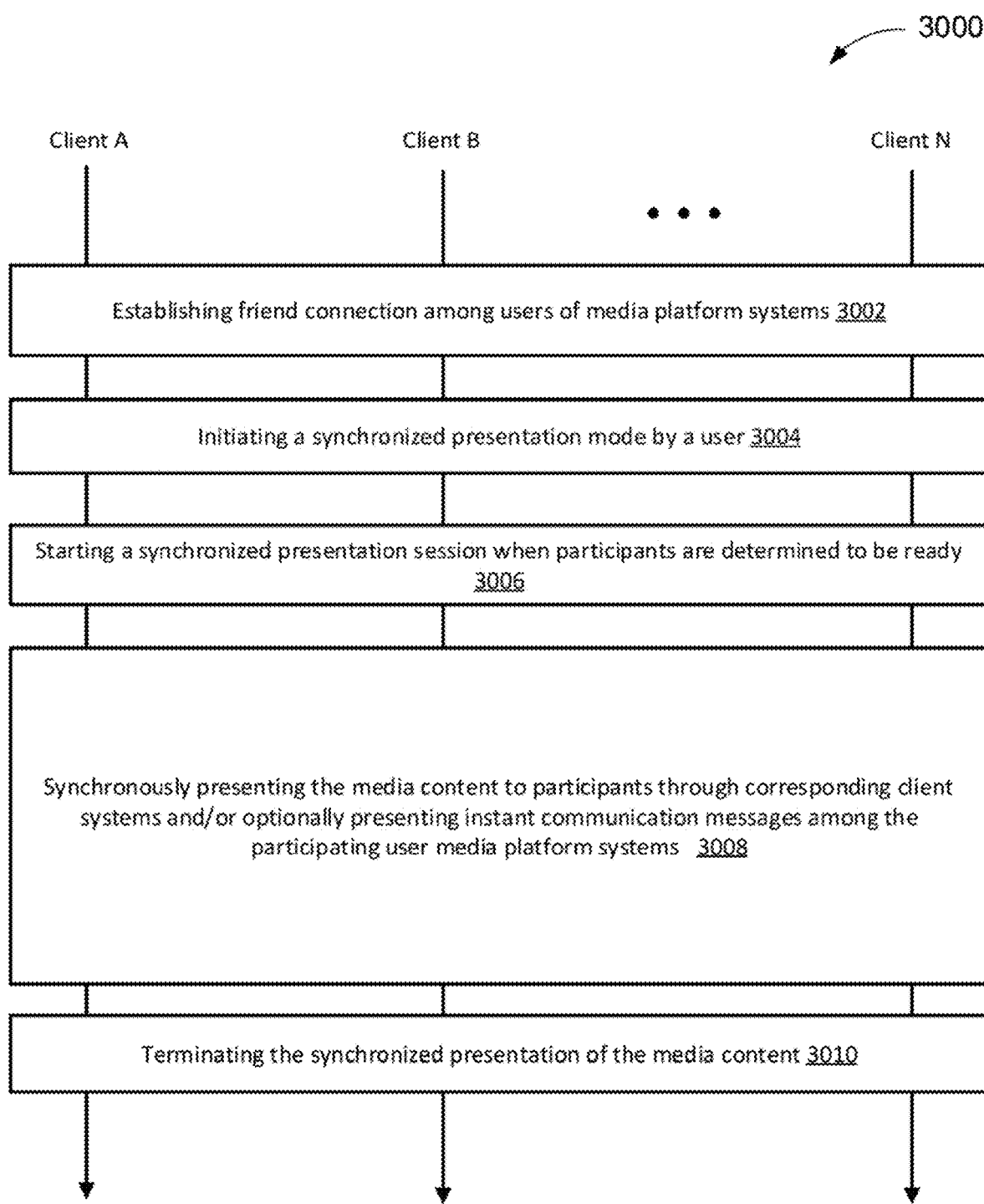
FIG. 30 illustrates a flowchart of an example method of carrying out synchronized presentation among a plurality of client systems according to some embodiments.

FIG. 30 illustrates a timing flowchart 3000 of an example method of carrying out synchronized presentation among a plurality of client systems (e.g., media platform systems 106 in FIG. 1) according to some embodiments. In step 3002, friend connection is established among a plurality of users. An applicable engine for establishing fiend connection (e.g., the social interface engine 2514 in FIG. 25) described in this paper can establish friend connection. In some embodiments, the users connected as friends with each other use different client systems and communicate with each other for establishing friend connection (e.g., by friend requests, acceptance, etc.).

In step 3004, a synchronized presentation mode is initiated. An applicable engine for initiating a synchronized presentation mode (e.g., the synchronized presentation engine 2516 in FIG. 25) described in this paper can initiate a synchronized presentation mode. In some embodiments, when a synchronized presentation mode is initiated, a group of participants is determined based on communication (e.g., invitation, acceptance, etc.) of a user who initiated the synchronized presentation mode with other users who are friends with the initiating user. In some embodiments, when a synchronized presentation mode is initiated, content to be presented during a synchronized presentation session is determined based on user authority to access content.

In step 3006, the synchronized presentation session is started when applicable number of participants are determined to be ready to start the synchronized presentation session.

An applicable engine for starting a synchronized presentation session (e.g., the synchronized presentation engine 2516 in FIG. 25) described in this paper can start a synchronized presentation session. In some embodiments, to start a synchronized presentation session, whether or not applicable number of participants are ready is determined based on communication (e.g., inquiry, answer, etc.) among the participants.

In step 3008, media content determined to be presented are presented to participants through corresponding client systems. An applicable engine for presenting media content (e.g., playback engine 2518 in FIG. 25) described in this paper can present the determined media content. In some embodiments, in step 3008, optionally, instant communication is caused to be available among the participants. An applicable engine for making instant communication available (e.g., the social interface engine 2514 in FIG. 25) described in this paper can make instant communication available during the started synchronized presentation session.

In step 3010, the started synchronized presentation session is terminated. An applicable engine for terminating a synchronized presentation session (e.g., the synchronized presentation engine 2516 in FIG. 25) described in this paper can terminate a synchronized presentation session. In some embodiments, the synchronized presentation session is automatically terminated upon completion of the media content. In some embodiments the synchronized presentation session is terminated based on user inputs before and/or after completion of the media content.

Advantageously, according to the billboard screen discussed above, client systems can present participants of a synchronized presentation session synchronized content. Since regardless of location of client systems, participants who are geographically remote from each other can access the same content simultaneously. In addition, during a synchronized presentation session, participants thereof can share information with each other through instant communication GUI that is presented along with the synchronously presented content without departing from the presented content.

Figure 31:
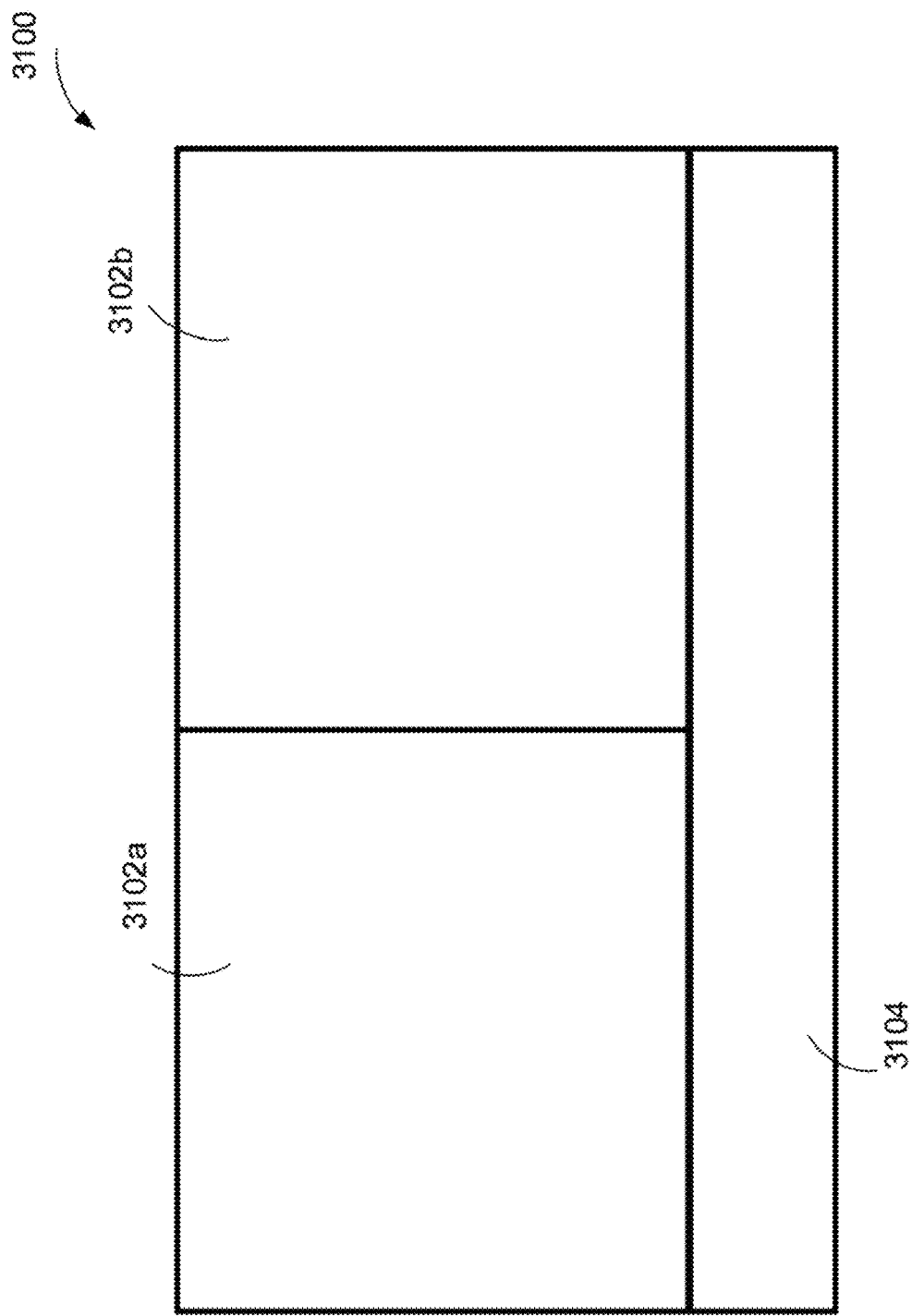
FIG. 31 illustrates an example of a screen that is displayed when a split screen mode is activated according to some embodiments.

FIG. 31 illustrates an example of a split screen 3100 that is displayed when a split screen mode is activated according to some embodiments. The split screen mode enables a user to simultaneously access multiple media content in a main screen. In the example in FIG. 31, the split screen 3100 includes a first sub-screen 3102a, a second sub-screen 3102b, and a bottom region 2705.

In some embodiments, each of the first sub-screen 3102a and the second sub-screen 3102b is configured to display media content independently from each other. For example, the first sub-screen 3102a may display a movie, and the second sub-screen 3102b may display a sports program. The bottom region 2705 is reserved for various purposes, such as for display of a smart bar and/or advertisement.

Depending upon a specific implementation of the embodiment, the sizes of the first sub-screen 3102a and the second sub-screen 3102b may be fixed to a predetermined size (e.g. the same size). In the alternative, the sizes of the first sub-screen 3102a and the second sub-screen 3102b may be variable in accordance with various applicable parameters. For example, the sizes of the first sub-screen 3102a and the second sub-screen 3102b may be determined based on resolution of the media content to be displayed thereon. In a more specific instance, a size of a sub-screen (one of the first sub-screen 3102a and the second sub-screen 3102b) that displays higher-resolution images is larger than a sub-screen (the other of the first sub-screen 3102a and the second sub-screen 3102b) that displays lower-resolution images. In another example, a size of the first sub-screen 3102a and the second sub-screen 3102 is set based on user inputs.

Depending upon a specific implementation of the embodiment, an aspect ratio of the first sub-screen 3102a and the second sub-screen 3102b is in an applicable ratio. For example, one or both of the first sub-screen 3102a and the second sub-screen 3102b has the same aspect ratio (e.g., 16:9) as a full screen during a normal display of media content.

In some embodiments, the content to be displayed on the first sub-screen 3102a and the second sub-screen 3102b are received from an applicable source such as a media provider system (e.g., the media provider system 102 in FIG. 1) and a media, social, market delivery system (e.g., the media, social, market delivery system 108 in FIG. 1).

Figure 32:
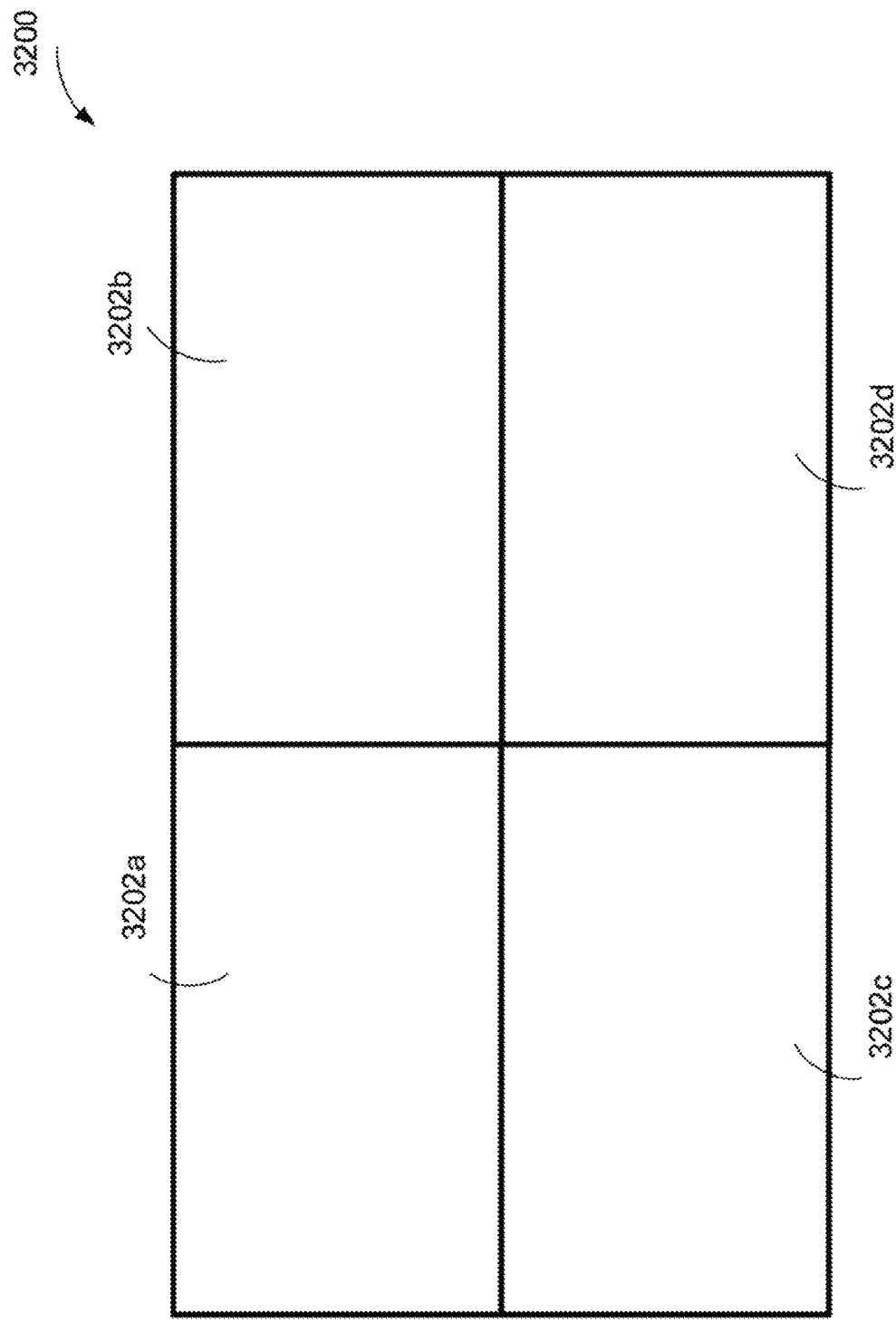
FIG. 32 illustrates another example of a screen that is displayed when a split screen mode is activated according to some embodiments.

FIG. 32 illustrates another example of a screen 3200 that is displayed when a split screen mode is activated according to some embodiments. In the example in FIG. 32, the split screen 3200 includes a first sub-screen 3202a, a second sub-screen 3202b, a third sub-screen 3202c, and a fourth sub-screen 3202d. In some embodiments, each of the first, second, third, and fourth sub-screens 3102a-d is configured to display media content independently from each other, in the same or similar manner as the first sub-screen 3102a and the second sub-screen 3102b in the screen 3100 in FIG. 31.

Depending upon a specific implementation of the embodiment, the number of the sub-screens on the entire screen is an applicable number. In an implementation, the maximum number of the sub-screens is determined based on a resolution of a display device on which the media content are displayed. For example, the maximum size is determined to be 9 when the resolution is 8K (8192×4320), the maximum size is determined to be 4 when the resolution is 4K (4096×2160) or less and above full HD (1920×1080), and the maximum size is determined to be 2 when the resolution is HD (1280×720) or less. The resolution may be pulled up from the display device or obtained based on user inputs. In another example, the maximum number of the sub-screens is determined based on a display size of the display device. For example, the maximum size is determined to be 9 when the display size is 60 inch or above, the maximum size is determined to be 4 when the display size is 40-59 inch, and the maximum size is determined to be 2 when the display side is 39 inch or less. The display size may be pulled up from the display device or obtained based on user inputs in the same or similar manner as the resolution.

Depending upon a specific implementation of the embodiment, an applicable process of splitting the screen can be employed. In a specific implementation, a non-split screen can be split into a plurality of split screens (e.g., sub-screens) through a single process. For example, a non-split screen (i.e., full screen) is split into a plurality of split screens of a maximum splittable number (e.g., 4 or 9). In another specific implementation, a non-split screen can be split into a plurality of split screens through multiple processes. For example, a non-split screen (i.e., full screen) is split into a plurality of split screens (e.g., sub-screens) of a number (e.g., 2) less than a maximum splittable number (e.g., 4 or 9) through a first process, and the split screens are further split into a plurality of split screens (e.g., mini-screens) through a second process. In this case, each of the split screen may be independently split or split together. For example, a first split screen (e.g., sub-screen) may be split into multiple screens (e.g., mini-screens), independently from split of a second screen (e.g., sub-screen) into multiple screens (e.g., mini-screens). In another example, a first split screen (e.g., sub-screen) may be split into multiple screens (e.g., mini-screens), together with split of a second screen (e.g., sub-screen) into multiple screens (e.g., mini-screens).

Depending upon a specific implementation of the embodiment, applicable visual content are displayed on split screens. In a specific implementation, one of the split screens displays original media content displayed on a screen before the split, and the other of the split screen display or do not display the original media content. For example, the original media content is displayed on a plurality of the split screens. That is, the same media content is displayed on the plurality of the split screens. In another example, a default content (e.g., a billboard and a main menu) is displayed on one of the split screens that do not display the original media content. In still another example, a still screen (e.g., black-out screen, logo, etc.) is displayed on one of the split screens that do not display the original media content. Further, when the original media content is not displayed on all of the split screens, the original media content may be displayed on split screen(s) at applicable position(s). For example, the original media content is displayed on a split screen at a predetermined position (e.g., left, right, top, or bottom, center, etc.). In another example, the original media content is displayed on a split screen at a user-designated position.

Depending upon a specific implementation of the embodiment, applicable audio content are presented in accordance with split screens. In a specific implementation, audio content corresponding to one of the split screens is selectively presented (with a normal volume), and audio content corresponding to the other of the split screens are muted or generated with a reduced volume. The selection of the split screen for which audio content is presented may be determined based on user input or a predetermined algorithm. For example, when only one of the split screens includes audio content, the audio content of the only one split screen may be presented. In another example, when a plurality of the split screens includes audio content, the audio content of the plurality of the split screens are sequentially presented for a predetermined time length (e.g., 5-20 sec), for example, in a repeated manner. In still another example, audio content of a new media content (e.g. channel) may be preferentially presented over pre-existing media content. In still another example, audio content of a media content that has the highest matching with a user profile of the user (e.g., most frequently visited channel, channel in user's favorites, celebrity in user's favorite) may be preferentially presented.

Figure 33:
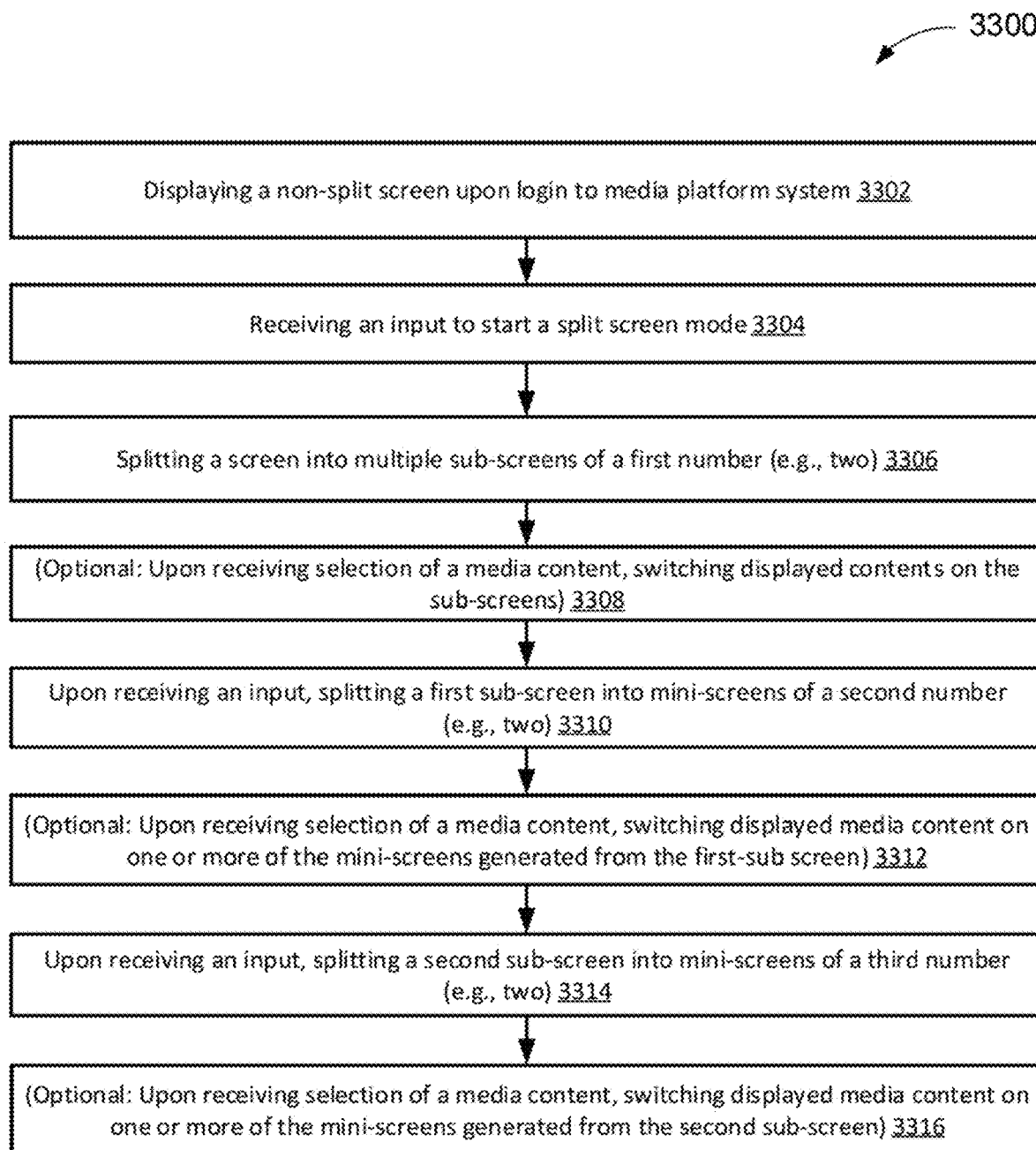
FIG. 33 illustrates a flowchart of an example method of carrying out a split screen mode according to some embodiments.

FIG. 33 illustrates a flowchart 3300 of an example method of operating in a split screen mode according to some embodiments. In step 3302, a non-split screen is displayed after login to a media platform system. An applicable engine for displaying a non-split screen (e.g., interactive programming guide engine 206, the playback engine 208, the social interface engine 220, etc. in FIG. 2) described in this paper, can display the non-split screen on an applicable output device (e.g., the output subsystem 2206 in FIG. 2). In some embodiments, the non-split screen includes a full-size screen displaying any content, such as a billboard, a main menu, and media content.

In step 3304, an input to start a split screen mode is received. An applicable engine for transmitting an input to start a split screen mode, such as a remote controller, a smart phone, a tablet, a laptop, a smart watch, and so on, can transmit the input to start the split screen mode. Also, an applicable engine for receiving the input to start the split screen mode (e.g., the split presentation engine 210 in FIG. 2) can receive the input to start the split screen mode. In some embodiments, the inputs may be voice or gestures made by human agents, such as users or viewers.

In step 3306, the non-split screen is split into multiple sub-screens of a first number (e.g. two). An applicable engine for splitting screen (e.g., the split presentation engine 210 in FIG. 2) can split the non-split screen. Depending on a specific implementation of some embodiments, the first number is less than a maximum splittable number.

In step 3308, optionally, upon receiving selection of content to be displayed on one or more of the sub-screens, the content on the sub-screens are switched. An applicable engine for making selection of content, such as a remote controller, a smart phone, a tablet, a laptop, a smart watch, and so on, can make the selection of content. In some embodiments, the selection may be made by voice or gestures of human agents, such as users or viewers. Also, an applicable engine for receiving selection of content (e.g., the split presentation engine 210 in FIG. 2) can receive the selection of content.

In step 3310, upon receiving an input to further split screen, at least one of the sub-screens are split into mini-screens of a second number (e.g., two). Similarly to step 3308, an applicable engine for splitting screen (e.g., the split presentation engine 210 in FIG. 2) can split the sub-screen(s). Depending on a specific implementation of some embodiments, the second number is less than the maximum splittable number.

In step 3312, optionally, upon receiving selection of content to be displayed on one or more of the mini-screens, the content on the mini-screens are switched. In some embodiments, step 3312 can be carried out in a similar manner as step 3310.

In step 3314, upon receiving an input to further split screen, at least one of the sub-screens that have not been split into mini-screens are split into mini-screens of a third number (e.g., two). Similarly to steps 3308 and 3310, an applicable engine for splitting screen (e.g., the split presentation engine 210 in FIG. 2) can split the sub-screen(s). Depending on a specific implementation of some embodiments, the third number is less than the maximum splittable number.

In step 3316, optionally, upon receiving selection of content to be displayed on one or more of the mini-screens generated in step 3314, the content on the mini-screens are switched. In some embodiments, step 3316 can be carried out in a similar manner as step 3310 and 3312. As a result, according to the split screens discussed above, a media platform system can provide viewers with a plurality of content (e.g., media content) simultaneously in a user-interactive manner.

Figure 34:
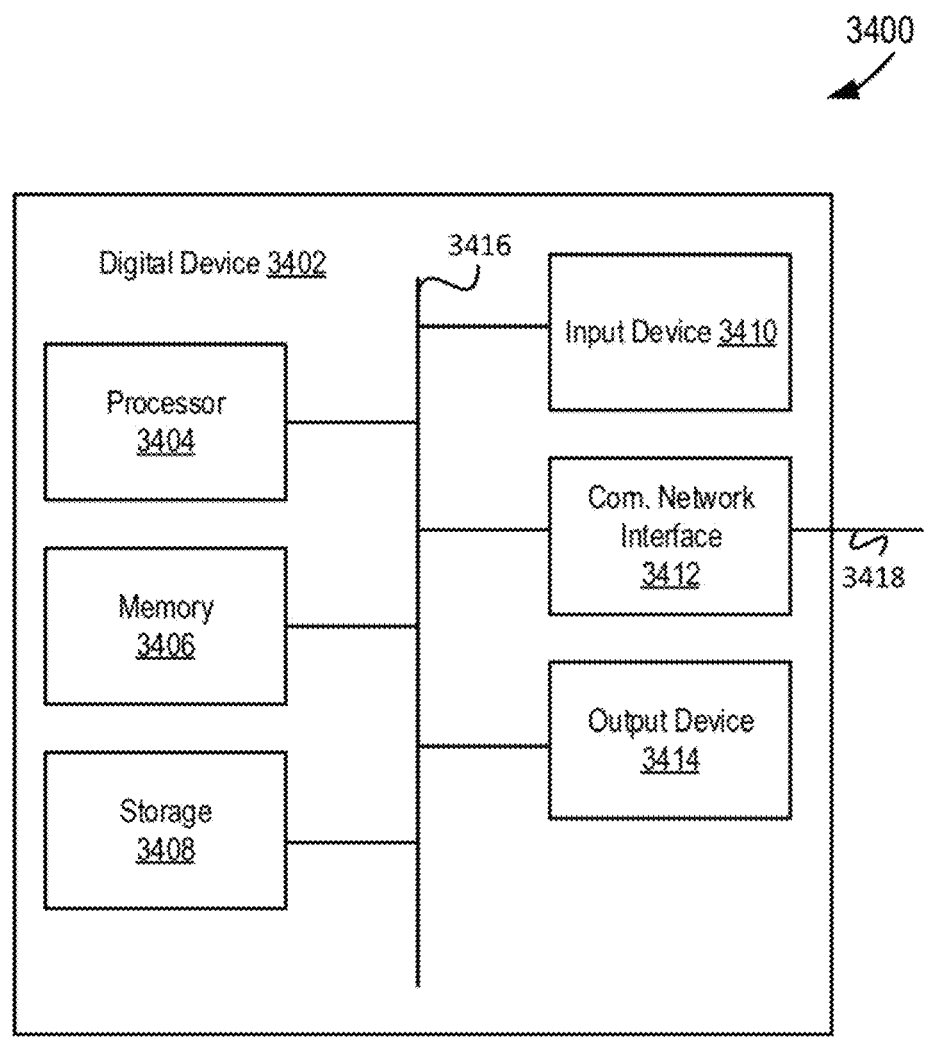
FIG. 34 is a diagram of an example computer system for implementing the features disclosed herein according to some embodiments.

FIG. 34 depicts a diagram 3400 of an example of a computing device 3402. Any of the systems 102-108 and the communication network 110 may comprise an instance of one or more computing devices 3402. The computing device 3402 comprises a processor 3404, memory 3406, storage 3408, an input device 3410, a communication network interface 3412, and an output device 3414 communicatively coupled to a communication channel 3416. The processor 3404 is configured to execute executable instructions (e.g., programs). In some embodiments, the processor 3404 comprises circuitry or any processor capable of processing the executable instructions.

The memory 3406 stores data. Some examples of memory 3406 include storage devices, such as RAM, ROM, RAM cache, virtual memory, etc. In various embodiments, working data is stored within the memory 3406. The data within the memory 3406 may be cleared or ultimately transferred to the storage 3408.

The storage 3408 includes any storage configured to retrieve and store data. Some examples of the storage 3408 include flash drives, hard drives, optical drives, cloud storage, and/or magnetic tape. Each of the memory system 3406 and the storage system 3408 comprises a computer-readable medium, which stores instructions or programs executable by processor 3404.

The input device 3410 is any device that inputs data (e.g., mouse and keyboard). The output device 3414 outputs data (e.g., a speaker or display). It will be appreciated that the storage 3408, input device 3410, and output device 3414 may be optional. For example, the routers/switchers may comprise the processor 3404 and memory 3406 as well as a device to receive and output data (e.g., the communication network interface 3412 and/or the output device 3414).

The communication network interface 3412 may be coupled to a network (e.g., network 110) via the link 3418. The communication network interface 3412 may support communication over an Ethernet connection, a serial connection, a parallel connection, and/or an ATA connection. The communication network interface 3412 may also support wireless communication (e.g., 802.11 a/b/g/n, WiMax, LTE, WiFi). It will be apparent that the communication network interface 3412 may support many wired and wireless standards.

It will be appreciated that the hardware elements of the computing device 3402 are not limited to those depicted in FIG. 34. A computing device 3402 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 3404 and/or a co-processor located on a GPU (i.e., NVidia).

Figure 35A:
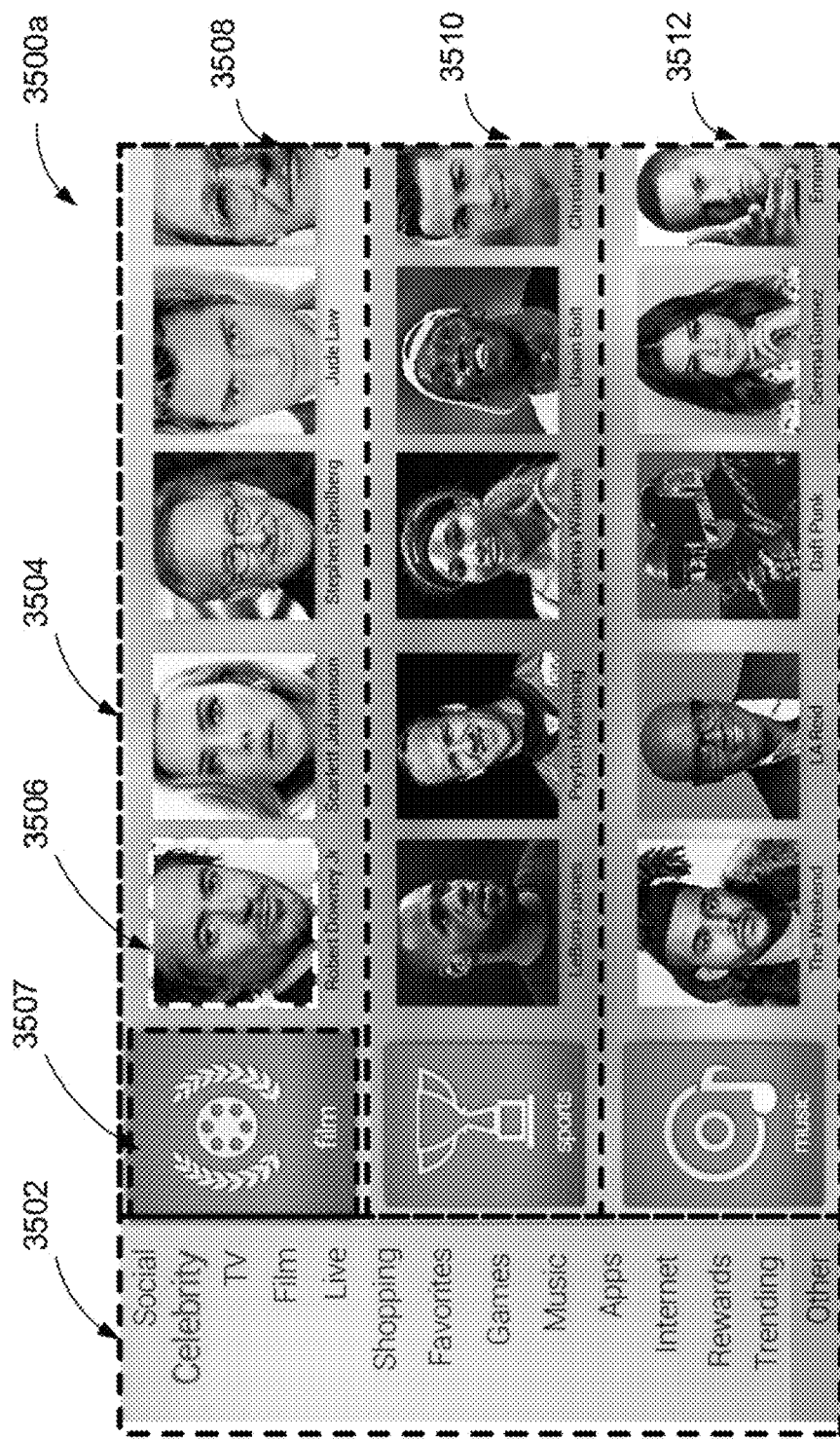
FIG. 35A-C illustrates an example screen transition for presenting celebrity profiles.
Figure 35B:
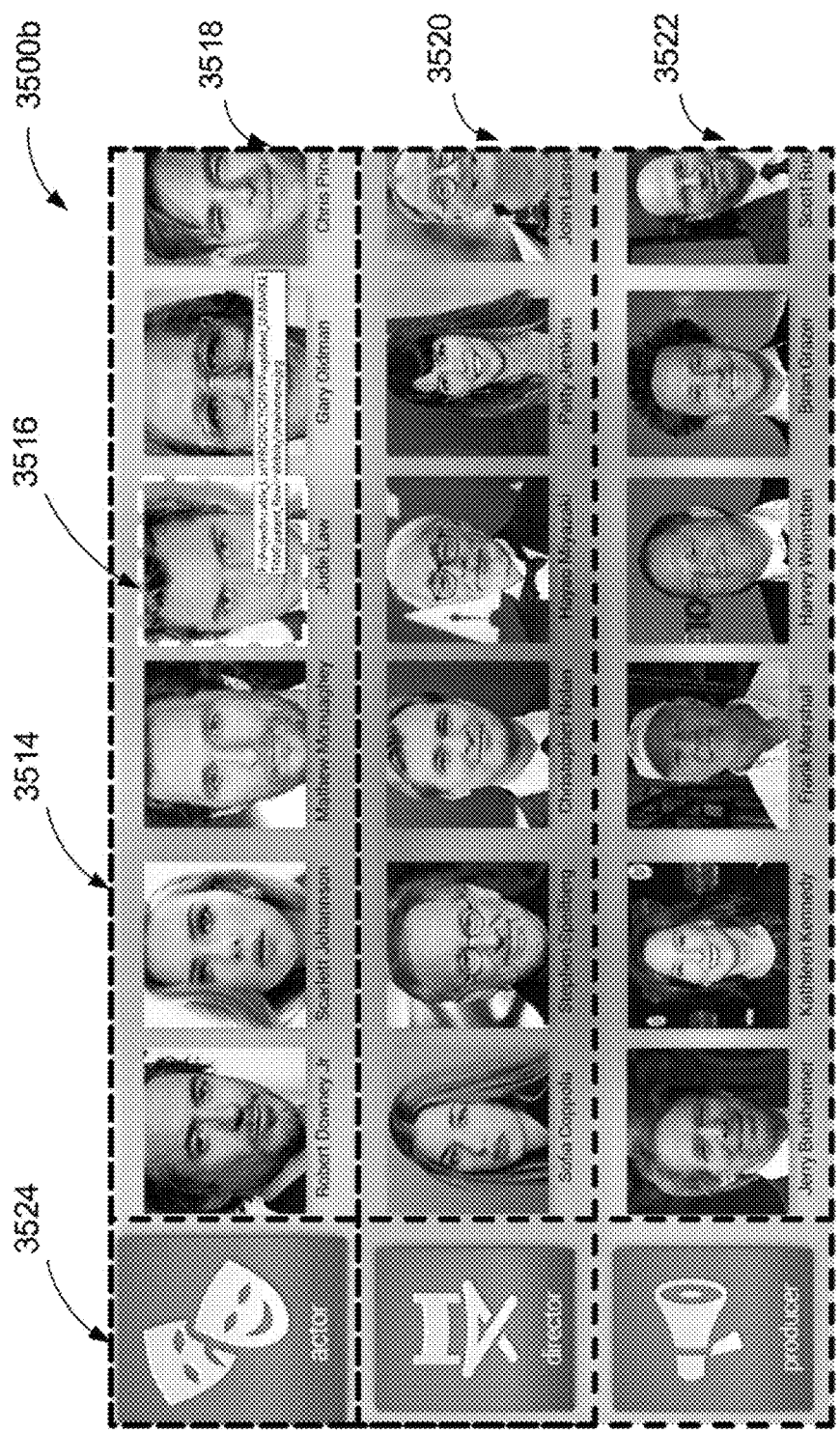
Figure 35C:
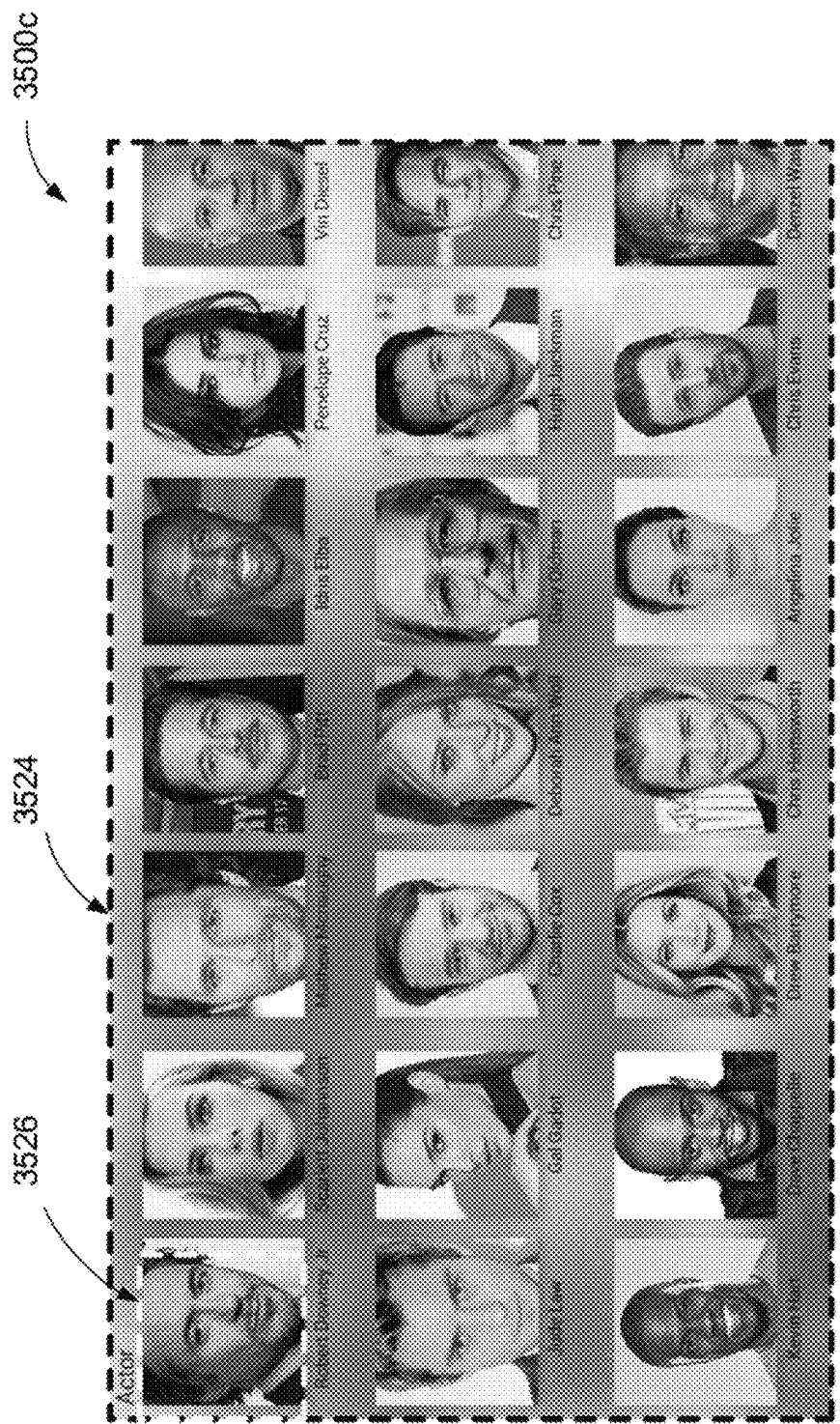

FIGS. 35A-35C illustrates an example screen transition for presenting celebrity profiles (or, "celebrity portals"). For example, the transition may occur in response to a search for celebrity profile(s)). FIGS. 35A-35C illustrate screens 3500a, 3500b and 3500c respectively, and the screen transition is assumed to occur in this order, although the screen transitions may occur in another order instead of, or in addition to, the order shown here.

In the example of FIG. 35A, the screen 3500a corresponds to a main menu, and includes a menu bar 3502 and a main navigation panel 3504. More particularly, the screen 3500a is at a state where an object indicating "celebrity" is selected in the menu bar 3502, and objects corresponding to celebrity profiles are displayed in the main navigation panel 3504.

The main navigation panel 3504 displays a variety of celebrities whose profiles are available for the user to subscribe to. Each selectable object 3506 displays an image of the celebrity, along with their name. Celebrity profiles may be organized by a plurality of categories, such as category a film category 3508, a sports category 3510 and a music category 3512 as seen in FIG. 35A. The user may select one of the plurality of selectable objects, such as selectable object 3506 to navigate to the celebrity profile associated with the selectable object 3506. Alternatively, the user may select one of a plurality of category icon, such as a film category icon 3507 to navigate to a screen which corresponds to a screen displaying a variety of celebrities which belong to the film category. In some embodiments, the plurality of categories include TV, Internet or the like to include television celebrities, internet celebrities and the like.

In the example of FIG. 35B, the screen 3500b corresponds to a screen after an object indicating "film" is selected in the main navigation panel 3504 of screen 3500a. Objects corresponding to celebrity profiles in the film category are displayed in navigation panel 3514.

The navigation panel 3514 displays a variety of film celebrities whose profiles are available for the user to subscribe to and/or view. Celebrity profiles, as represented by a selectable object 3516, are organized into a plurality of film categories, such as an actor category 3508, a director category and a producer category as seen in FIG. 35B. The user may select one of the plurality of selectable objects, such as the selectable object 3516 to navigate to the celebrity profile associated with the selectable object 3516. Alternatively, the user may select one of a plurality of category icon, such as an actor category icon 3524 to navigate to a screen which corresponds to a screen displaying a variety of celebrities which belong to the actor category.

In the example of FIG. 35C, the screen 3500c corresponds to a screen after an object indicating "actor" is selected from navigation panel 3514 of screen 3500b. Objects corresponding to celebrity profiles in the actor category are displayed in navigation panel 3524.

The navigation panel 3524 displays a variety of actor celebrities whose profiles are available for the user to subscribe to and/or view. Celebrity profiles, as represented by a selectable object 3526. The user may select one of the plurality of selectable object, such as the selectable object 3526 to navigate to the celebrity profile associated with the selectable object 3526.

In the example of FIG. 36, illustrates an example screen of a limited celebrity portal interface 3600. In the illustrate embodiment, the celebrity profiled in the limited celebrity portal interface 3600 is Robert Downey Jr. The limited celebrity portal interface 3600 corresponds to a screen after the user selects selectable object 3526 of navigation panel 3514 of FIG. 35C. The limited celebrity portal interface 3600 includes a subscription icon 3602, an image of the celebrity 3604, a celebrity content 3606, and a celebrity status 3608. The limited the celebrity may be a celebrity portal that is presented to a user who has not subscribed to the celebrity.

The subscription icon 3602 may be a selectable object that the user can interact with (e.g., click) to subscribe to the celebrity profile. The subscription icon 3602 displays the number of subscribers to the celebrity profile portal.

The image of the celebrity 3604 serves as a background to the limited celebrity portal interface 3600. In some embodiments, the celebrity may choose the image displayed in the background of the limited celebrity portal interface 3600.

The celebrity content 3606 displays a plurality of digital media in which the celebrity, for example, Robert Downey Jr., took part in. In some embodiments, the celebrity content 3606 displays physical goods associated with the celebrity. In some embodiments, the celebrity content 3606 displays media goods and physical goods endorsed by the celebrity. In some embodiments, the celebrity content displayed in the limited celebrity portal interface 3600 may be different from a subscribed celebrity portal interface.

The celebrity status 3608 displays the status of the celebrity to their celebrity portal interface. In the illustrated example, the celebrity status 3608 displays discloses a date that the celebrity profile portal was published. In some embodiments, the celebrity status displayed in the limited celebrity portal interface 3600 may be different from a subscribed celebrity portal interface.

Figure 37A:
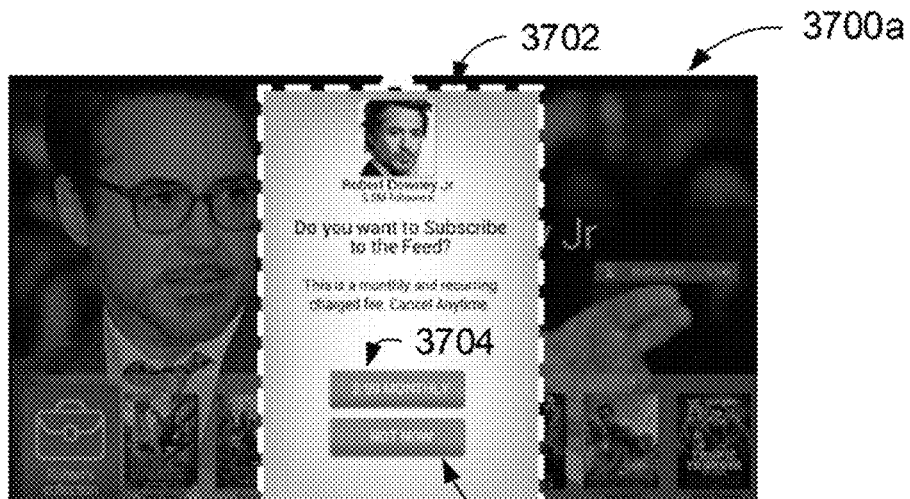
FIG. 37A-C illustrates an example screen transition for subscribing to a celebrity profile.
Figure 37B:
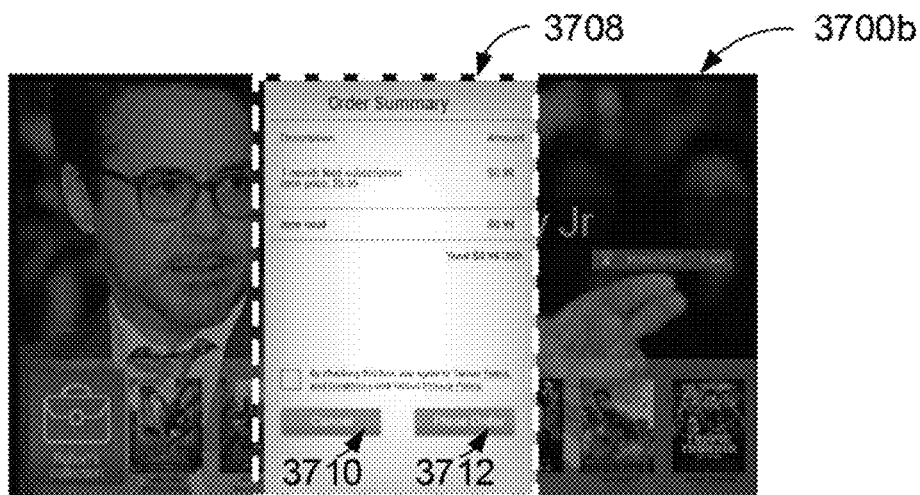
Figure 37C:
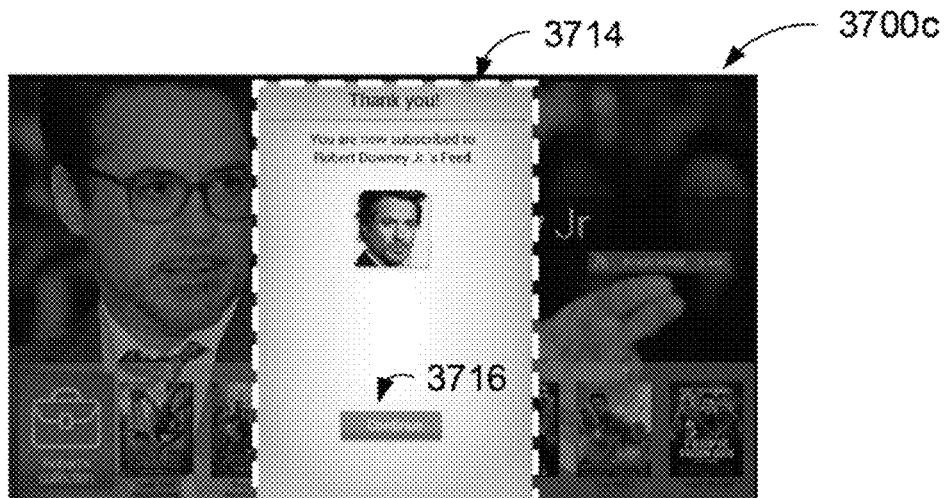
Figure 38:
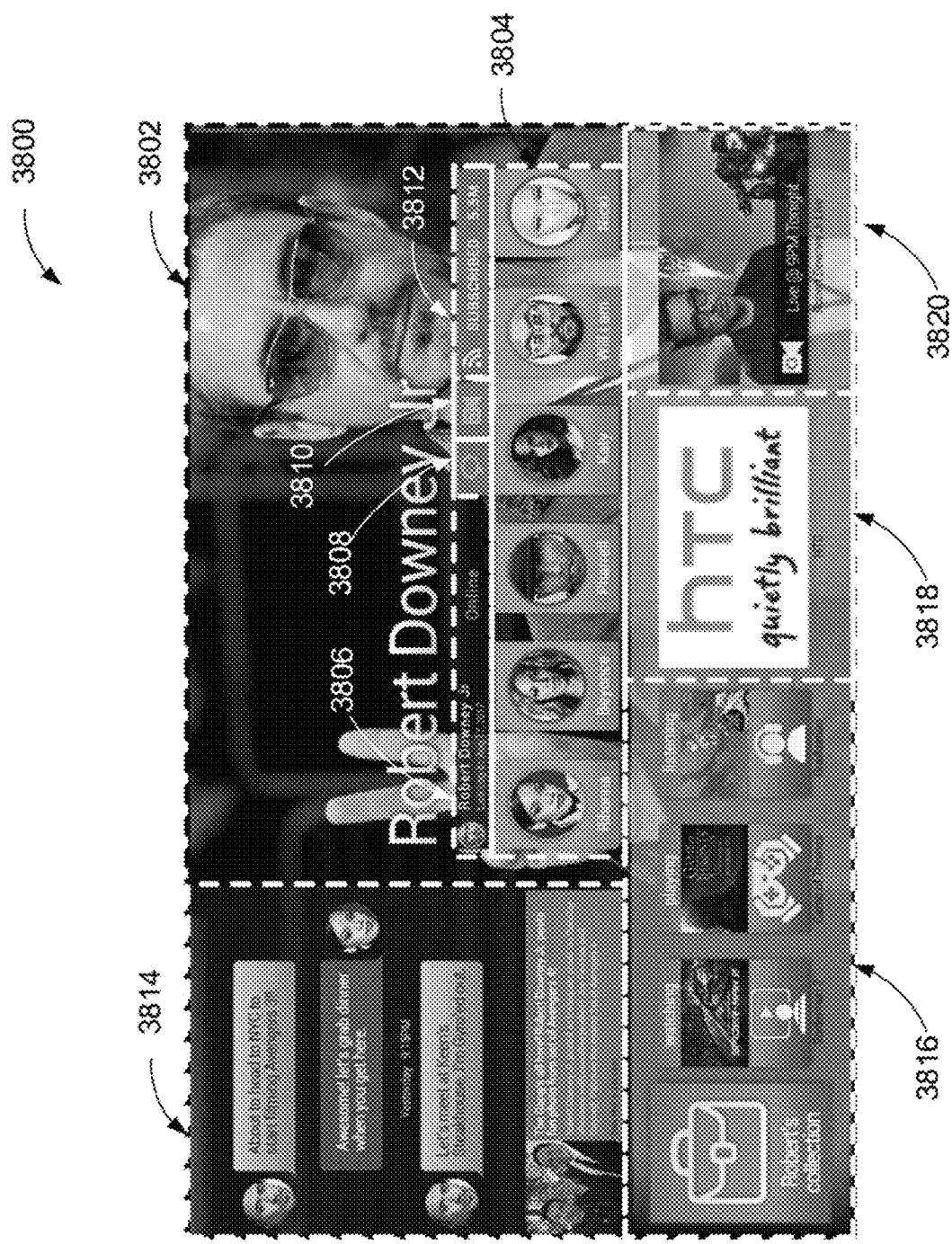
FIG. 38 illustrates an example screen of a subscribed celebrity portal interface.

FIG. 37A-37C illustrates an example screen transition for subscribing to a celebrity profile. FIGS. 37A-37C illustrate screens 3700a, 3700b and 3700c respectively, and the screen transition is assumed to occur in this order. The background of the screens 3700a, 3700b and 3700c is the limited celebrity portal interface 3600 of FIG. 36, the selectable objects of the limited celebrity portal interface are not selectable, so for example, the user cannot interact with the celebrity content.

In the example of FIG. 37A, the screen 3700a correspond to a screen after the subscription icon 3602 is selected in the limited celebrity portal interface 3600 of FIG. 36. In a first celebrity portal subscription interface 3702, users may choose to subscribe to the celebrity profile for a predetermined fee, or users may choose to exit the celebrity portal subscription by interacting with selectable object 3704 or 3706 respectively. The limited celebrity portal interface 3600 may correspond to a screen after the user chooses to interact with selectable object 3706. The screen 3700b may correspond to a screen after the user chooses to subscribe to the celebrity profile and interacts with selectable object 3704.

In the example of FIG. 37B, the screen 3700b includes a second celebrity portal subscription interface 3708 and selectable objects 3710 and 3712. In the second celebrity portal subscription interface 3708 users may choose to cancel or proceed with the celebrity portal subscription by interacting with selectable objects 3710 and 3712 respectively. The limited celebrity portal interface 3600 correspond to a screen after the user chooses to interact with selectable object 3710. The screen 3700c correspond to a screen after the user chooses to proceed with the subscription to the celebrity profile and interacts with selectable object 3710.

In the example of FIG. 37C, the screen 3700c includes a third celebrity portal subscription interface 3714. The celebrity portal subscription is complete, by interacting with selectable object 3716, the user gains access to a subscribed celebrity portal interface. In some embodiments, the subscribed celebrity portal interface includes more content regarding the celebrity.

The example of FIG. 38 illustrates an example screen of a subscribed celebrity portal interface 3800. The subscribed celebrity portal interface 3800 includes an image of the celebrity 3802, friends of the celebrity 3804, a status of the celebrity 3806, a search icon 3808, a camera icon 3810, a subscription icon 3812, a celebrity newsfeed 3814, celebrity content 3816, an advertisement 3818, and a preview of the upcoming celebrity content 3820.

The image of the celebrity 3802 serves as a background to the subscribed celebrity portal interface 3800. In some embodiments, the celebrity may choose the image displayed in the background of the subscribed celebrity portal interface 3800.

The friends (or, linked users) of the celebrity 3804 section of the subscribed celebrity portal interface 3800 displays other celebrities who are friends with the celebrity associated with the current subscribed celebrity portal interface 3800. The friends of the celebrity 3804 displays an image for each of the celebrity's friends, users may subscribe to the portal interface of the celebrity's friends by using steps disclosed in the description of FIGS. 37A-37C.

The celebrity status 3806 displays the status of the celebrity to their celebrity portal interface. In the illustrated example, the celebrity status 3806 displays discloses a date that the celebrity last accessed their profile portal, and the celebrity's status on their profile portal, for example, Robert Downey Jr., is online. In some embodiments, the celebrity status displayed in the limited celebrity portal interface 3600 may be different from a subscribed celebrity portal interface.

The search icon 3808 or a selectable object for searching, may be used to search the content of all of the portal interfaces associated with that particular celebrity, e.g., Robert Downey Jr., for the term inputted by the user into a search field (not shown). The search icon 380 may be used by users to search for other celebrity profiles. In other embodiments, the search icon 380 may be used by users to search the content of all celebrity portal interfaces.

The camera icon 3810, or a selectable object for using an imaging device (e.g., camera) coupled to a media platform system (e.g., the media platform system 106 in FIG. 1).

The subscription icon 3812 displays the number of subscribers to the celebrity profile portal.

The celebrity newsfeed 3814 displays a message exchange between the celebrity associated with the subscribed celebrity portal interface 3800, e.g., Robert Downey Jr. and one or more of their celebrity friends. Like other communications between celebrities described herein, the celebrity newsfeed may be limited to interactions (e.g., message exchanges) between celebrities (e.g., and not include includes interactions between celebrities and non-celebrity users). In the illustrated embodiment, celebrity newsfeed 3814 also displays media items associated with the celebrity, e.g., Robert Downey Jr. In some embodiments, the celebrity may choose the media items that he/she wants to display in celebrity newsfeed 3814. In some embodiments, the user may choose at the time the user subscribes to the celebrity profile, or later, the categories of interest for the celebrity, for example, the user may be interested only in Robert Downey Jr.'s music.

The celebrity content 3816 displays a plurality of digital media in which Robert Downey Jr. took part in. In some embodiments, the celebrity content 3616 displays physical goods associated with the celebrity. In some embodiments, the celebrity content 3616 displays media goods and physical goods endorsed by the celebrity. For example, celebrity content 3816 may display the media that the celebrity is currently watching, playing or listening, or the last media that the celebrity watched, play or listened to. In some embodiments, the celebrity content displayed in the subscribed celebrity portal interface may be different from the limited celebrity portal interface 3600.

The advertisement 3818 section is an area of the subscribed celebrity portal 3800 that the media platform system may use to insert advertisements. The media platform system 106 may retrieve advertisement media from advertisement provider system 104. In some embodiments, the media platform system 106 may only insert advertisements associated with the celebrity associated with the subscribed celebrity portal 3800. In some embodiments, the celebrity may choose the image displayed in the background of the subscribed celebrity portal 3800.

The preview of the upcoming celebrity content 3820 section is an area of is an area of the subscribed celebrity portal 3800 that shows a preview of a media associated with the celebrity. In some embodiments, the preview of the upcoming celebrity content 3820 section shows a preview of a media associated with the celebrity that is available exclusively with media platform system 106. In some embodiments, an advertisement may be placed in the preview of the upcoming celebrity content 3820 if the celebrity has no upcoming content.

Figure 39:
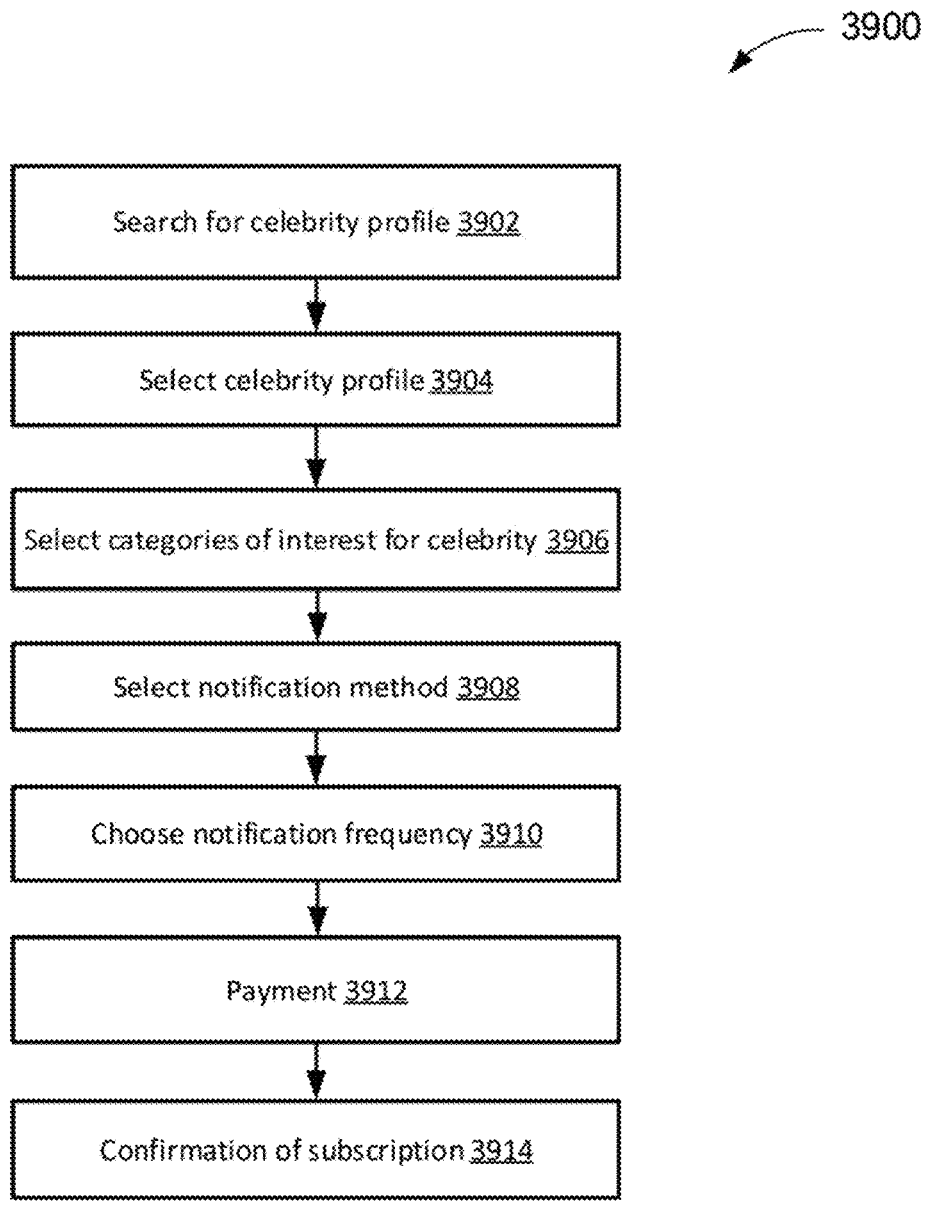
FIG. 39 illustrates a flowchart of an example method of subscribing to a celebrity portal interface.

FIG. 39 illustrates a flowchart of an example method of subscribing to a celebrity portal interface 3900.

In step 3902, a user search for a celebrity profile. The user can access a screen similar to screen 3500a of FIG. 35A. Celebrity portals may be organized by plurality of categories, such as a film category, a sports category or a music category. Metadata, received from the metadata processing engine 322, may be embedded in selectable object in the screen similar to screen 3500a of FIG. 35A, so that when the user interacts with the selectable object, celebrity portal engine 336 of media platform system 106 directs the user to the celebrity portal interface associated with the selectable object. The metadata may include information which identifies the product, the celebrity associated with the product, Alternatively, the user may select one of a plurality of category icon, such as a sports category icon to navigate to a screen which corresponds to a screen displaying a variety of celebrities which belong to the sports category.

Once the user interacts with the selectable object associated with a celebrity profile, step 3904 can occur. In step 3904, the media platform system 106 displays limited celebrity portal interface 3600 of FIG. 36 or the subscribed celebrity portal interface 3800 of FIG. 38, depending on whether or not the user has previously subscribed to the celebrity portal interface.

In step 3906, the user may choose categories of interest for the celebrity, for example, the user may choose to only access certain aspects of a celebrity's body of work, for example the user may be interested only in Robert Downey Jr.'s music.

In step 3908, the user may choose the method of notification. In some embodiments, the user may choose to be notified of new content in a subscribed celebrity portal interface by email, Short Message Service (SMS), Multimedia Messaging Service (MMS), IM or the like. The user's choice of method of notification may be stored in the notification engine 324. In some embodiments, notification engine 324 may provide notification to one or more remote systems (e.g., media platform systems 106 and/or media, social and market delivery system 108).

In step 3910, the user may choose the frequency of notification. In some embodiments, the user may choose to be notified as soon as new content in the subscribed celebrity portal interface is available. In some embodiments, the user may choose to receive notification of new content daily, weekly, monthly, or some customized frequency. The user's choice in frequency of notification may be stored in the notification engine 324.

In step 3912, the user may choose to subscribe to the celebrity profile for a predetermined free. Media platform system 106 may access user account information 152 for payment information, such as credit card information from the user.

In step 3914, the user confirms the subscription of the celebrity profile. The user can access a screen similar to the third celebrity portal subscription interface 3714 of FIG. 37C. With the end of step 3914, the process of subscribing to a celebrity portal interface 3900 ends.

FIG. 40A-40F illustrates an example screen transition for users to purchase celebrity. FIGS. 40A-40F illustrates screens 4000a, 4000b, 4000c, 4000d, 4000e, and 4000f respectively, and the screen transition is assumed to occur in this order although the screen transitions occur in another order instead of, or in addition to, the order shown here.

Figure 40A:
FIGS. 40A-40F illustrate an example screen transition for users to purchase celebrity endorsed products.

In the example FIG. 40A, screen 4000a corresponds to a screen showing a celebrity content featuring a celebrity, e.g., Jamie Foxx. In some embodiments, the celebrity content is available for users to view live or on demand. In some embodiments, the celebrity content, is available exclusively with the media platform system 106. If user interacts with an icon 4002 in screen 4000a, the GUI engine, in response may identify the function of the icon 4002 and generate merchandise associated with Jamie Foxx available for purchase by the user. In some embodiments, the GUI engine may generate data regarding purchases of media goods, physical goods and the like. The GUI engine may generate data regarding merchandise associated with Jamie Foxx available for purchase by the user. The celebrity portal engine 336 may analyze screen 4000a and determine products associated with Jamie Foxx, such as headphones, clothing, or a media that the celebrity is disclosing in the celebrity content shown on screen 4000a. the celebrity portal engine 336 may coordinate with metadata processing engine 322 to generate icons, such as icon 4008 in FIG. 40B, displaying physical goods or media goods, with embedded metadata, associated with the celebrity. The celebrity portal engine 336 may send these metadata-embedded icons to media platform system 106. The purchase engine 222 may render the physical goods or media goods onto the screen. The playback engine 208 may receive the metadata-embedded icons and overlay this on the celebrity content, such as the content displayed on screen 4000a.

Figure 40B:

In the example FIG. 40B, screen 4000b corresponds to a screen showing the celebrity content overlaid by a celebrity-endorsed product shopping section 4004 which includes icon 4008 and a shopping cart icon 4006. The celebrity-endorsed product shopping section may allow the user viewing the celebrity content, live or on-demand, to purchase products associated with the celebrity without leaving the celebrity content or media. Users may create an order to purchase products associated with the celebrity by interacting with one or more icons 4004, such as icon 4008 which feature an image of headphones, the same brand and style of headphones the celebrity is wearing in the celebrity content shown in screen 4000b.

Figure 40C:
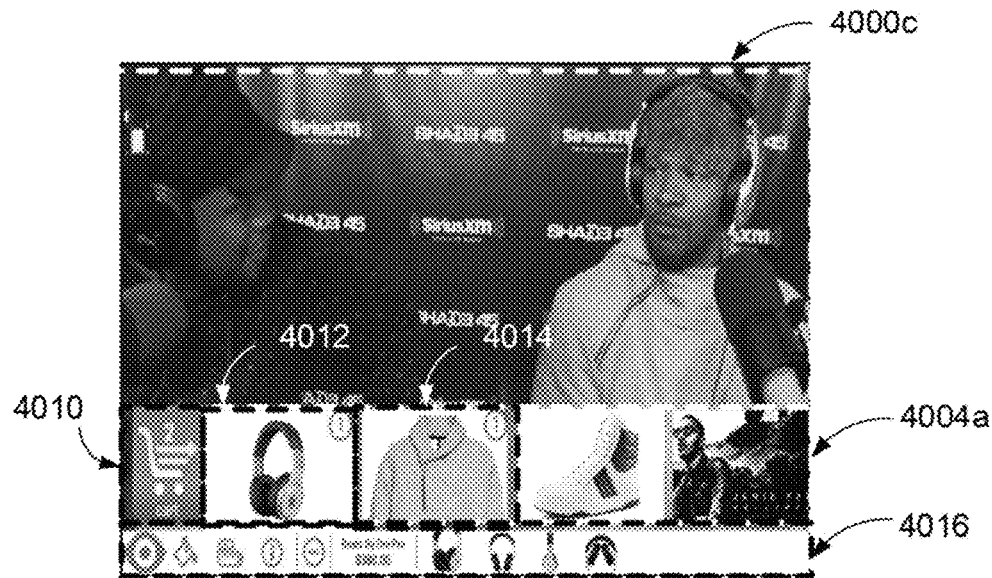

In the example FIG. 40C, screen 4000c corresponds to a screen showing a user in the process of purchasing celebrity-endorsed products. A shopping cart icon 4010 indicates that there are two items in the shopping cart. The user interacted with icons 4012 and 4014, and may have chosen one pair of headphones and one top similar in brand and style to the pair of headphones and top the celebrity is wearing in the celebrity content shown in screen 4000c without leaving the screen presenting the celebrity media. A celebrity-endorsed product shopping section 4004a of FIG. 40C includes shopping icon 4010, icons 4012 and 4014 as well as a shopping options section 4016. The shopping options section 4016 may indicate the name of the item (e.g., a pair of headphones) being purchased, the purchase price, different views of the product, to allow the user to view the product from different aspects.

Figure 40D:
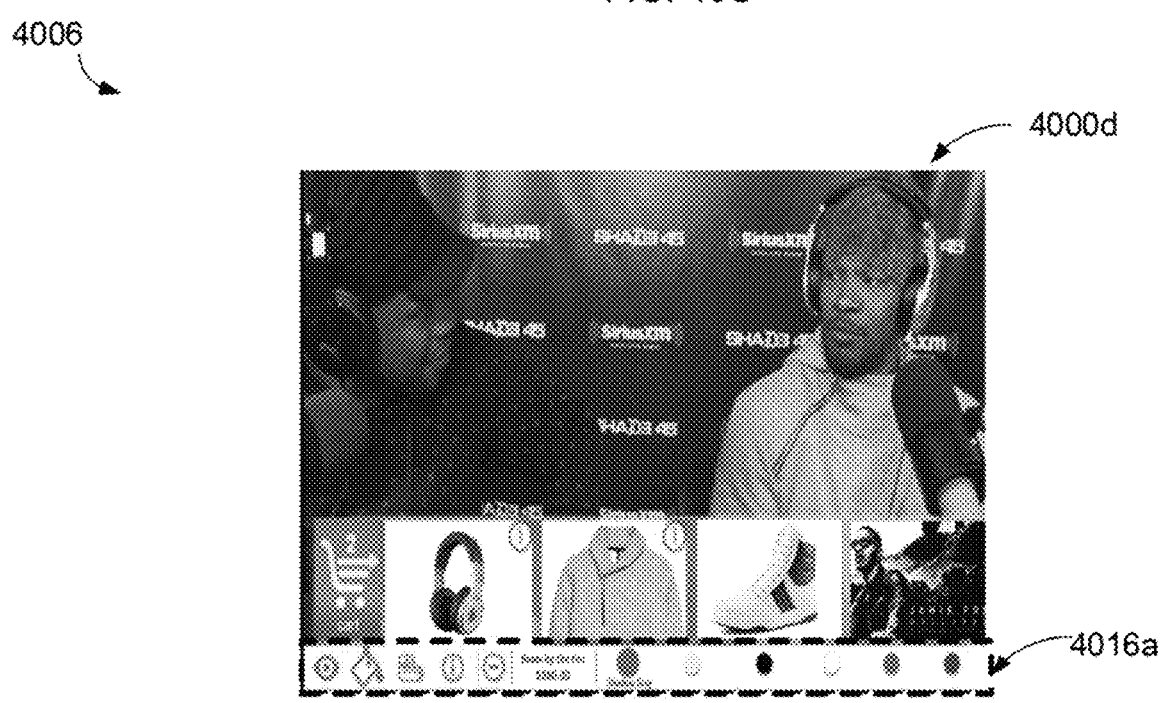

In the example FIG. 40D, screen 4000d corresponds to a screen showing the user continuing in the process of purchasing celebrity-endorsed products. The screen 4000d displays a shopping options section 4016a in which the user is required to choose a color from the available colors for the pair of headphones without leaving the screen presenting the celebrity media.

Figure 40E:
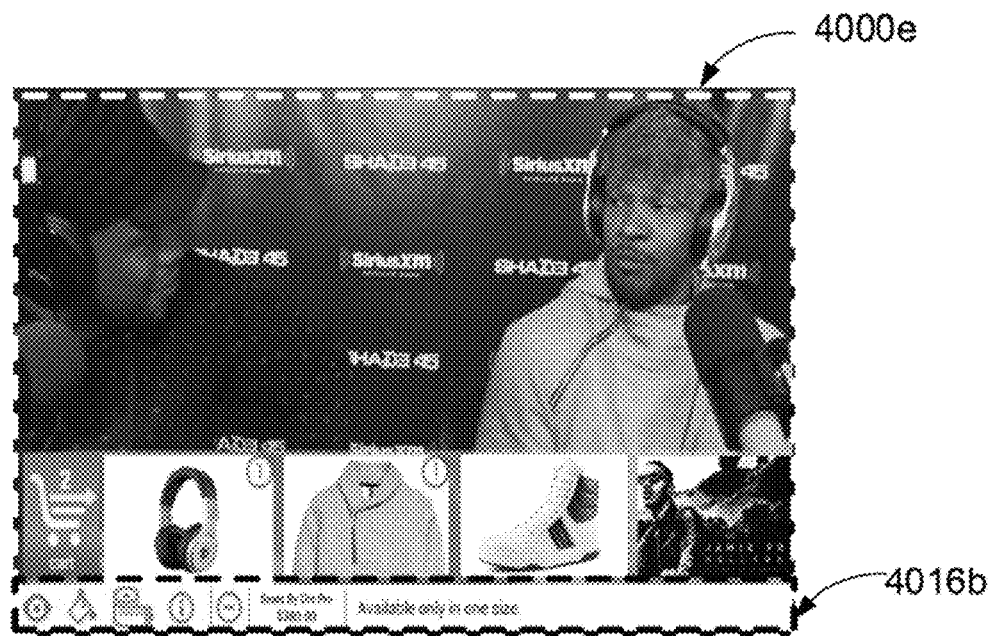

In the example FIG. 40E, screen 4000e corresponds to a screen showing the user continuing in the process of purchasing celebrity-endorsed products. The screen 4000e displays a shopping options section 4016b in which the user is required to choose a size of pair of headphones without leaving the screen presenting the celebrity media. The pair of headphones are available only in one size, however, the user may be required to confirm the choice. If the user has more products to purchase, the steps disclosed in screens 4000c, 4000d and 4000e may be repeated for each product the user decides to purchase. If the user does not wish to purchase more celebrity-endorsed products, the user can proceed with the process of purchasing celebrity-endorsed products. In some embodiments, the options displayed in the shopping options section 4016, 4016a and 4016b may vary depending on the product being purchased. For example, if the user is wants to purchase a media good associated with the celebrity media, the shopping options section may not be displayed to the user.

Figure 40F:
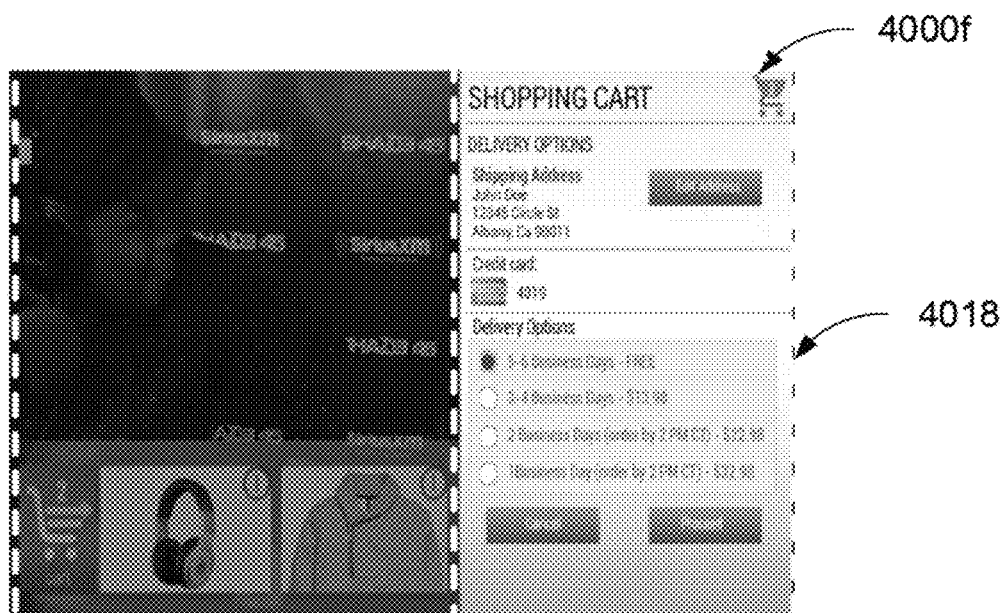

In the example FIG. 40F, screen 4000f corresponds to a screen showing the user completing the process of purchasing celebrity-endorsed products. The screen 4000d includes an order confirmation 4018. The order confirmation 4018 displays shipping address, the user may change the address the order ships. The purchasing engine 222 may obtain the shipping address from the user account information 152 of media, social and market delivery system 108. The user may confirm the payment method, the purchasing engine 222 may obtain payment information, such as credit card information for the user from the user account information 152. The user may choose the delivery method, different delivery methods may change the price of the order.

Figure 41:
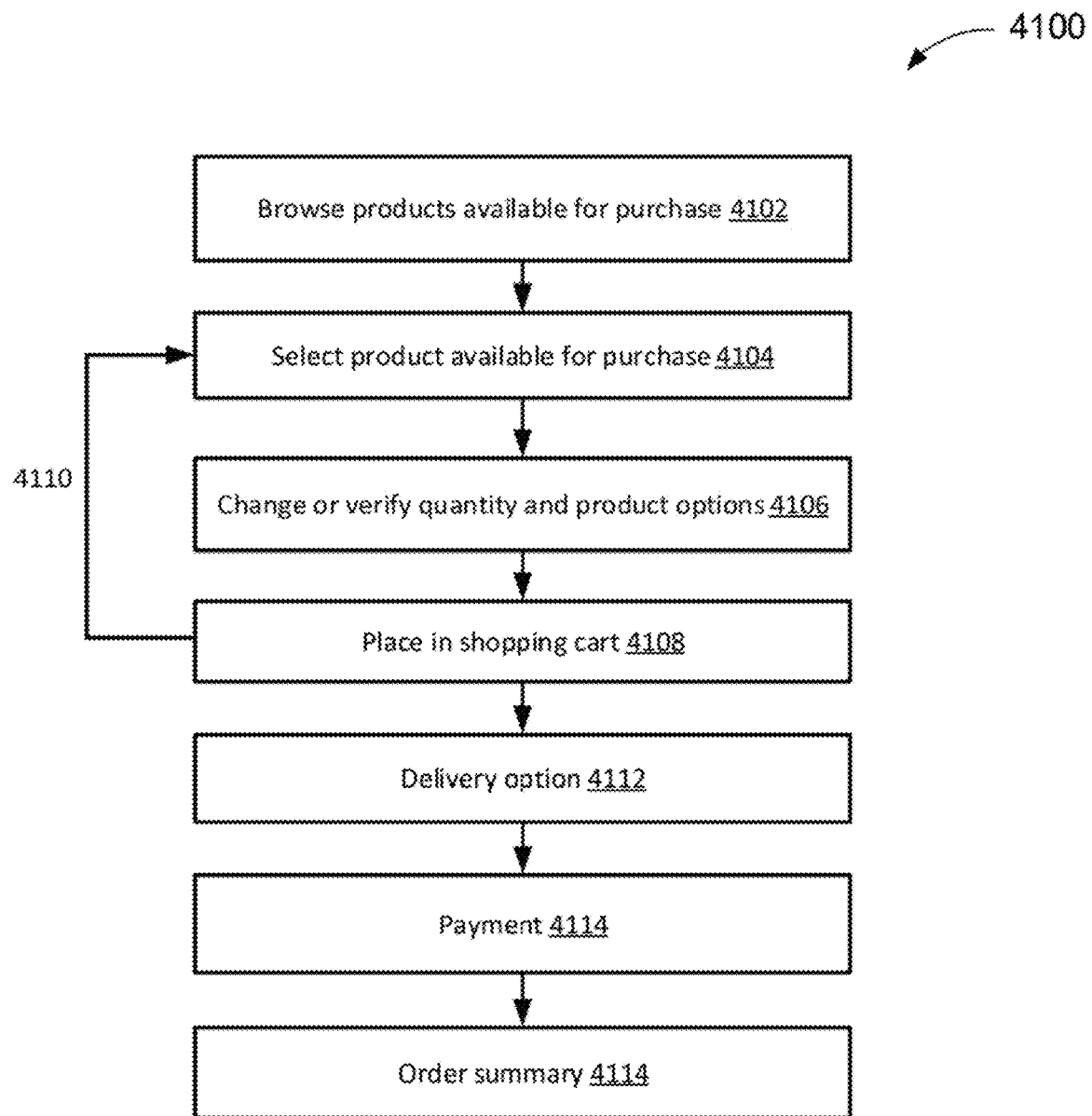
FIG. 41 illustrates a flowchart of an example method of purchasing celebrity endorsed products.

FIG. 41 illustrates a flowchart of an example method of purchasing celebrity endorsed products 4100.

In step 4102, the user may browse the screen similar to screen 4000b of FIG. 40V, showing celebrity content overlaid by the celebrity-endorsed product shopping section 4004. The celebrity-endorsed product shopping section may allow the user viewing the celebrity content, live or on-demand, to purchase products associated with the celebrity without leaving the celebrity content or media.

In step 4104, the user may select a product that is available for purchase. For example, the user chooses a top similar in brand and style to the top the celebrity is wearing in the celebrity content shown in screen 4000c.

In step 4106, the user may change or verify the number of celebrity-endorsed products that the user wishes to purchase. The user may also choose product options, such as product size, color and the like. These options may be displayed to the user in shopping options section 4016, 4016a and 4016b as seen in FIGS. 40C, 40D and 40E respectively. In some embodiments, the options displayed in the shopping options section may vary depending on the product being purchased.

In step 4108, once the user has made all the choices for the product options, the user may place the item in the shopping cart. If the user has more celebrity-endorsed products to purchase, the purchasing celebrity endorsed product method 4100 may proceed to step 4104. If the user does not have more celebrity-endorsed products to purchase from the celebrity content, the purchasing celebrity endorsed product method 4100 may proceed to step 4112.

In step 4112, the user may make choices regarding delivery method, such as the different delivery options disclosed in screen 4000f of FIG. 40F. In some embodiments, different delivery methods may change the price of the order.

In step 4114, the user may confirm the payment method, the purchasing engine 222 may obtain payment information, such as credit card information for the user from the user account information 152.

In step 4116, the user may receive an order summary (not shown) showing the products that the user has chosen to order, the quantity and product options, delivery method, expected arrival date and price.

Figure 42A:
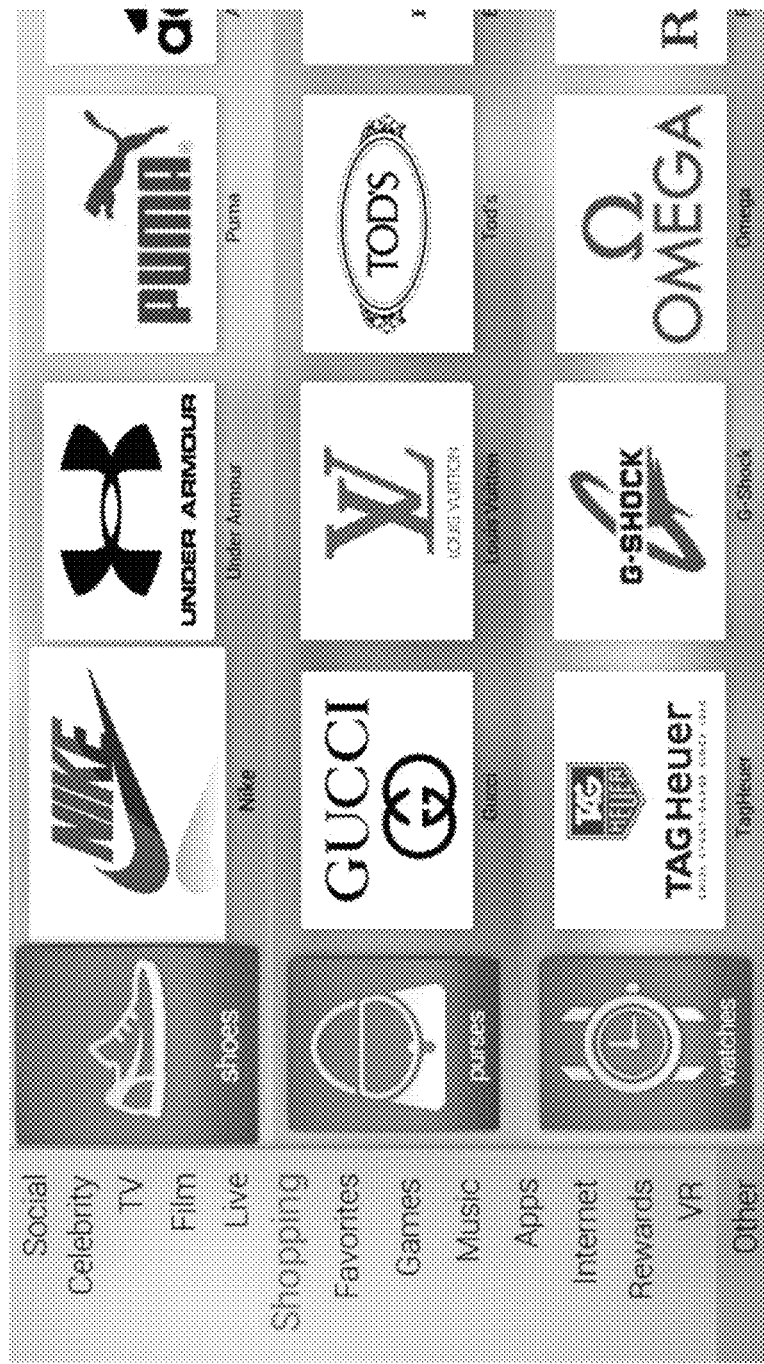
FIGS. 42A-42G illustrate an example screen transition for users to purchase products through a media system.
Figure 42B:
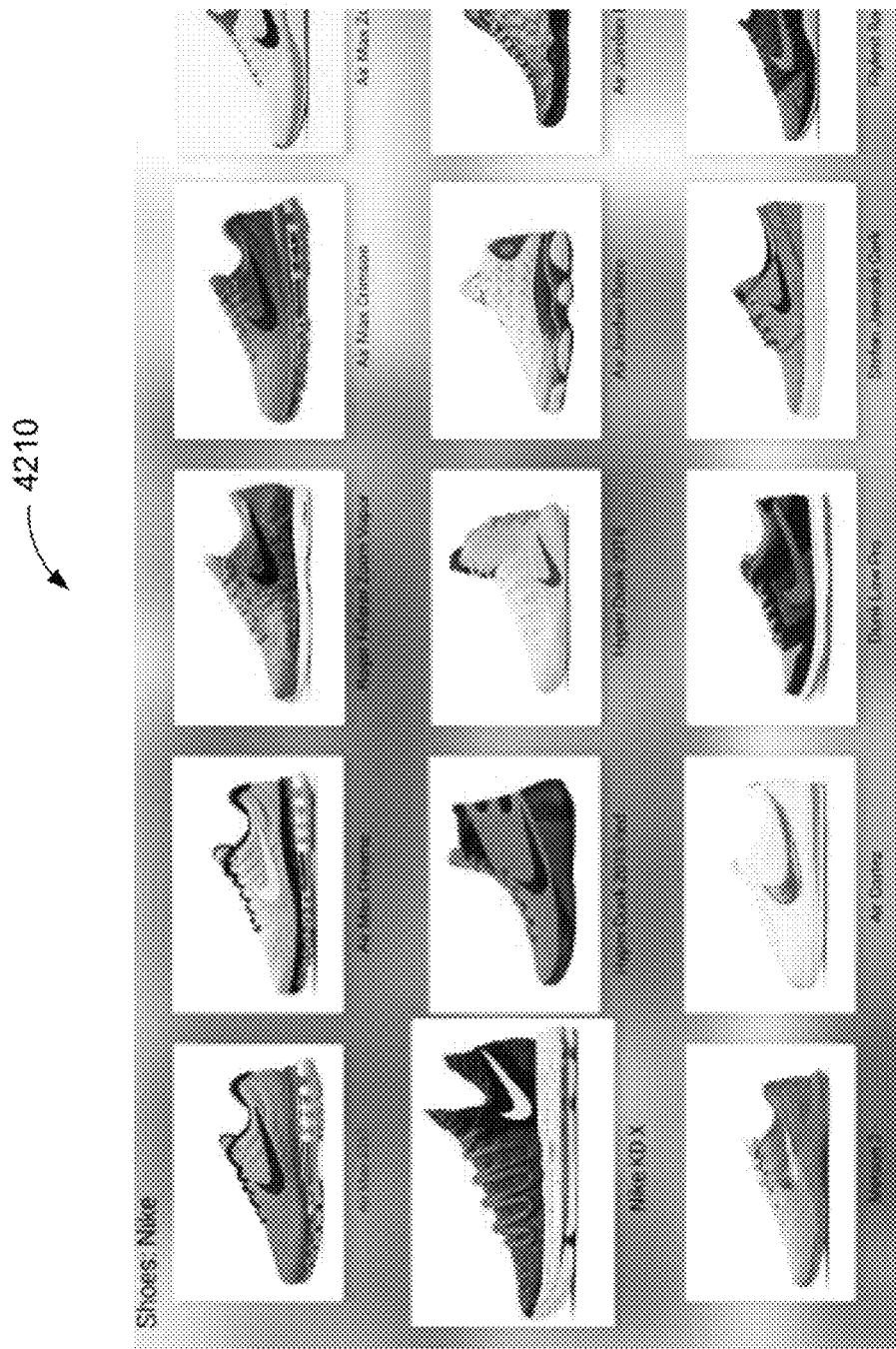
Figure 42C:
Figure 42D:
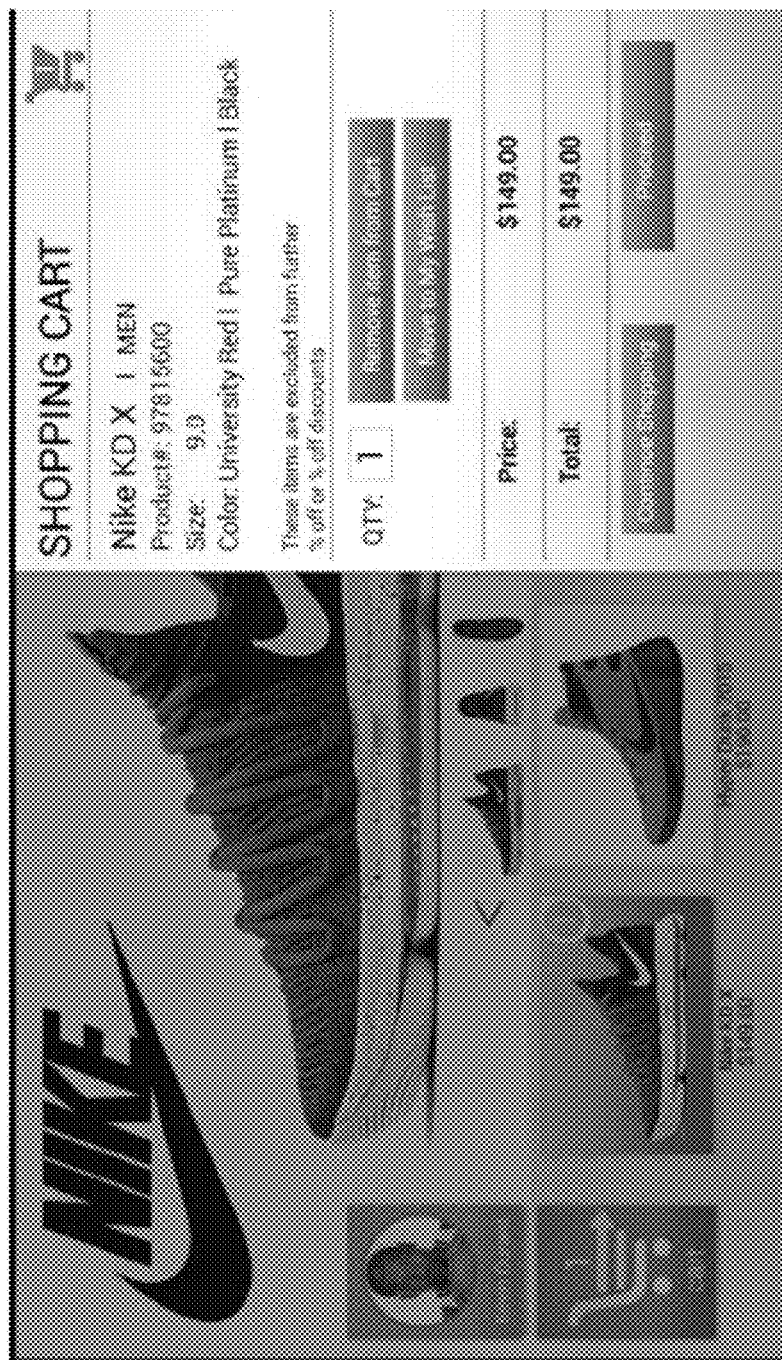
Figure 42E:
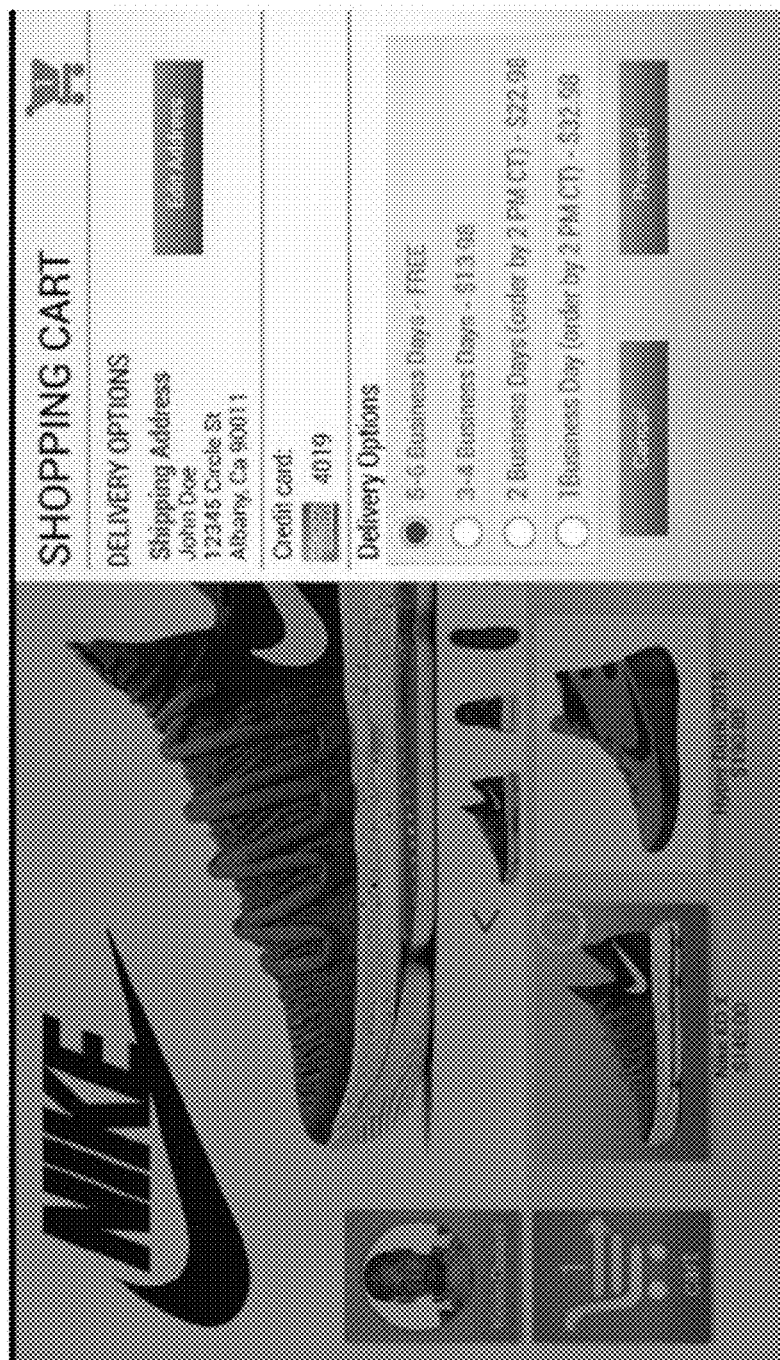
Figure 42F:
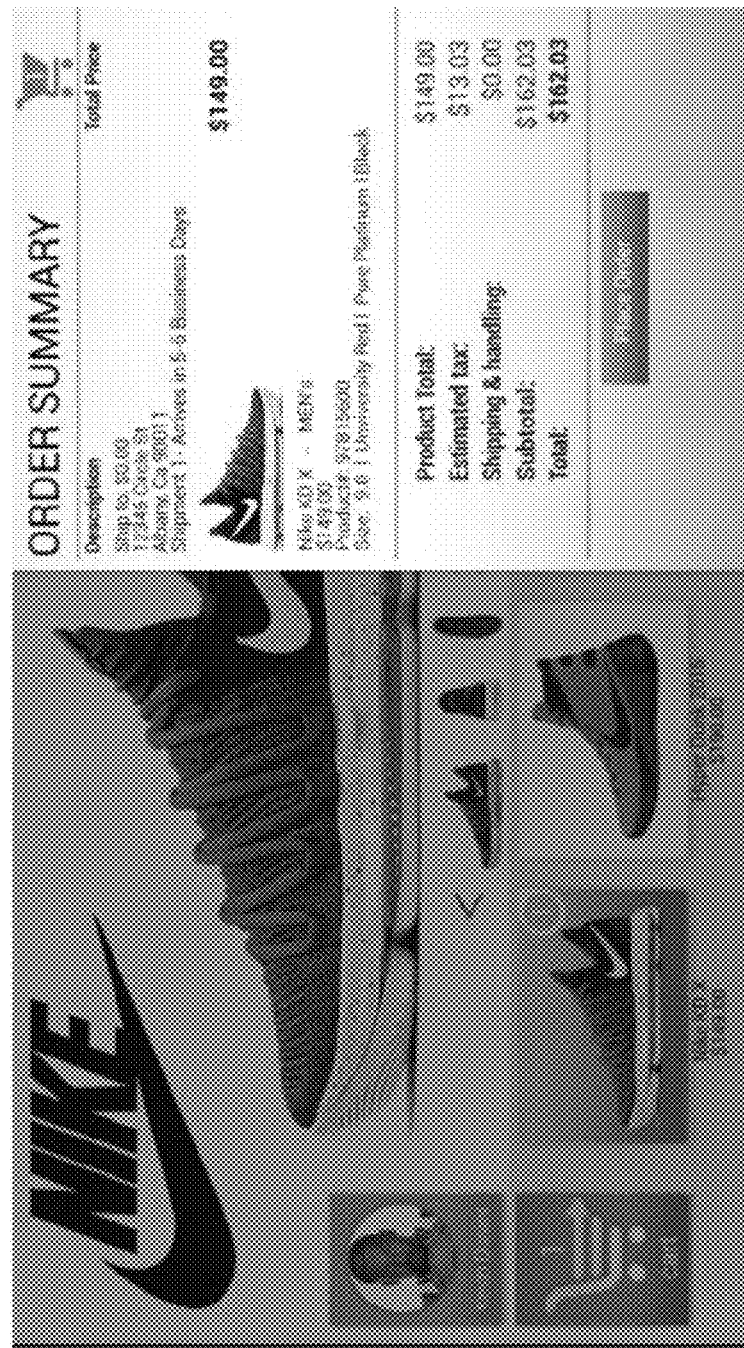
Figure 42G:
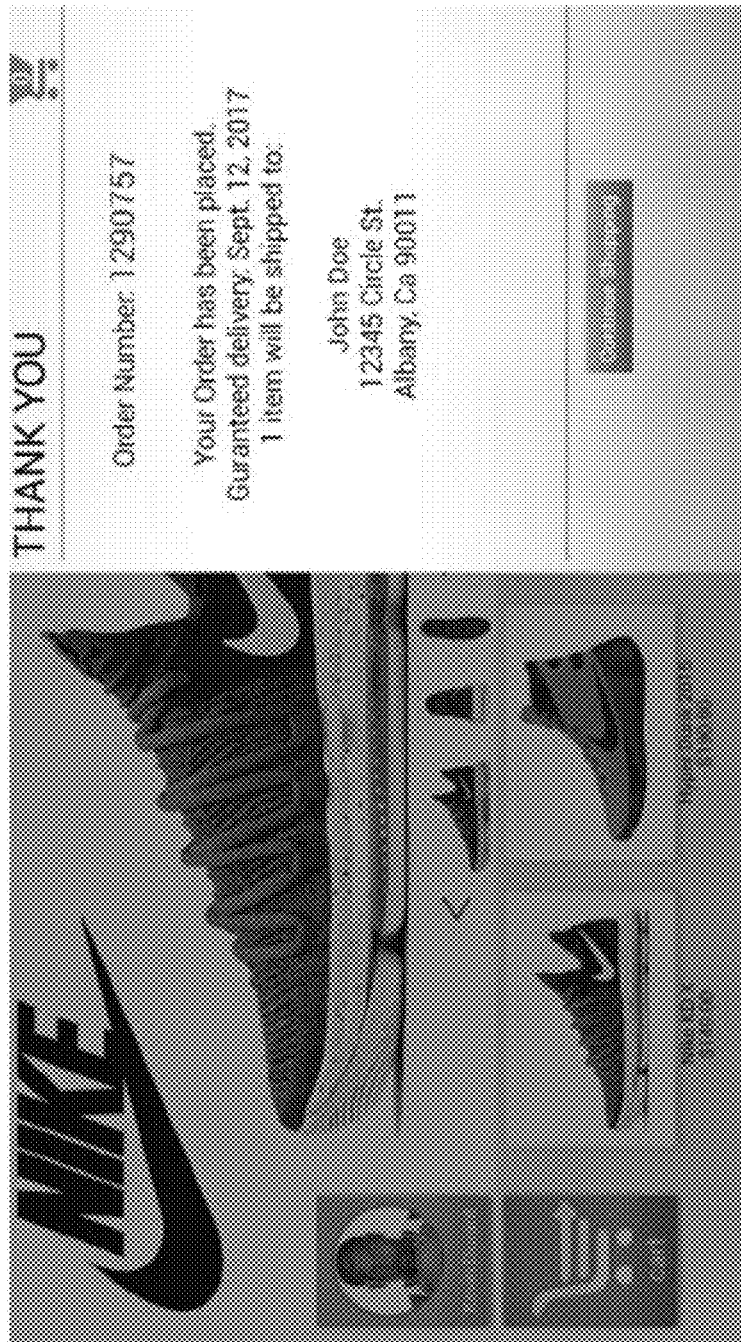

FIGS. 42A-42G illustrate an example screen transition for users to purchase products through a media system (e.g., media, social and market delivery system 108 and/or media platform system 106). Although physical goods are primarily shown here, it will be appreciated that the same/similar process and/or screens may be used for media content. The screens may be generated by engines described herein (e.g., purchasing engine 222, and/or market engine 334). FIG. 42A depicts an example GUI 4200 showing a main menu shopping screen. FIG. 42B depicts a drilldown screen 4220 to physical goods (e.g., shoes, as shown). FIG. 42C depicts a drill-down screen 4230 to a particular physical goods (e.g., Nike Shoe KD X, as shown). The screen 4230 may include one or more visuals 4232 indicating one or more associated celebrity users. For example, the celebrity users may endorse the associated physical good. Accordingly, the indicated celebrity users may be compensated in response to a purchase of the item. Celebrity compensation is discussed throughout this paper. FIG. 42D depicts a drilldown screen 4240 to shopping cart to purchase the selected item. FIG. 42E depicts a drilldown screen 4250 showing another screen in order/purchase process, showing selection of delivery options. FIG. 42F depicts a drilldown screen 4260 showing the result of an order summary of completed purchase. FIG. 42G depicts a drilldown screen 4270 showing a completed purchase.

Figure 43:
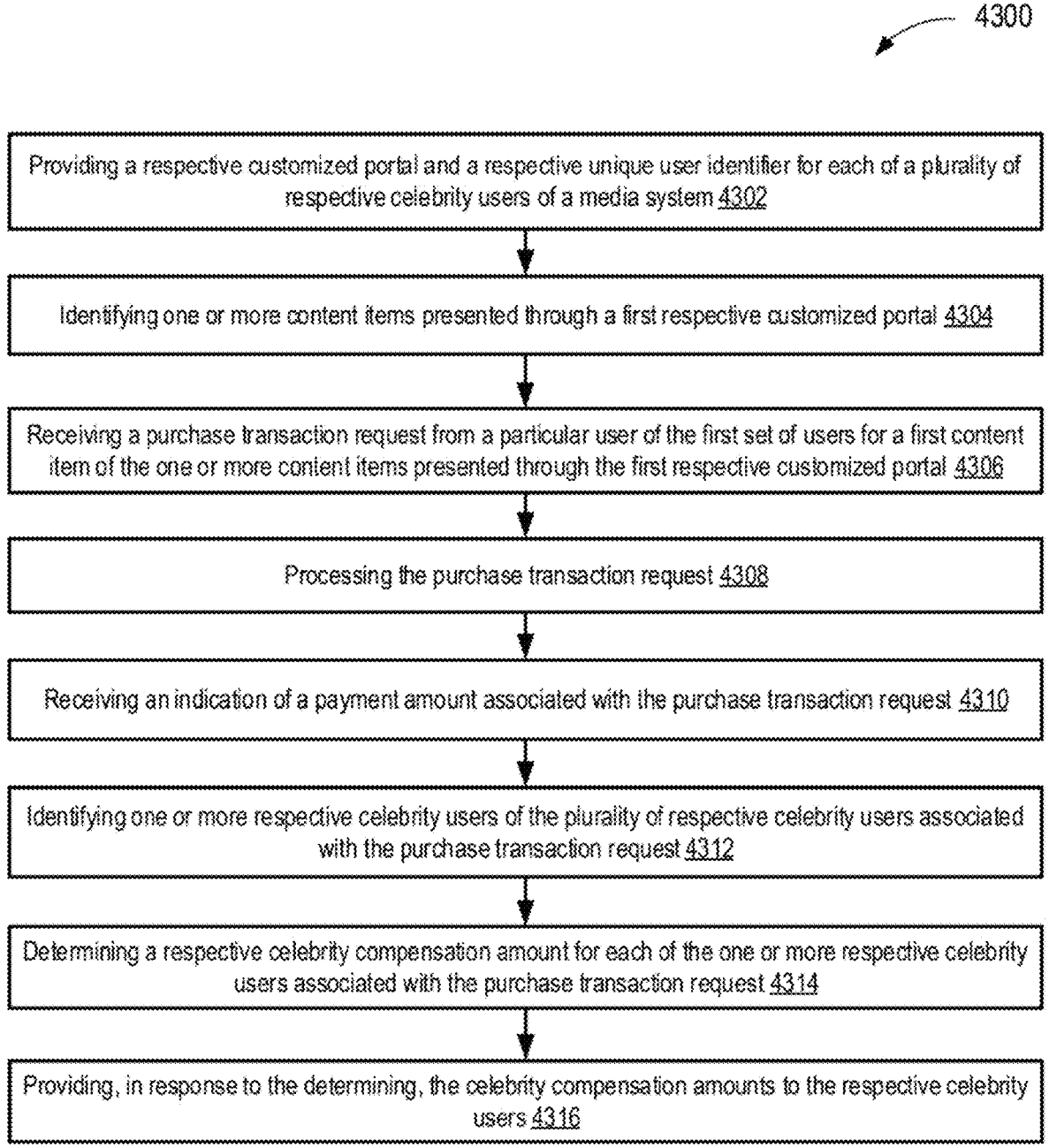
FIG. 43 illustrates a flowchart of an example method of celebrity compensation of a media platform system according to some embodiments.

FIG. 43 illustrates a flowchart 4300 of an example method of celebrity compensation of a media system (e.g., media, social and market delivery system 108 and/or media platform system 106) according to some embodiments.

In step 4302, a media system (e.g., media, social and market delivery system 108 and/or media platform system 106) provides a respective customized portal (e.g., a celebrity portal associated with celebrity account information 153) and a respective unique user identifier (e.g., celebrity account identifier of celebrity account information 153) for each of a plurality of respective celebrity users (e.g., celebrity users associated with celebrity account information 153) of the media system. The media system may be capable of providing media content, social content (e.g., instant communications, user activity, and/or other social network content), and market content (e.g., media content and/or physical goods available for purchase through the media system) to a first set of users (e.g., users associated with user account information 152) of the media system, each of the respective customized portals being at least partially controlled by the respective celebrity user. In some embodiments, a celebrity portal engine (e.g., celebrity portal engine 336) provides the customized portals. In some embodiments, the celebrity portal engine may cooperate with a social interface engine (e.g., social interface engine 220) to provide the customized portals.

In step 4304, the media system identifies one or more content items (e.g., media content and/or physical goods) presented through a first respective customized portal (e.g., a customized portal associated with and/or at least partially controlled by the Robert Downey, Jr.). In some embodiments, the celebrity portal engine identifies the one or more content items.

In some embodiments, the one or more content items are presented through other portions of the media system. For example, content items may be presented though a general shopping interface (e.g., an interface not associated with a celebrity) of the media system.

In step 4306, the media system receives a purchase transaction request from a particular user of the first set of users for a first content item of the one or more content items presented through the first respective customized portal. For example, a user interacting with the media system may view and select a pair head phones, and submit a request to purchase the headphones. This may all be performed without the user leaving the media system (e.g., being directed to another URI, domain, website, and/or third-party system) and/or a single user interface of the media system. For example, the media system may use a set of URIs (e.g., URLs) and/or other links to navigate between interfaces and/or overlay interfaces and/or regions of interfaces, without directing the user to an external system (e.g., an external domain). In some embodiments, a market engine (e.g., market engine 334) receives the purchase transaction request.

In step 4308, the media system processes the purchase transaction request. This may include verifying and/or charging a credit card or other payment system (e.g., PayPal, cryptocurrency system, and/or the like). In some embodiments, the market engine processes and/or initiates processing of the purchase transaction.

In step 4310, the media system receives an indication of a payment amount associated with the purchase transaction request, the payment amount being paid by the particular user or an entity associated with the particular user. In some embodiments, the market engine and/or a celebrity compensation engine (e.g., celebrity compensation engine 338) receives the indication of the payment amount.

In step 4312, the media system identifies one or more respective celebrity users of the plurality of respective celebrity users associated with the purchase transaction request. In some embodiments, the celebrity compensation engine performs the identification.

In some embodiments, the one or more respective celebrity users of the plurality of respective celebrity users associated with the purchase transaction request include the respective celebrity user at least partially controlling the first customized portal.

In some embodiments, the one or more respective celebrity users of the plurality of respective celebrity users associated with the purchase transaction request include one or more second respective celebrity users linked to the purchase transaction request. The linking may be based on a link path resulting in (or, leading to) the receiving of the purchase transaction request. The link path may be based on the respective customized portals visited by the particular user within a predetermined amount of time prior to the purchase transaction request being received from the particular user.

In step 4314, the media system determines a respective celebrity compensation amount for each of the one or more respective celebrity users associated with the purchase transaction request. Each of the celebrity compensation amounts may be determined at substantially the same time as the indication of the payment amount paid by the particular user is received. The determination may be based on the payment amount and/or one or more compensation rules (e.g., celebrity compensation rules 360). In some embodiments, the celebrity compensation engine performs the determination.

In some embodiments, the one or more celebrity compensation rules define the respective compensation amounts as a percentage of the payment amount associated with the purchase transaction request. The one or more celebrity compensation rules may define the respective compensation amounts as a percentage of the payment amount associated with the purchase transaction request and a respective position within the link path.

In step 4316, the media system provides each of the celebrity compensation amounts to the respective celebrity users based on the respective unique user identifiers of the respective celebrity users associated with the purchase transaction request. The celebrity compensation amounts may be provided in response to the respective celebrity compensation amounts being determined. For example, the celebrity compensation amounts may be provided immediately after, and/or at substantially the same time, the respective celebrity compensation amounts are determined. In some embodiments, the celebrity compensation engine provides the compensation amounts. For example, the compensation amounts may be provided to an account of the media system (e.g., account 153), and/or one or more third-party accounts associated with the respective celebrity users and/or associated entity. As used herein, it will be appreciated that a celebrity user may refer to an individual (e.g., Robert Downey Jr), and/or entities (e.g., representatives, organizations) associated with the individual.

Figure 44:
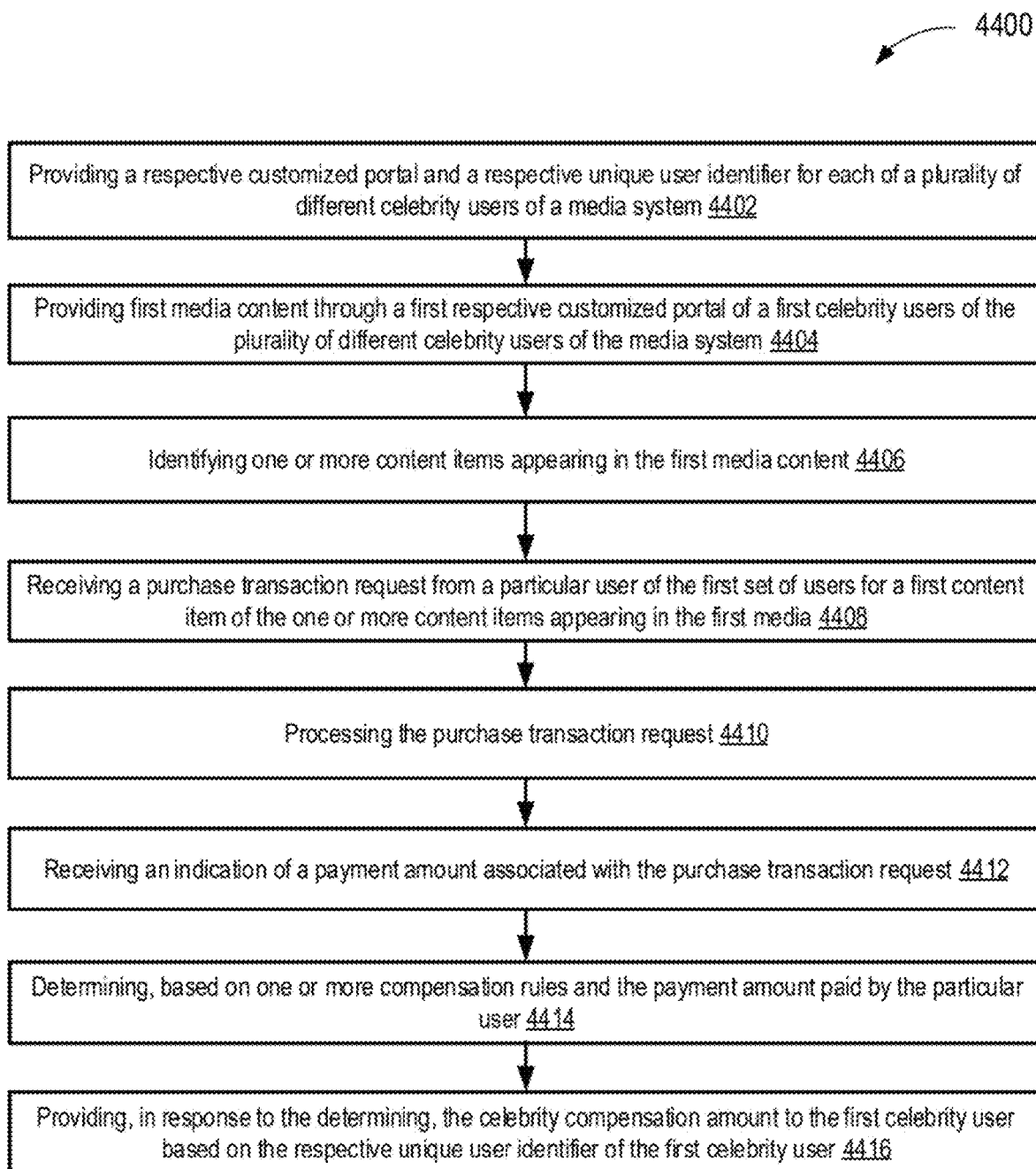
FIG. 44 illustrates a flowchart of an example method of celebrity compensation of a media platform system according to some embodiments.

FIG. 44 illustrates a flowchart 4440 of an example method of celebrity compensation of a media system (e.g., media, social and market delivery system 108 and/or media system 106) according to some embodiments.

In step 4402, a media system (e.g., media, social and market delivery system 108 and/or media platform system 106) provides a respective customized portal (e.g., a "celebrity portal") and a respective unique user identifier for each of a plurality of different celebrity users of a media system. The media system may be capable of providing media content, social content, and market content to a first set of users of the media system. Each of the respective customized portals and each of the plurality of different celebrity users and respective customized portals of the media system may be at least partially controlled by a respective celebrity user. In some embodiments, a celebrity portal engine (e.g., celebrity portal engine 336) provides the customized portals.

In step 4404, the media system provides first media content through a first respective customized portal of a first celebrity users of the plurality of different celebrity users of the media system. In some embodiments, a playback engine (e.g., playback engine 208) and/or the celebrity portal engine provides the first media content.

In step 4406, the media system identifies one or more content items appearing in the first media content. In some embodiments, a celebrity compensation engine (e.g., celebrity compensation engine 338) identifies the one or more content items appearing in the first media content.

In some embodiments, one or more respective content item identifiers of the one or more content items are embedded (e.g., encoded) within the first media content. They may be embedded as metadata. The one or more content items may be identified based on the embedded one or more respective content item identifiers. For example, a metadata processing engine (e.g., metadata processing 322) may extract the content identifiers, compare them to a set a content items, and return the matching content items.

In step 4408, the media system receives a purchase transaction request from a particular user of the first set of users for a first content item of the one or more content items appearing in the first media. The purchase request may be received at substantially the same time as a playback of the first media content through a graphical user interface of the first respective customized portal. In some embodiments, the purchase transaction request may be received by the celebrity compensation engine via a purchasing engine (e.g., purchasing engine 222).

In some embodiments, the purchase transaction request is received during playback of the first media content through a first interface of the first respective customized portal. For example, a user may be viewing exclusive content presented through a celebrity, an overlay of available content items may be presented, and the user may select a particular content item for purchase.

In some embodiments, the purchase transaction request is processed without leaving the first interface of the first respective customized portal. For example, the user may continue to view the exclusive content through the celebrity portal while purchasing a content item.

In step 4410, the media system processes the purchase transaction request. In some embodiments, a market engine (e.g., market engine 334) and/or the celebrity compensation engine processes the purchase transaction request.

In step 4412, the media system receives an indication of a payment amount associated with the purchase transaction request. The payment amount may be paid by the particular user and/or an entity associated with the particular user. In some embodiments, the celebrity compensation engine receives the indication of the payment amount.

In step 4414, the media system determines, based on one or more compensation rules and the payment amount paid by the particular user, a celebrity compensation amount. The celebrity compensation amount may be determined at substantially the same time as the indication of the payment amount associated with the purchase transaction request is received. In some embodiments, the celebrity compensation engine determines the compensation amount.

In step 4416, the media system provides, in response to the determining, the celebrity compensation amount to the first celebrity user based on the respective unique user identifier of the first celebrity user. In some embodiments, the celebrity compensation engine provides the celebrity compensation amount to the first celebrity.

FIG. 45 illustrates a flowchart 4500 of an example method of graphical user interface navigational flow and operation of a celebrity portal of a media system according to some embodiments.

In step 4502, a media system (e.g., media, social and market delivery system 108 and/or media platform system 106) displays a limited celebrity portal interface that includes a set of first visuals indicating a first celebrity user (e.g., an image and/or portrait of a likeness of the first celebrity user) and a second set of visuals indicating a set of content items associated with the first celebrity user, and a subscription icon. The content items may include videos, movies, music, video games, and/or television shows. The set of content items may be selected by the first celebrity user. For example, the celebrity user may select their favorite and/or endorsed content items. The limited celebrity portal interface may be at least partially controlled by the first celebrity user. In some embodiments, a celebrity portal engine (e.g., celebrity portal engine 336) and/or a social interface engine (e.g., social interface engine 220) displays the limited celebrity portal interface.

In step 4504, the media system, responsive to receiving a selection of the subscription icon, overlays a celebrity portal subscription interface over a portion of the limited celebrity portal interface. The celebrity portal subscription interface may include a first set of visual prompts for completing registration of a non-celebrity user registration to access a set of subscribed celebrity portal interfaces at least partially controlled by the first celebrity user.

In step 4506, the media system, responsive to receiving input corresponding to the first set of visual prompts, verifies the input (e.g., processing a financial transaction). In some embodiments, a purchasing engine (e.g., purchasing engine 222) receives the input and provides the visual prompts, and a market engine (e.g., market engine 334) verifies the input.

In step 4508, the media system, responsive to a successful verification of the input, displays a first subscribed celebrity portal interface of the set of subscribed celebrity portal interfaces including a third set of visuals indicating one or more second celebrity users linked to the first celebrity user, and a fourth set of visuals indicating one or more activities of the first celebrity user. In some embodiments, the celebrity portal engine and/or the social interface engine displays the subscribed celebrity portal interface.

In some embodiments, the one or more activities include one or more instant communication messages with one or more of the second celebrity users, movies that the first celebrity user is watching, video games the first celebrity user is playing, and/or music the first celebrity user is listening to. The activities may be current (e.g., currently playing movies) and/or historical (e.g., activities occurring within a predetermined amount of time of a current time).

In some embodiments, the media system may provide, responsive to receiving a selection of any of the first visuals, second visuals, third visuals, and fourth visuals, a sharing interface for sharing associated content and/or activities with one or more of the second celebrity users.

In some embodiments, the set of subscribed celebrity portal interfaces include an instant communication region displaying one or more communication messages between the first celebrity user and one or more of the second celebrity users.

Figure 46:
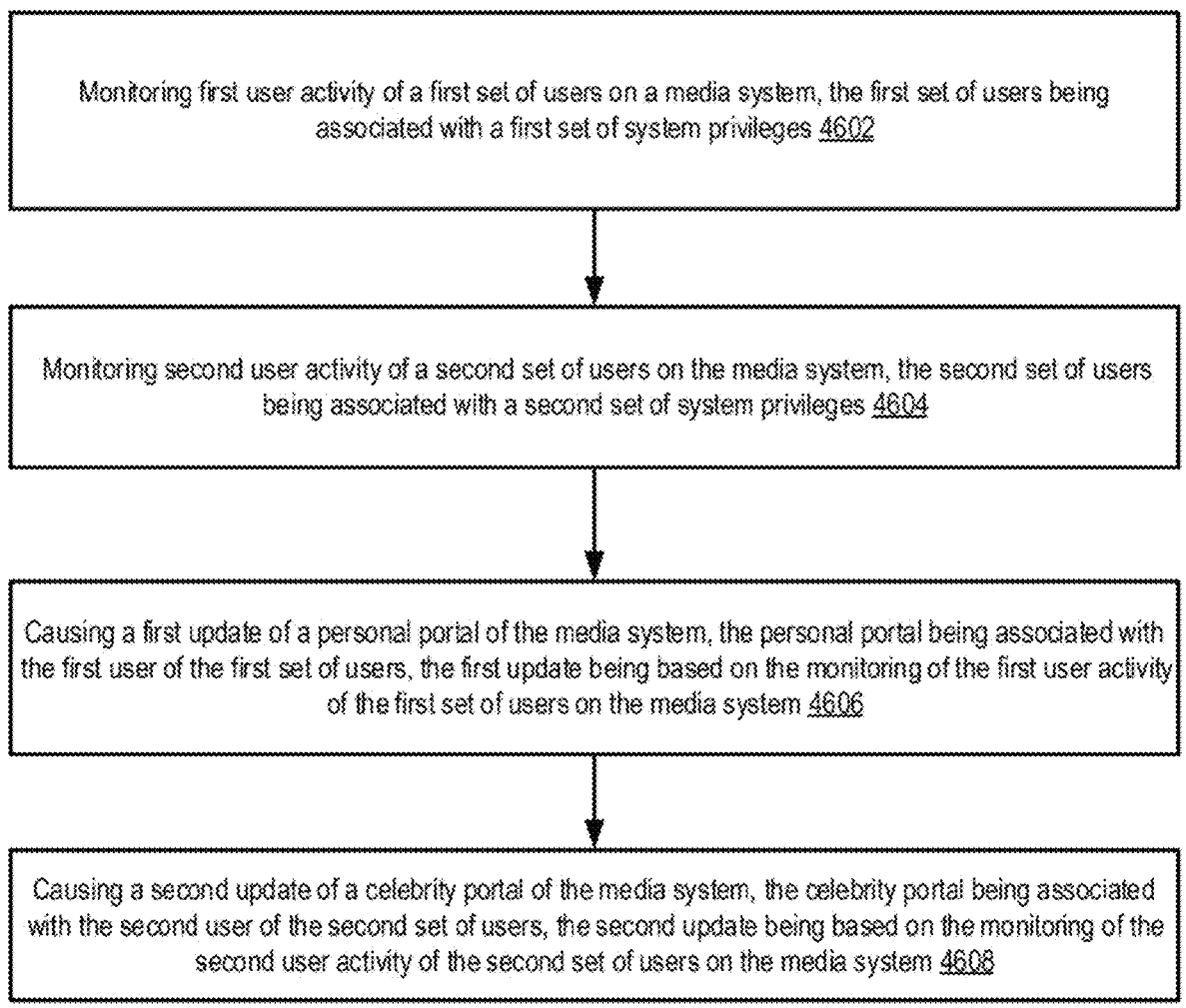
FIG. 46 illustrates a flowchart of an example method of monitoring and sharing user activity and content consumption on a media system according to some embodiments.

FIG. 46 illustrates a flowchart 4600 of an example method of monitoring and sharing user activity and content consumption on a media system (e.g., media, social and market delivery system 108 and/or media platform system 106) according to some embodiments.

In step 4602, a media system (e.g., media, social and market delivery system 108 and/or media platform system 106) monitors first user activity of a first set of users on a media system. The first set of users may be associated with a first set of system privileges (e.g., privileges to at least partially control their respective personal portal), and the media system may be capable of providing media content, social content, and market content to the first set of users. The first user activity of the first set of users may include instant communication messages transmitted through the media system between a plurality of users of the first set of users, media consumed by at least a first user of the first set of users through the media system, and/or purchases made through the media system by at least the first user of the first set of users. In some embodiments, a social engine (e.g., social engine 332) performs the monitoring of the first user activity.

In some embodiments, the media content includes streaming media, on-demand media content, live media content, broadcast media content, video games, and music. In some embodiments, the market content includes digital media and physical goods available for purchase through the media system. In some embodiments, consumed media includes historical/or and current media consumption. For example, movies a user is currently watching (e.g., a synchronized viewing mode, non-synchronized viewing mode, and/or the like), and/or movies the user has previously watched (e.g., within a predetermined amount of time before current consumption is determined).

In some embodiments, the first user activity includes one or more users of the second set of users that the first user is subscribed to. For example, a first user may be subscribed to one or more celebrities.

In some embodiments, the instant communication messages that originate from any of the second set of users are limited to being sent to one or more other users of the second set of users. For example, celebrities may be limited to communicating with other celebrities, and/or prevented from communicating with other types of users.

In step 4604, the media system monitors second user activity of a second set of users (e.g., celebrity users) on the media system. The second set of users may be associated with a second set of system privileges (e.g., celebrity privileges to at least partially control their respective celebrity portal). The second user activity of the second set of users including instant communication messages transmitted through the media system between a plurality of users of the second set of users, media consumed by at least a second user of the second set of users through the media system, and/or content items endorsed by at least the second user of the second set of users. In some embodiments, the social engine performs the monitoring of the second user activity.

In step 4606, the media system causes a first update of a personal portal of the media system. The personal portal being associated with the first user of the first set of users. The first update may be based on the monitoring of the first user activity of the first set of users on the media system. In some embodiments, the social engine causes the first update.

In step 4608, the media system causes a second update of a celebrity portal of the media system. The celebrity portal being associated with the second user of the second set of users, the second update may be based on the monitoring of the second user activity of the second set of users on the media system. In some embodiments, the social engine causes the second update.

In some embodiments, the media system shares at least a portion of the first user activity with one or more other users of the first set of users linked to the first user. The first update may be based on the sharing.

In some embodiments, the media system shares at least a portion of the second user activity with one or more other users of the second set of users linked to the second user. The second update may be based on the sharing.

FIG. 47 illustrates a flowchart 4700 of an example graphical user interface navigational flow and operation of a personal portal of a media system (e.g., media, social and market delivery system 108 and/or media platform system 106) according to some embodiments.

In step 4702, a media system (e.g., media, social and market delivery system 108 and/or media platform system 106) displays a first screen interface of a personal portal of a media system. The media system capable of providing media content, social content, and market content to users of the media system. The first screen interface may include a communication initiation region, a linked user region, an advertisement region, and/or a user activity region. The communication initiation region may include a set of first visuals indicating a plurality of different selectable types of digital communication. The linked user region may a set of second visuals indicating a set of second users linked to the first user. The user activity region may include a third set of visuals indicating user activity of the first user. The personal portal may be at least partially controlled by the first user. In some embodiments, a social engine (e.g., social engine 332) and/or a social interface engine (e.g., social interface engine) displays the first screen. For example, the social engine may generate interfaces of the personal portal which may be displayed by the social interface engine.

In some embodiments, the user activity includes movies the first user is watching, video games the first user in playing, and music the first user is listening to.

In step 4704, the media system overlays, responsive to receiving a selection of an instant communication visual of the set of visuals, an instant communication region over a portion of the first screen interface of the personal portal, prompting the user to select a particular user from the set of second users linked to the first user, and establishing an instant communication session between the first user and the selected particular user. In some embodiments, the social engine and/or social interface engine overlays the instant communication region.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system for providing a customized portal, the system comprising:
one or more processors; and
memory storing instructions that, when executed by the one or more processors, cause the system to perform:
storing a first limited celebrity portal interface that includes a set of first visuals indicating a first celebrity user, and a second set of visuals indicating a set of content items associated with the first celebrity user, and a subscription icon of the first limited celebrity portal interface, the first limited celebrity portal interface being at least partially controlled by the first celebrity user;
storing a second limited celebrity portal interface that includes a set of first visuals indicating a second celebrity user, and a third set of visuals indicating a set of content items associated with the second celebrity user, and a subscription icon of the second limited celebrity portal interface, the second limited celebrity portal interface being at least partially controlled by the second celebrity user,
responsive to receiving a selection of a first visual of the set of first visual indicating the first celebrity user, displaying the first limited celebrity portal interface,
responsive to receiving a selection of the subscription icon of the first limited celebrity portal interface, overlaying a celebrity portal subscription interface over a portion of the first limited celebrity portal interface, the celebrity portal subscription interface including a first set of visual prompts for completing registration of a non-celebrity user registration to access a set of subscribed celebrity portal interfaces at least partially controlled by the first celebrity user;
responsive to receiving input corresponding to the first set of visual prompts, verifying the input;
responsive to a successful verification of the input, displaying a first subscribed celebrity portal interface of the set of subscribed celebrity portal interfaces to a subscribed user, the subscribed user being one of a set of subscribed users, the set of subscribed celebrity portal interfaces including a third set of visuals indicating one or more third celebrity users linked to the first celebrity user, and a fourth set of visuals indicating one or more activities of the first celebrity user;
providing a first media content through a respective customized portal of the first celebrity user;
identifying one or more content items appearing in the first media content, the identifying based on metadata embedded in the first media content;
generating a plurality of icons, each of the plurality of generated icons representing the identified one or more content items appear in the first media content;
displaying the generated plurality of icons as a fifth set of visuals, the fifth set of visuals overlaid on the first media content, the fifth set of visuals being translucent;
receiving a purchase transaction request from the subscribed user of the first set of subscribed users for a first content item of the one or more content items appearing in the first media, the purchase request received at substantially the same time as a playback of the first media content through a graphical user interface of the respective customized portal,
identifying one or more celebrity users associated with the purchase transaction request based on a link path, the one or more celebrity users including at least the first celebrity user, the link path being based on one or more respective customized portals visited by the subscribed user within a predetermined amount of time prior to the received purchase transaction request,
determining a celebrity compensation amount paid by the subscriber of the set of subscribers, the determining being based on one or more compensation rules associated with the identified one or more celebrity users, and
responsive to the determining, providing the celebrity compensation amount to each of the identified one or more celebrity users.

2. The system of claim 1, wherein the set of first visuals indicating the first celebrity user comprise an image of a likeness of the first celebrity user.

3. The system of claim 1, wherein set of content items associated with the first celebrity user include any of videos, movies, music, video games, and television shows.

4. The system of claim 1, wherein the set of content items associated with the first celebrity user are selected by the first celebrity user.

5. The system of claim 1, wherein verifying the input comprises processing a financial transaction.

6. The system of claim 1, wherein the second set of visuals comprise a set of icons, each of the icons indicating particular digital content endorsed by the first celebrity user.

7. The system of claim 1, wherein the one or more activities include one or more instant communication messages with one or more of the third celebrity users, movies that the first celebrity user is watching, video games the first celebrity user is playing, and music the first celebrity user is listening to.

8. The system of claim 1, wherein the instructions further cause the system to perform: responsive to receiving a selection, providing a sharing interface for sharing content with one or more of the third celebrity users.

9. The system of claim 1, wherein the set of subscribed celebrity portal interfaces includes an instant communication region displaying one or more communication messages between the first celebrity user and one or more of the third celebrity users.

10. The system of claim 1, wherein the set of subscribed celebrity portal interfaces includes an exclusive content region displaying digital content exclusive to the first celebrity user.

11. A method for providing customized portal, the method being implemented by a computing system including one or more processors and storage media storing machine-readable instructions, the method comprising:

storing a first limited celebrity portal interface that includes a set of first visuals indicating a first celebrity user, and a second set of visuals indicating a set of content items associated with the first celebrity user, and a subscription icon of the first limited celebrity portal interface, the first limited celebrity portal interface being at least partially controlled by the first celebrity user;

storing a second limited celebrity portal interface that includes a set of first visuals indicating a second celebrity user, and a third set of visuals indicating a set of content items associated with the second celebrity user, and a subscription icon of the second limited celebrity portal interface, the second limited celebrity portal interface being at least partially controlled by the second celebrity user, responsive to receiving a selection of a first visual of the set of first visual indicating the first celebrity user, displaying the first limited celebrity portal interface, responsive to receiving a selection of the subscription icon of the first limited celebrity portal interface, overlaying a celebrity portal subscription interface over a portion of the first limited celebrity portal interface, the celebrity portal subscription interface including a first set of visual prompts for completing registration of a non-celebrity user registration to access a set of subscribed celebrity portal interfaces at least partially controlled by the first celebrity user;

responsive to receiving input corresponding to the first set of visual prompts, verifying the input;

responsive to a successful verification of the input, displaying a first subscribed celebrity portal interface of the set of subscribed celebrity portal interfaces to a subscribed user, the subscribed user being one of a set of subscribed users, the set of subscribed celebrity portal interfaces including a third set of visuals indicating one or more third celebrity users linked to the first celebrity user, and a fourth set of visuals indicating one or more activities of the first celebrity user;

providing first media content through a respective customized portal of the first celebrity user;

identifying one or more content items appearing in the first media content, the identifying based on the metadata embedded in the first media content;

generating a plurality of icons, each of the plurality of generated icons representing the identified one or more content items appear in the first media content;

displaying the generated plurality of icons as a fifth set of visuals, the fifth set of visuals overlaid on the first media content, the fifth set of visuals being translucent;

receiving a purchase transaction request from the subscribed user of the first set of subscribed users for a first content item of the one or more content items appearing in the first media, the purchase request received at substantially the same time as a playback of the first media content through a graphical user interface of the respective customized portal, identifying one or more celebrity users associated with the purchase transaction request based on a link path, the one or more celebrity users including at least the first celebrity user, the link path being based on one or more respective customized portals visited by the subscribed user within a predetermined amount of time prior to the received purchase transaction request, determining a payment amount paid by the subscriber of the set of subscribers, the determining being based on one or more compensation rules associated with the identified one or more celebrity users, and responsive to the determining, providing a celebrity compensation amount to each of the identified one or more celebrity users.

12. The method of claim 11, wherein the set of first visuals indicating the first celebrity user comprise an image of a likeness of the first celebrity user.

13. The method of claim 11, wherein set of content items associated with the first celebrity user include any of videos, movies, music, video games, and television shows.

14. The method of claim 11, wherein the set of content items associated with the first celebrity user are selected by the first celebrity user.

15. The method of claim 11, wherein verifying the input comprises processing a financial transaction.

16. The method of claim 11, wherein the second set of visuals comprise a set of icons, each of the icons indicating particular digital content endorsed by the first celebrity user.

17. The method of claim 11, wherein the one or more activities include one or more instant communication messages with one or more of the third celebrity users, movies that the first celebrity user is watching, video games the first celebrity user is playing, and music the first celebrity user is listening to.

18. The method of claim 11, further comprising: responsive to receiving a selection, providing a sharing interface for sharing content with one or more of the third celebrity users.

19. The method of claim 11, wherein the set of subscribed celebrity portal interfaces includes an instant communication region displaying one or more communication messages between the first celebrity user and one or more of the third celebrity users.

20. The method of claim 11, wherein the set of subscribed celebrity portal interfaces includes an exclusive content region displaying digital content exclusive to the first celebrity user.

* * * * *